US012271868B2

(12) United States Patent
Rasmus-Vorrath et al.

(10) Patent No.: US 12,271,868 B2
(45) Date of Patent: Apr. 8, 2025

(54) FAILURE PREDICTION OF AT LEAST ONE TINTABLE WINDOW

(71) Applicant: View, Inc., Milpitas, CA (US)

(72) Inventors: Jack Kendrick Rasmus-Vorrath, Mountain House, CA (US); Nidhi Satyacharan Tiwari, San Jose, CA (US); Nitin Khanna, Sunnyvale, CA (US); Roberto Alejandro Menchaca, San Jose, CA (US)

(73) Assignee: View Operating Corporation, San Jose, CA (US)

( * ) Notice: Subject to any disclaimer, the term of this patent is extended or adjusted under 35 U.S.C. 154(b) by 0 days.

(21) Appl. No.: 18/033,517

(22) PCT Filed: Oct. 21, 2021

(86) PCT No.: PCT/US2021/056103
§ 371 (c)(1),
(2) Date: Apr. 24, 2023

(87) PCT Pub. No.: WO2022/093629
PCT Pub. Date: May 5, 2022

(65) Prior Publication Data
US 2024/0013162 A1    Jan. 11, 2024

Related U.S. Application Data

(63) Continuation-in-part of application No. 17/760,474, filed as application No. PCT/US2021/017603 on Feb.
(Continued)

(51) Int. Cl.
*G06Q 10/20* (2023.01)
*E06B 9/24* (2006.01)
(Continued)

(52) U.S. Cl.
CPC ............. *G06Q 10/20* (2013.01); *E06B 9/24* (2013.01); *G02F 1/1309* (2013.01); *G02F 1/163* (2013.01);
(Continued)

(58) Field of Classification Search
CPC ........ G06Q 10/20; G06Q 10/087; E06B 9/24; E06B 2009/2464; G02F 1/163
See application file for complete search history.

(56) References Cited

U.S. PATENT DOCUMENTS 7,747,070 B2    6/2010  Puri
8,249,731 B2    8/2012  Tran et al.
(Continued)

FOREIGN PATENT DOCUMENTS

CN    103562962 A    2/2014
CN    106164973 A    11/2016
(Continued)

OTHER PUBLICATIONS

Caliński T. et al., "A dendrite method for cluster analysis," Communications in Statistics, vol. 3, Iss. 1, Jan. 1, 1974, pp. 1-27.
(Continued)

*Primary Examiner* — Zhipeng Wang
(74) *Attorney, Agent, or Firm* — Weaver Austin Villeneuve & Sampson LLP; Brian D. Griedel

(57) ABSTRACT

Data from measurements is used in conjunction with a learning module to identify and predict tintable window malfunctions. The measurements can be based at least in part on data accumulated during regular operation of a tintable window.

18 Claims, 15 Drawing Sheets

Related U.S. Application Data 11, 2021, application No. 18/033,517 is a continuation-in-part of application No. 17/250,586, filed as application No. PCT/US2019/046524 on Aug. 14, 2019, now Pat. No. 12,124,147.

(60) Provisional application No. 63/240,117, filed on Sep. 2, 2021, provisional application No. 63/145,333, filed on Feb. 3, 2021, provisional application No. 63/106,058, filed on Oct. 27, 2020, provisional application No. 63/075,569, filed on Sep. 8, 2020, provisional application No. 62/975,677, filed on Feb. 12, 2020, provisional application No. 62/805,841, filed on Feb. 14, 2019, provisional application No. 62/745,920, filed on Oct. 15, 2018, provisional application No. 62/764,821, filed on Aug. 15, 2018.

(51) Int. Cl.
  *G02F 1/13* (2006.01)
  *G02F 1/163* (2006.01)
  *G06Q 10/087* (2023.01)

(52) U.S. Cl.
  CPC .... *G06Q 10/087* (2013.01); *E06B 2009/2464* (2013.01)

(56) References Cited

U.S. PATENT DOCUMENTS

| | | |
|---|---|---|
| 8,254,013 B2 | 8/2012 | Mehtani et al. |
| 8,270,059 B2 | 9/2012 | Friedman et al. |
| 8,300,298 B2 | 10/2012 | Wang et al. |
| 8,432,603 B2 | 4/2013 | Wang et al. |
| 8,582,193 B2 | 11/2013 | Wang et al. |
| 8,705,162 B2 | 4/2014 | Brown et al. |
| 8,764,950 B2 | 7/2014 | Wang et al. |
| 8,764,951 B2 | 7/2014 | Wang et al. |
| 9,224,091 B2 | 12/2015 | Arsovski |
| 9,547,821 B1 | 1/2017 | Loreggia et al. |
| 9,664,974 B2 | 5/2017 | Kozlowski et al. |
| 10,289,094 B2 | 5/2019 | Ashdown et al. |
| 10,359,681 B2 | 7/2019 | Brown |
| 10,365,531 B2 | 7/2019 | Shrivastava et al. |
| 10,458,863 B2 | 10/2019 | Bernhard et al. |
| 10,495,939 B2 | 12/2019 | Brown et al. |
| 10,533,892 B2 | 1/2020 | Brown et al. |
| 10,539,456 B2 | 1/2020 | Klawuhn et al. |
| 12,124,147 B2 | 10/2024 | Rasmus-Vorrath et al. |
| 2002/0144831 A1 | 10/2002 | Kalt |
| 2005/0046584 A1 | 3/2005 | Breed |
| 2006/0252348 A1 | 11/2006 | Lin et al. |
| 2010/0152905 A1 | 6/2010 | Kusiak |
| 2010/0243427 A1 | 9/2010 | Kozlowski et al. |
| 2010/0245973 A1 | 9/2010 | Wang et al. |
| 2010/0274366 A1 | 10/2010 | Fata et al. |
| 2010/0313476 A1 | 12/2010 | Sethuraman et al. |
| 2011/0066302 A1 | 3/2011 | Mcewan |
| 2011/0266137 A1 | 11/2011 | Wang et al. |
| 2011/0266138 A1 | 11/2011 | Wang et al. |
| 2011/0267674 A1 | 11/2011 | Wang et al. |
| 2011/0267675 A1 | 11/2011 | Wang et al. |
| 2012/0033287 A1 | 2/2012 | Friedman et al. |
| 2012/0033288 A1 | 2/2012 | Lee et al. |
| 2012/0062975 A1 | 3/2012 | Mehtani et al. |
| 2013/0011315 A1 | 1/2013 | Ahmed et al. |
| 2013/0038093 A1 | 2/2013 | Snider |
| 2013/0057937 A1 | 3/2013 | Berman et al. |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2014/0236323 A1 | 8/2014 | Brown et al. |
| 2015/0097944 A1 | 4/2015 | Palm et al. |
| 2015/0116811 A1 | 4/2015 | Shrivastava et al. |
| 2015/0129140 A1 | 5/2015 | Dean et al. |
| 2015/0195644 A1 | 7/2015 | Wilson et al. |
| 2015/0338713 A1 | 11/2015 | Brown |
| 2016/0062332 A1 | 3/2016 | Call et al. |
| 2016/0203403 A1 | 7/2016 | Nagel et al. |
| 2016/0258209 A1 | 9/2016 | Berman et al. |
| 2016/0376831 A1 | 12/2016 | Plummer |
| 2017/0075183 A1 | 3/2017 | Brown |
| 2017/0122802 A1 | 5/2017 | Brown et al. |
| 2017/0242315 A1 | 8/2017 | Ash et al. |
| 2017/0276542 A1 | 9/2017 | Klawuhn et al. |
| 2017/0328121 A1 | 11/2017 | Purdy et al. |
| 2018/0114079 A1 | 4/2018 | Myers et al. |
| 2018/0119973 A1 | 5/2018 | Rothman et al. |
| 2018/0141414 A1 | 5/2018 | Lota |
| 2018/0162203 A1 | 6/2018 | Boehm |
| 2018/0181085 A1 | 6/2018 | Gabriel et al. |
| 2018/0187484 A1 | 7/2018 | Hebeisen et al. |
| 2018/0189647 A1 | 7/2018 | Calvo et al. |
| 2018/0195752 A1 | 7/2018 | Sasaki et al. |
| 2018/0225585 A1 | 8/2018 | Dong et al. |
| 2018/0306609 A1 | 10/2018 | Agarwal et al. |
| 2018/0373111 A1 | 12/2018 | Brown |
| 2019/0025661 A9 | 1/2019 | Brown et al. |
| 2019/0317458 A1* | 10/2019 | Shrivastava ............ G02F 1/163 |
| 2019/0346734 A1 | 11/2019 | Shrivastava et al. |
| 2019/0356508 A1 | 11/2019 | Trikha et al. |
| 2020/0061975 A1 | 2/2020 | Pradhan et al. |
| 2020/0067870 A1 | 2/2020 | Nagel et al. |
| 2021/0084056 A1 | 3/2021 | Abbaszadeh et al. |
| 2021/0088867 A1* | 3/2021 | Nagel ................ G01N 21/8851 |
| 2021/0173969 A1 | 6/2021 | Abbey et al. |
| 2021/0294172 A1 | 9/2021 | Rasmus-Vorrath et al. |
| 2022/0113184 A1 | 4/2022 | Zedlitz et al. |
| 2023/0076947 A1 | 3/2023 | Rasmus-Vorrath et al. |

FOREIGN PATENT DOCUMENTS

| | | |
|---|---|---|
| CN | 107709688 A | 2/2018 |
| CN | 109275336 A | 1/2019 |
| CN | 110214293 A | 9/2019 |
| DE | 4436658 B4 | 2/2004 |
| EP | 3328000 A1 | 5/2018 |
| KR | 101542684 B1 | 8/2015 |
| KR | 20160127762 A | 11/2016 |
| WO | WO-2013155467 A1 | 10/2013 |
| WO | WO-2015171886 A1 | 11/2015 |
| WO | WO-2017007942 A1 | 1/2017 |
| WO | WO-2017120262 A1 | 7/2017 |
| WO | WO-2018067996 A1 | 4/2018 |
| WO | WO-2018098089 A1 | 5/2018 |
| WO | WO-2019183232 A1 | 9/2019 |
| WO | WO-2019183289 A1 | 9/2019 |
| WO | WO-2020037055 A1 | 2/2020 |
| WO | WO-2021163287 A1 | 8/2021 |

OTHER PUBLICATIONS

CN Office Action dated Jan. 12, 2023 in Application No. CN201980064161.8 with English translation.
CN Office Action dated Jun. 29, 2022 in Application No. CN201980064161.8 with English translation.
CN Office Action dated May 10, 2023, in application No. CN201980064161.8 with English translation.
European Office Action dated Mar. 3, 2023 for EP Application No. EP19759832.9.
International Preliminary Report on Patentability and written opinion dated Aug. 25, 2022 in Application PCT/2021/US17603.
International Preliminary Report on Patentability dated Feb. 25, 2021 in PCT Application No. PCT/US2019/046524.
International Preliminary Report on Patentability dated May 11, 2023 in PCT Application No. PCT/US2021/056103.
International Search Report and Written Opinion dated Feb. 11, 2022 issued in Application No. PCT/US2021/056103.
International Search Report and Written Opinion (ISA/EP) dated Jan. 31, 2020 in PCT Application No. PCT/US2019/046524.

(56) References Cited

OTHER PUBLICATIONS

International Search Report and Written Opinion (ISA/EP) dated Jul. 27, 2021 in PCT Application No. PCT/US2021/017603.

Rousseeuw, P.J., "Silhouettes: a graphical aid to the interpretation and validation of cluster analysis," Journal of Computational and Applied Mathematics, vol. 20, Nov. 1, 1987, pp. 53-65.

U.S. Appl. No. 63/106,058, inventors Rasmus-Vorrath et al., filed Oct. 27, 2020.

U.S. Final Office Action dated Dec. 7, 2023 in U.S. Appl. No. 17/250,586.

U.S. Non-Final Office Action dated May 4, 2023 in U.S. Appl. No. 17/250,586.

CN Office Action dated Mar. 27, 2024 in CN Application No. 202180087451.1 with English translation.

EP Extended European Search Report dated Apr. 29, 2024 in EP Application No. 21754072.3.

EP Partial Supplementary European Search report dated Feb. 8, 2024, in EP Application No. 21754072.3.

U.S. Non-Final Office Action dated Mar. 20, 2024 in U.S. Appl. No. 17/760,474.

U.S. Notice of Allowance dated Jun. 7, 2024 in U.S. Appl. No. 17/250,586.

U.S. Notice of Allowance dated Mar. 21, 2024 in U.S. Appl. No. 17/250,586.

EP Extended European Search report dated Sep. 3, 2024 in EP Application No. 21887223.2.

U.S. Notice of Allowance dated Oct. 25, 2024 in U.S. Appl. No. 17/760,474.

U.S. Appl. No. 18/825,235, inventors Rasmus-Vorrath J, et al., filed on Sep. 5, 2024.

* cited by examiner

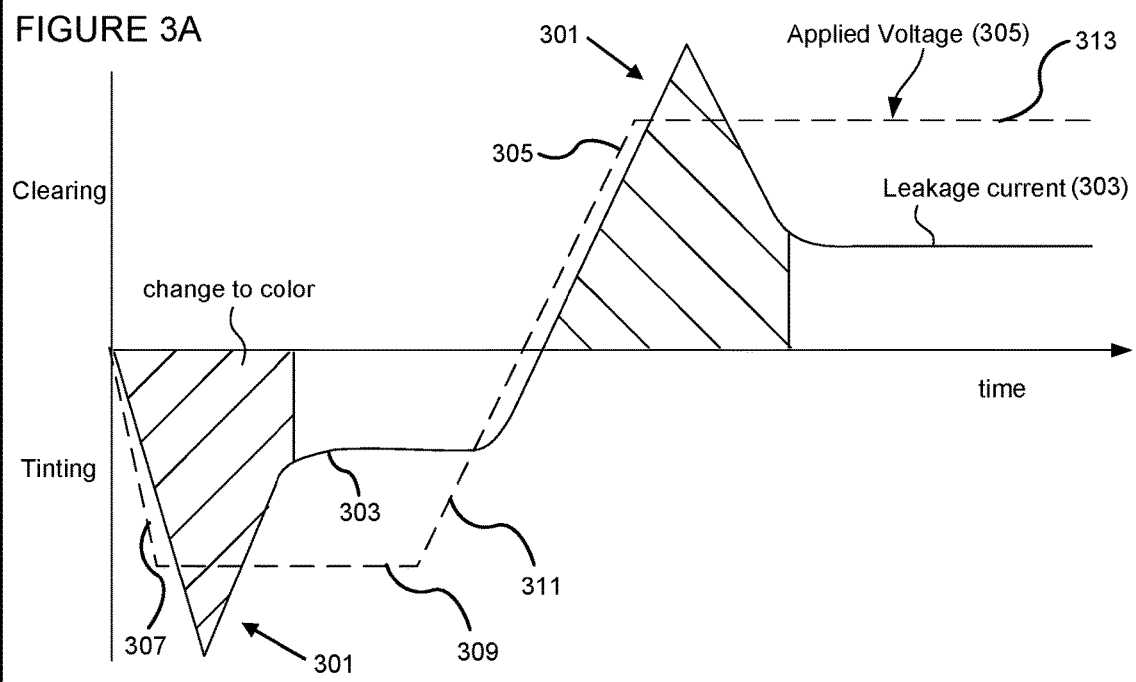
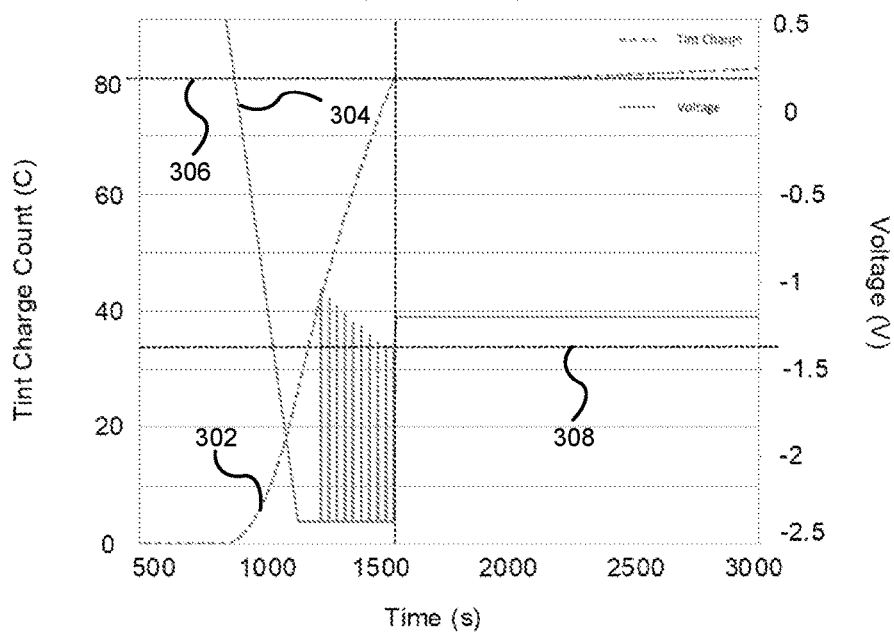

FAILURE PREDICTION OF AT LEAST ONE TINTABLE WINDOW

RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Some tintable windows can be electronically controlled. Such control may allow control of the amount of light (e.g., heat) that passes through the windows, presenting an opportunity for tintable windows to be used as energy-saving devices by adjusting (e.g., absorbing, dispersing, and/or reflecting) incident light. There are various types of tintable windows, e.g., electrochromic windows.

Electrochromism is a phenomenon in which a material exhibits a reversible electrochemically-mediated change in an optical property when the material is placed in a different electronic state, e.g., by being subjected to a voltage change. The optical property can be color, transmittance, absorbance, and/or reflectance. Electrochromic materials may be incorporated into, for example, windows for home, commercial, industrial, and/or other uses. The electrochromic coating can be a (e.g., thin) film coating on the windowpane. The color, transmittance, absorbance, and/or reflectance of such windows may be changed by inducing a change in the electrochromic material. For example, electrochromic windows are windows that can be darkened or lightened electronically. In some embodiments, a (e.g., small) voltage applied to an electrochromic device (EC) of the window will cause the EC to darken; reversing the voltage polarity causes the EC to lighten. While electrochromism was discovered in the 1960's, electrochromic devices, and particularly electrochromic windows, still suffer various problems and have not begun to realize their full commercial potential despite many recent advancements in electrochromic technology, apparatus, software, and related methods of making and/or using electrochromic devices. Other methodologies for effectuating tint change in a tintable window are available (e.g., as disclosed herein).

Malfunction of tintable window may become noticeable and affect the visual and/or functionality of the window. Identification, maintenance and/or replacement of tintable windows and associated equipment (e.g., controllers) can be an expensive, time consuming, labor intensive, and/or logistic undertaking. This becomes especially so in large facilities having multiple tintable windows. In order to reduce the burden on occupants of facilities having a malfunctioning tintable window, a provider of the tintable window may want to reduce any time required to maintain and/or replace a (e.g., potentially) malfunctioning window, especially when the window to be replaced is absent from an inventory and thus must be manufactured, which may considerably delay the replacement process.

Identification of (e.g., potentially) malfunctioning windows ahead of time may be advantageous. Similarly, at least partially automating the process of identifying any (e.g., potentially) malfunctioning window may be advantageous. The advantages may include affording at least some relief to such maintenance and/or replacement tasks. For example, it may (i) provide an opportunity to replace a malfunctioning window before it becomes visibly malfunctioning, (ii) ensure an inventory of potentially malfunctioning window (e.g., such that when they malfunction, they will be available for replacement), (iii) provide a time cushion to coordinate and execute the maintenance and/or replacement process of the windows, and/or (iv) provide an opportunity to execute corrective measures proactively before the window (e.g., visibly) malfunctions (and/or deteriorates).

SUMMARY

Various aspects disclosed herein alleviate at least part of the above referenced shortcomings.

For example, data from a tintable window controller system is used in conjunction with a learning module (e.g., comprising artificial intelligence (AI) and/or Machine Learning) to predict and/or identify tintable window malfunctions. Such data (e.g., from the control system) can be accumulated in one or more databases. The data accumulated may be collected during the regular course of tintable window operation. The data may be associated with the regular course of tintable window operation (e.g., current and/or voltage data associated with altering and/or maintaining a tint of the tintable window(s)). The data can be voluminous (e.g., as accumulated over a period and/or for a plurality of tintable windows). A framework may be configured to retrieve the accumulated data from one or more databases, aggregate the data, and use the data to assess maintenance (e.g., including failure) for any tintable window, e.g., by analyzing one or more failure signatures. The one or more failure signatures can be identified using statistical measurements obtained by regular operation of the tintable window(s) (e.g., current and/or voltage measurements).

In another aspect, a method of predicting a tintable window failure in a facility, the method comprises: (a) acquiring one or more measurements relating to a tint transition of the tintable window that is disposed in the facility, wherein the tint transition is from a first tint to a second tint; (b) analyzing the one or more measurements acquired by considering data that (i) correlates to a type of the one or more measurements, (ii) correlates to the tint transition from the first tint to the second tint, and (iii) is characteristic of an incomplete tint transition, and/or is an uncharacteristic tint transition from the first tint to the second tint; and (c) using the analysis to predict a failure in tinting of the tintable window.

In some embodiments, the first tint is lighter than the second tint. In some embodiments, the first tint is darker than the second tint. In some embodiments, the first tint is a transparent or an absorbent tint with respect to a visible spectrum. In some embodiments, the second tint is a transparent or an absorbent tint with respect to a visible spectrum. In some embodiments, the tint transition comprises a complete tint transition from the first tint to the second tint. In some embodiments, the complete tint transition is devoid of any detectable interruption. In some embodiments, the method further comprises considering data that is characteristic of the complete and/or characteristic tint transition from the first tint to the second tint. In some embodiments, the data comprises (A) data of the complete and/or characteristic tint transition or (B) the characteristic of the incomplete tint transition and/or the uncharacteristic tint transition. In some embodiments, the one or more measurements include a voltage and/or current measurement. In some embodiments, the current measurement is taken in real time during the tint transition. In some embodiments, the one or more measurements comprise an open-circuit voltage measurement. In some embodiments, the one or more measurements comprise one or more measurements from at least one sensor. In some embodiments, the at least one sensor is disposed in the facility. In some embodiments, the at least one sensor is disposed externally to the facility. In some embodiments, the at least one sensor comprises a sensor configured to sense electromagnetic radiation. In some embodiments, the electromagnetic radiation comprises an infrared radiation, or a visible radiation which is visible to an average user. In some embodiments, the at least one sensor comprises a temperature sensor. In some embodiments, the at least one sensor comprises a thermocouple, an infrared sensor, or a pyranometer. In some embodiments, the at least one sensor comprises a light sensor. In some embodiments, the at least one sensor comprises an irradiance sensor. In some embodiments, the at least one sensor comprises the tintable window. In some embodiments, the at least one sensor comprises an acoustic, motion, vibration, temperature, and/or electromagnetic sensor. In some embodiments, the method further comprises using the analysis to determine a reliability value for the at least one sensor. In some embodiments, the method further comprises using the reliability value to adjust the one or more measurements of the at least one sensor to form one or more adjusted sensor measurements. In some embodiments, the method further comprises updating the reliability value using the one or more adjusted sensor measurements. In some embodiments, the method further comprises processing the one or more adjusted sensor measurements by considering (A) the facility, (B) historical sensor measurement, (C) sensor measurement benchmark, and/or (D) modeling, to produce a result. In some embodiments, the method further comprises using the result and/or the reliability value to generate a prediction of a subsequent tintable window failure for the facility. In some embodiments, the one or more measurements comprise a time of a measurement, an identification of the tintable window, or a location of the tintable window. In some embodiments, the tintable window comprises an electrochromic construct, and wherein the one or more measurements relate to a current transmitted through the electrochromic construct. In some embodiments, the one or more measurements comprise an open circuit voltage measurement. In some embodiments, the method further comprises performing the open circuit voltage measurement during the ramp and/or during the hold. In some embodiments, the tint transition is effectuated by a voltage and/or a current having a ramp and/or a hold. In some embodiments, the tint transition is effectuated by a voltage and/or a current having a plurality of ramps and/or a plurality of holds. In some embodiments, at least one of the plurality of holds is above a level considered safe for continuous operation of the tintable window. In some embodiments, the tintable window is disposed inside a building of the facility. In some embodiments, the tintable window is disposed at an envelope of a building of the facility. In some embodiments, the incomplete tint transition and/or the uncharacteristic tint transition is of a type having at least one identifiable data signature. In some embodiments, the data comprises historical data and/or synthesized data. In some embodiments, the data comprises data acquired from the facility. In some embodiments, the data comprises data acquired from a different facility than the facility. In some embodiments, the tintable window is disposed in a building of the facility, and wherein the data comprises data acquired from the building. In some embodiments, the tintable window is disposed in a building of the facility, and wherein the data comprises data acquired from a different building than the building. In some embodiments, the tintable window is of dimensions, and wherein the correlation data correlates to one or more measurements taken from one or more different windows having the dimensions, or substantially having the dimensions. In some embodiments, the data comprises data acquired over at least about 10, 50, 100, or 1,000 occurrences of the tint transition. In some embodiments, the data comprises data acquired over at least about 12, 25, 52, 104, or 156 weeks. In some embodiments, the data is analyzed using machine learning. In some embodiments, the machine learning utilizes a plurality of modules. In some embodiments, at least two of the plurality of modules receive the same weight in the machine learning analysis. In some embodiments, at least two of the plurality of modules receive different weights in the machine learning analysis. In some embodiments, the machine learning comprises deep learning. In some embodiments, the machine learning is devoid of deep learning. In some embodiments, a learning set utilized for the machine learning comprises historical data and/or synthesized data. In some embodiments, analyzing the one or more measurements comprises a comparison to a threshold. In some embodiments, the threshold comprises a value or a function. In some embodiments, the function is a time dependent function. In some embodiments, the machine learning comprises utilizing a learning set. In some embodiments, the learning set comprises one or more historical measurements acquired over time. In some embodiments, the time is adjustable. In some embodiments, adjustable is by a user. In some embodiments, analyzing the one or more measurements comprises performing one or more mathematical manipulations. In some embodiments, the one or more mathematical manipulations comprise Boolean operations. In some embodiments, the one or more mathematical manipulations comprise at least one derivation or at least one integration. In some embodiments, the machine learning comprises a neural network analysis and/or a visual analysis. In some embodiments, analyzing the one or more measurements comprises any data signature specific to the facility, to a window type for the tintable window, to a weather condition, to a time of day, to a time of year, to a relative geographical location of the tintable window in the facility, and/or to a geographic location of the facility. In some embodiments, the data comprises one or more measurements of the same type as the one or more measurements acquired in (a). In some embodiments, the data comprise transitions from the first tint to the second tint. In some embodiments, the incomplete tin transition and/or the uncharacteristic tint transition is a tint transition of a faulty tintable window. In some embodiments, using the analysis comprises providing an alert and/or a report of a failure of the tintable window. In some embodiments, providing the alert and/or the report comprises predicting a time of a visible failure that is visible to an average person. In some embodiments, providing the alert and/or the report comprises scheduling maintenance. In some embodiments, the tintable window is a first tintable window, and wherein providing the alert and/or the report includes scheduling inventory and/or scheduling production, of another tintable window to replace the first tintable window. In some embodiments, the prediction of the failure is before any defective tint transition is visible to an average person. In some embodiments, the analysis predicts a failure in tinting of the tintable window. In some embodiments, the method further comprises adjusting a control scheme to facilitate the tint transition by the tintable window.

In another aspect, a non-transitory computer readable program instructions for predicting a tintable window failure in a facility, which non-transitory computer readable program instructions, when executed by one or more processors, cause the one or more processors to execute, or direct execution of, one or more operations of any of the methods disclosed above.

In some embodiments, the at least one processor is part of a hierarchal control system. In some embodiments, the at least one processor is, comprises, or is comprised in, at least one controller. In some embodiments, at least two of the operations are performed by the same processor. In some embodiments, at least two of the operations are each performed by a different processor. In some embodiments, at least one processor of the one or more processors is disposed in a cloud device. In some embodiments, the program instructions are inscribed on a non-transitory computer readable medium or media.

In another aspect, a non-transitory computer readable program instructions for predicting a tintable window failure in a facility, which non-transitory computer readable program instructions, when executed by one or more processors, cause the one or more processors to execute operations comprising: (a) acquiring, or directing acquisition of, one or more measurements relating to a tint transition of the tintable window that is disposed in the facility, wherein the tint transition is from a first tint to a second tint; (b) analyzing, or directing analysis of, the one or more measurements acquired by considering data that (i) correlates to a type of the one or more measurements, (ii) correlates to the tint transition from the first tint to the second tint, and (iii) is characteristic of an incomplete tint transition and/or an uncharacteristic tint transition from the first tint to the second tint; and (c) using, or directing usage of, the analysis to predict a failure in tinting of the tintable window.

In another aspect, an apparatus for predicting a tintable window failure in a facility, the apparatus comprises at least one controller, which at least one controller is configured to execute, or direct execution of, one or more operations of any of the methods disclosed above.

In another aspect, an apparatus for predicting a tintable window failure in a facility, the apparatus comprises at least one controller, which at least one controller is configured to: (a) acquire, or direct acquisition of, one or more measurements relating to a tint transition of the tintable window that is disposed in the facility, wherein the tint transition is from a first tint to a second tint; (b) analyze, or direct analysis of, the one or more measurements acquired by considering data that (i) correlates to a type of the one or more measurements, (ii) correlates to the tint transition from the first tint to the second tint, and (iii) is characteristic of an incomplete tint transition and/or an uncharacteristic tint transition from the first tint to the second tint; and (c) use, or direct usage of, the analysis to predict a failure in tinting of the tintable window.

In some embodiments, the at least one controller is included in a hierarchical control system. In some embodiments, the at least one controller is configured to include a feedback control scheme. In some embodiments, the at least one controller comprises a local controller that is configured to directly couple to the tintable window. In some embodiments, directly couple comprises utilizing an uninterrupted wiring from the local controller to the tintable window. In some embodiments, uninterrupted is uninterrupted by circuitry. In some embodiments, at least one controller comprises circuitry. In some embodiments, the circuitry comprises a computer readable program instructions storing control logic and data. In some embodiments, the at least one controller comprises circuitry. In some embodiments, the apparatus further comprises a processor in communication with, or incorporating, the computer readable program instructions. In some embodiments, the at least one controller is configured to (i) operatively couple to at least one sensor, and (ii) direct the at least one sensor to acquire the one or more measurements relating to the tint transition of the tintable window. In some embodiments, the at least one controller is configured to execute, or direct execution of, a feedback control scheme that utilizes the at least one sensor. In some embodiments, the at least one controller is configured to alter tint of the tintable window by using, or directing usage of, the feedback control scheme. In some embodiments, the first tint is lighter than the second tint. In some embodiments, the first tint is darker than the second tint. In some embodiments, the first tint is a transparent or an absorbent tint with respect to a visible spectrum. In some embodiments, the second tint is a transparent or an absorbent tint with respect to a visible spectrum. In some embodiments, the tint transition comprises a complete tint transition from the first tint to the second tint. In some embodiments, the complete tint transition is devoid of any detectable interruption. In some embodiments, the at least one controller is configured to consider, or direct consideration of, data that is indicative of the complete and/or characteristic transition from the first tint to the second tint. In some embodiments, the data comprises (A) data of the complete and/or characteristic tint transition or (B) the characteristic of the incomplete tint transition and/or the uncharacteristic tint transition. In some embodiments, the at least one controller is configured to perform, or direct performance of, the one or more measurements including a voltage measurement and/or a current measurement. In some embodiments, the at least one controller is configured to perform, or direct performance of, the current measurement in real time during the tint transition. In some embodiments, the one or more measurements comprise an open-circuit voltage measurement. In some embodiments, the one or more measurements comprise one or more measurements from at least one sensor. In some embodiments, the at least one sensor is disposed in the facility. In some embodiments, the at least one sensor is disposed externally to the facility. In some embodiments, the at least one sensor comprises a sensor configured to sense electromagnetic radiation. In some embodiments, the electromagnetic radiation comprises an infrared radiation, or a visible radiation which is visible to an average user. In some embodiments, the at least one sensor comprises a temperature sensor. In some embodiments, the at least one sensor comprises a thermocouple, an infrared sensor, or a pyranometer. In some embodiments, the at least one sensor comprises a light sensor. In some embodiments, the at least one sensor comprises an irradiance sensor. In some embodiments, the at least one sensor comprises the tintable window. In some embodiments, the at least one sensor comprises an acoustic, motion, vibration, temperature, and/or electromagnetic sensor. In some embodiments, the at least one controller is configured to use, or direct usage of, the analysis to determine a reliability value for the at least one sensor. In some embodiments, the at least one controller is further configured to use, or direct usage of, the reliability value to adjust the one or more measurements of the at least one sensor to form one or more adjusted sensor measurements. In some embodiments, the at least one controller is further configured to update, or direct updating of, the reliability value using the one or more adjusted sensor measurements. In some embodiments, the at least one controller is further configured to process, or direct processing of, the one or more adjusted sensor measurements by considering (A) the facility, (B) historical sensor measurement, (C) sensor measurement benchmark, and/or (D) modeling, to produce a result. In some embodiments, the at least one controller is further configured to use, or direct usage of, the result and/or the reliability value to generate a prediction of a subsequent tintable window failure for the facility. In some embodiments, the one or more measurements comprise a time of a measurement, an identification of the tintable window, or a location of the tintable window. In some embodiments, the tintable window comprises an electrochromic construct, and wherein the one or more measurements relate to a current transmitted through the electrochromic construct. In some embodiments, the one or more measurements include a voltage and/or a current measurement. In some embodiments, the one or more measurements comprise an open circuit voltage measurement. In some embodiments, the at least one controller is configured to perform, or direct performance of, the open circuit voltage measurement during the ramp and/or during the hold. In some embodiments, the tint transition is effectuated by a voltage and/or a current having a ramp and/or a hold. In some embodiments, the tint transition is effectuated by a voltage and/or a current having a plurality of ramps and/or a plurality of holds. In some embodiments, at least one of the plurality of holds is above a level considered safe for continuous operation of the tintable window. In some embodiments, the tintable window is disposed inside a building of the facility. In some embodiments, the tintable window is disposed at an envelope of a building of the facility. In some embodiments, the incomplete tint transition and/or the uncharacteristic tint transition is of a type having at least one identifiable data signature. In some embodiments, the data comprises historical data and/or synthesized data. In some embodiments, the data comprises data acquired from the facility. In some embodiments, the data comprises data acquired from a different facility than the facility. In some embodiments, the tintable window is disposed in a building of the facility, and wherein the data comprises data acquired from the building. In some embodiments, the tintable window is disposed in a building of the facility, and wherein the data comprises data acquired from a different building than the building. In some embodiments, the tintable window is of dimensions, and wherein the correlation data correlates to one or more measurements taken from one or more different windows having the dimensions, or substantially having the dimensions. In some embodiments, the data comprises data acquired over at least about 10, 50, 100, or 1,000 occurrences of the tint transition. In some embodiments, the data comprises data acquired over at least about 12, 25, 52, 104, or 156 weeks. In some embodiments, the at least one controller is configured to analyze, or direct analysis of, the data using machine learning analysis. In some embodiments, the machine learning analysis utilizes a plurality of modules. In some embodiments, at least two of the plurality of modules receive the same weight in the machine learning analysis. In some embodiments, at least two of the plurality of modules receive different weights in the machine learning analysis. In some embodiments, the machine learning analysis comprises deep learning. In some embodiments, the machine learning analysis is devoid of deep learning. In some embodiments, the at least one controller is configured to use, or direct usage of, a learning set for the machine learning analysis. In some embodiments, the learning set comprises historical data and/or synthesized data. In some embodiments, the at least one controller is configured to analyze, or direct analysis of, the one or more measurements by comparing the one or more measurements to a threshold. In some embodiments, the threshold comprises a value or a function. In some embodiments, the function is a time dependent function. In some embodiments, the at least one controller is configured to perform, or direct performance of, machine learning by utilizing a learning set. In some embodiments, the learning set comprises one or more historical measurements acquired over time. In some embodiments, the time is adjustable. In some embodiments, adjustable is by a user. In some embodiments, the at least one controller is configured to analyze, or direct analysis of, the one or more measurements by performing one or more mathematical manipulations. In some embodiments, the one or more mathematical manipulations comprise Boolean operations. In some embodiments, the one or more mathematical manipulations comprise at least one derivation or at least one integration. In some embodiments, the at least one controller is configured to perform, or direct performance of, machine learning by using a neural network analysis and/or a visual analysis. In some embodiments, the at least one controller is configured to analyze, or direct analysis of, the one or more measurements by using: any data signature specific to the facility, a window type for the tintable window, a weather condition, a time of day, a time of year, a relative geographical location of the tintable window in the facility, and/or a geographic location of the facility. In some embodiments, the data comprises one or more measurements of the same type as the one or more measurements acquired in (a). In some embodiments, the data comprise transitions from the first tint to the second tint. In some embodiments, the incomplete tint transition and/or the uncharacteristic tint transition is a tint transition of a faulty tintable window. In some embodiments, the at least one controller is configured to use, or direct usage of, the analysis by providing an alert and/or a report of a failure of the tintable window. In some embodiments, providing the alert and/or the report comprises predicting a time of a visible failure that is visible to an average person. In some embodiments, providing the alert and/or the report comprises scheduling maintenance. In some embodiments, the tintable window is a first tintable window, and wherein providing the alert and/or the report includes scheduling inventory and/or scheduling production, of another tintable window to replace the first tintable window. In some embodiments, the at least one controller is configured to predict, or direct prediction of, the failure before any defective tint transition is visible to an average person. In some embodiments, the at least one controller is configured to predict, or direct prediction of, the failure in tinting of the tintable window, at least in part by adjusting a control scheme to facilitate the tint transition of the tintable window.

In another aspect, a system for predicting a tintable window failure in a facility, the system comprises: a network configured to: (I) operatively couple to the tintable window of the facility; and (II) transmit one or more signals associated with any of the methods disclosed above.

In another aspect, a system for predicting a tintable window failure in a facility, the system comprises: a network configured to: (a) transmit one or more measurements relating to a tint transition of the tintable window that is disposed in the facility, wherein the tint transition is from a first tint to a second tint; (b) transmit an analysis of the one or more measurements, wherein the considers data that (i) correlates to a type of the one or more measurements, (ii) correlates to the tint transition from the first tint to the second tint, and (iii) is characteristic of an incomplete tint transition, and/or is an uncharacteristic tint transition from the first tint to the second tint; and (c) transmit an indication of a predicted failure in tinting of the tintable window, wherein the prediction is made using the analysis.

In some embodiments, the network is configured to utilize a single cable to transmit power and communication. In some embodiments, the network is configured to transmit signals abiding by multiple wireless communication protocols. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the network is configured to transmit signals abiding by a building control protocol.

In another aspect, an apparatus for predicting a tintable window failure in a facility, the apparatus comprises: device ensemble of the facility, the device ensemble comprising one or more devices disposed in a housing, the one or more devices comprises a sensor configured to (A) measure an environment of the facility and (B) output sensor measurements, the sensor measurements configured for utilization in any of the methods disclosed above.

In another aspect, an apparatus for predicting a tintable window failure in a facility, the apparatus comprises: a device ensemble of the facility, the device ensemble comprising sensors disposed in a housing, the sensors configured to (A) measure an environment of the facility and (B) output sensor measurements, the sensor measurements configured for utilization in determining one or more outputs including: (a) an analysis of one or more measurements relating to a tint transition of the tintable window that is disposed in the facility, wherein the tint transition is from a first tint to a second tint, wherein the analysis is made by considering data that (i) correlates to a type of the one or more measurements, (ii) correlates to the tint transition from the first tint to the second tint, and (iii) is characteristic of an incomplete tint transition, and/or is an uncharacteristic tint transition from the first tint to the second tint; and (b) a prediction of a failure in tinting of the tintable window, wherein the prediction is made using the analysis.

In some embodiments, the sensors of the device ensemble comprises different types of sensors. In some embodiments, the sensors comprise: a carbon dioxide sensor, a carbon monoxide sensor, a volatile organic chemical sensor, an ambient noise sensor, a visible light sensor, a temperature sensor, a motion sensor, or a humidity sensor. In some embodiments, the device ensemble comprises an emitter or a transceiver. In some embodiments, the device ensemble is configured to facilitate control of the facility, and optionally wherein control of the facility comprises control of an environment, security, data, or health associated with the facility. In some embodiments, the device ensemble is disposed in a fixture of the facility, or is attached to a fixture of the facility. In some embodiments, the fixture comprises a framing portion. In some embodiments, the network is operatively coupled to, and facilitates control of, at least one a tintable window. In some embodiments, the tintable window comprises an electrochromic window. In some embodiments, the network is operatively coupled to, and facilitates control of, at least one other device of the facility. In some embodiments, the at least one other device of the facility is configured to alter an environment of the facility. In some embodiments, the at least one other device of the facility comprises a cooler, heater, tintable window, heating cooling and air conditioning (HVAC) system, or lighting. In some embodiments, the at least one other device of the facility is configured to control energy expenditure of the facility.

In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, the present disclosure provides systems, apparatuses (e.g., controllers), and/or non-transitory computer-readable medium or media (e.g., software) that implement any of the methods disclosed herein.

In another aspect, the present disclosure provides methods that use any of the systems, computer readable media, and/or apparatuses disclosed herein, e.g., for their intended purpose.

In another aspect, an apparatus comprises at least one controller that is programmed to direct a mechanism used to implement (e.g., effectuate) any of the method disclosed herein, which at least one controller is configured to operatively couple to the mechanism. In some embodiments, at least two operations (e.g., of the method) are directed/executed by the same controller. In some embodiments, at less at two operations are directed/executed by different controllers.

In another aspect, an apparatus comprises at least one controller that is configured (e.g., programmed) to implement (e.g., effectuate) any of the methods disclosed herein. The at least one controller may implement any of the methods disclosed herein. In some embodiments, at least two operations (e.g., of the method) are directed/executed by the same controller. In some embodiments, at less at two operations are directed/executed by different controllers.

In some embodiments, one controller of the at least one controller is configured to perform two or more operations. In some embodiments, two different controllers of the at least one controller are configured to each perform a different operation.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may be configured to direct any apparatus (or component thereof) disclosed herein. The at least one controller may be configured to operatively couple to any apparatus (or component thereof) disclosed herein. In some embodiments, at least two operations (e.g., of the apparatus) are directed by the same controller. In some embodiments, at less at two operations are directed by different controllers.

In another aspect, a computer software product (e.g., inscribed on one or more non-transitory medium) in which program instructions are stored, which instructions, when read by at least one processor (e.g., computer), cause the at least one processor to direct a mechanism disclosed herein to implement (e.g., effectuate) any of the method disclosed herein, wherein the at least one processor is configured to operatively couple to the mechanism. The mechanism can comprise any apparatus (or any component thereof) disclosed herein. In some embodiments, at least two operations (e.g., of the apparatus) are directed/executed by the same processor. In some embodiments, at less at two operations are directed/executed by different processors.

In another aspect, the present disclosure provides a non-transitory computer-readable program instructions (e.g., included in a program product comprising one or more non-transitory medium) comprising machine-executable code that, upon execution by one or more processors, implements any of the methods disclosed herein. In some embodiments, at least two operations (e.g., of the method) are directed/executed by the same processor. In some embodiments, at less at two operations are directed/executed by different processors.

In another aspect, the present disclosure provides a non-transitory computer-readable medium or media comprising machine-executable code that, upon execution by one or more processors, effectuates directions of the controller(s) (e.g., as disclosed herein). In some embodiments, at least two operations (e.g., of the controller) are directed/executed by the same processor. In some embodiments, at less at two operations are directed/executed by different processors.

In another aspect, the present disclosure provides a computer system comprising one or more computer processors and a non-transitory computer-readable medium or media coupled thereto. The non-transitory computer-readable medium comprises machine-executable code that, upon execution by the one or more processors, implements any of the methods disclosed herein and/or effectuates directions of the controller(s) disclosed herein.

In another aspect, the present disclosure provides a non-transitory computer readable program instructions that, when read by one or more processors, causes the one or more processors to execute any operation of the methods disclosed herein, any operation performed (or configured to be performed) by the apparatuses disclosed herein, and/or any operation directed (or configured to be directed) by the apparatuses disclosed herein.

In some embodiments, the program instructions are inscribed in a non-transitory computer readable medium or media. In some embodiments, at least two of the operations are executed by one of the one or more processors. In some embodiments, at least two of the operations are each executed by different processors of the one or more processors.

In another aspect, the present disclosure provides networks that are configured for transmission of any communication (e.g., signal) and/or (e.g., electrical) power facilitating any of the operations disclosed herein. The communication may comprise control communication, cellular communication, media communication, and/or data communication. The data communication may comprise sensor data communication and/or processed data communication. The networks may be configured to abide by one or more protocols facilitating such communication. For example, a communications protocol used by the network (e.g., with a BMS) can be a building automation and control networks protocol (BACnet). For example, a communication protocol may facilitate cellular communication abiding by at least a $2^{nd}$, $3^{rd}$, $4^{th}$, or $5^{th}$ generation cellular communication protocol.

The content of this summary section is provided as a simplified introduction to the disclosure and is not intended to be used to limit the scope of any invention disclosed herein or the scope of the appended claims.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also referred to as "FIG." and "FIGS." herein), of which:

FIG. 3A is a graph showing a current profile for an electrochromic window employing a simple voltage control algorithm to cause an optical state transition (e.g., tinting) of an electrochromic device;

FIG. 3B is a graph depicting a total charge delivered over time and an applied voltage over time during an electrochromic tinting transition;

Figures 1A, 1B:
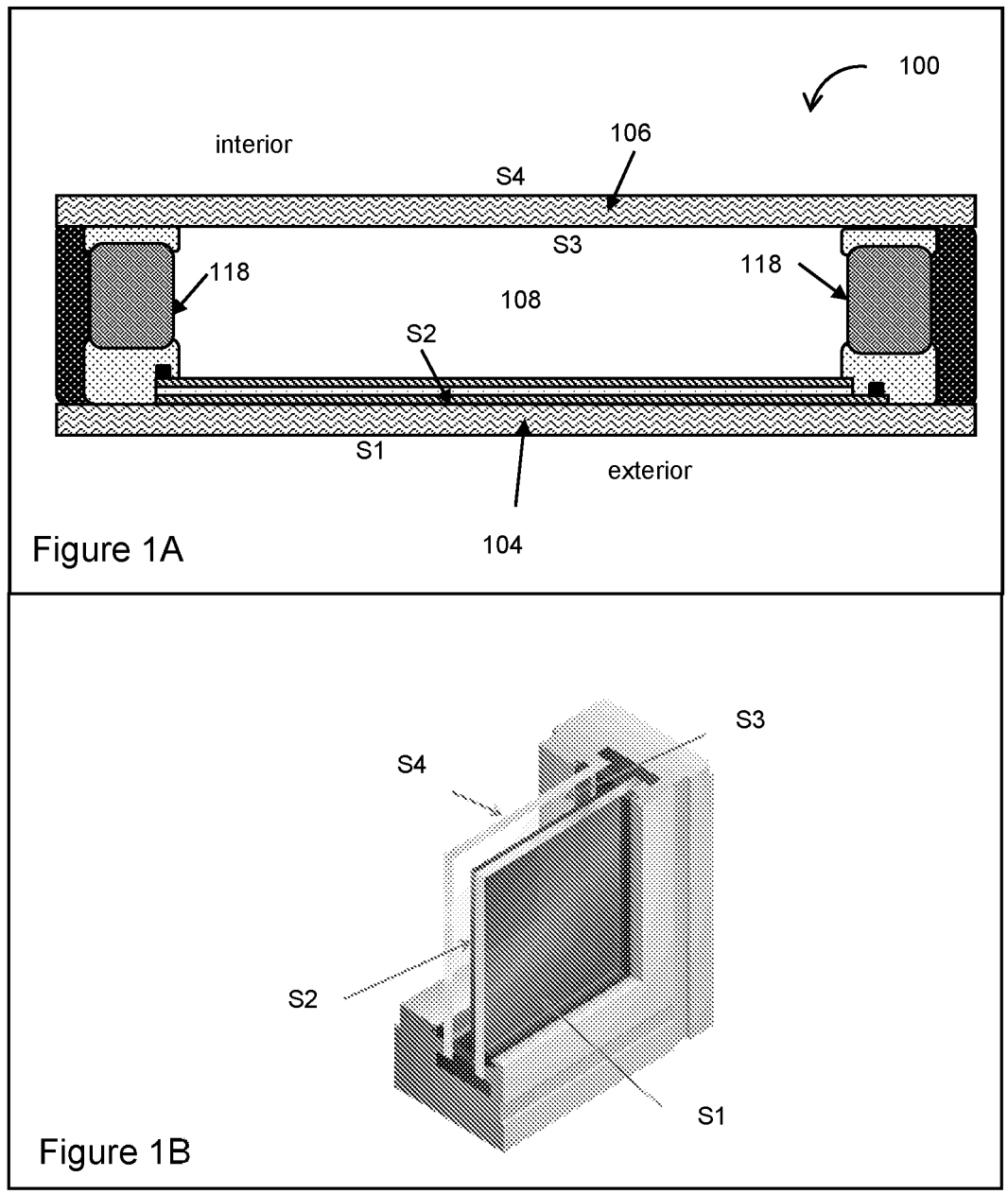
FIG. 1A shows a cross-sectional side view of a tintable window constructed as an insulated glass unit (IGU)
FIG. 1B shows a perspective sectional view of a corner portion of an integrated glass unit (IGU)

The figures and components therein may not be drawn to scale. Various components of the figures described herein may not be drawn to scale.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

As used herein, including in the claims, the conjunction "and/or" in a phrase such as "including X, Y, and/or Z", refers to in inclusion of any combination or plurality of X, Y, and Z. For example, such phrase is meant to include X. For example, such phrase is meant to include Y. For example, such phrase is meant to include Z. For example, such phrase is meant to include X and Y. For example, such phrase is meant to include X and Z. For example, such phrase is meant to include Y and Z. For example, such phrase is meant to include a plurality of Xs. For example, such phrase is meant to include a plurality of Ys. For example, such phrase is meant to include a plurality of Zs. For example, such phrase is meant to include a plurality of Xs and a plurality of Ys. For example, such phrase is meant to include a plurality of Xs and a plurality of Zs. For example, such phrase is meant to include a plurality of Ys and a plurality of Zs. For example, such phrase is meant to include a plurality of Xs and Y. For example, such phrase is meant to include a plurality of Xs and Z. For example, such phrase is meant to include a plurality of Ys and Z. For example, such phrase is meant to include X and a plurality of Ys. For example, such phrase is meant to include X and a plurality of Zs. For example, such phrase is meant to include Y and a plurality of Zs. The conjunction "and/or" is meant to have the same effect as the phrase "X, Y, Z, or any combination or plurality thereof." The conjunction "and/or" is meant to have the same effect as the phrase "one or more of X, Y, Z, and any combination thereof."

The term "operatively coupled" or "operatively connected" refers to a first element (e.g., mechanism) that is coupled (e.g., connected) to a second element, to allow the intended operation of the second and/or first element. The coupling may comprise physical or non-physical coupling (e.g., communicative coupling). The non-physical coupling may comprise signal-induced coupling (e.g., wireless coupling). Coupled can include physical coupling (e.g., physically connected), or non-physical coupling (e.g., via wireless communication). Operatively coupled may comprise communicatively coupled.

An element (e.g., mechanism) that is "configured to" perform a function includes a structural feature that causes the element to perform this function. A structural feature may include an electrical feature, such as a circuitry or a circuit element. A structural feature may include an actuator. A structural feature may include a circuitry (e.g., comprising electrical or optical circuitry). Electrical circuitry may comprise one or more wires. Optical circuitry may comprise at least one optical element (e.g., beam splitter, mirror, lens and/or optical fiber). A structural feature may include a mechanical feature. A mechanical feature may comprise a latch, a spring, a closure, a hinge, a chassis, a support, a fastener, or a cantilever, and so forth. Performing the function may comprise utilizing a logical feature. A logical feature may include programming instructions. Programming instructions may be executable by at least one processor (e.g., see FIG. 7). Programming instructions may be stored or encoded on a medium accessible by one or more processors. Additionally, in the following description, the phrases "operable to," "adapted to," "configured to," "designed to," "programmed to," or "capable of" may be used interchangeably where appropriate.

In some embodiments, sensor data is utilized in conjunction with machine learning (comprising artificial intelligence (AI)), to predict and/or identify malfunctions (e.g., to facilitate predictive maintenance) of tintable windows. A voluminous amount of data (e.g., at least about one million, 10 million, 100 million, or trillion raw data points) may accumulate over time in conjunction with window control and/or operation. Disclosed herein is a framework configured to retrieve data associated with window tint transition (e.g., control data and/or other sensor data) from database(s) (e.g., accumulated during regular operation of the tintable window), aggregate the data, and use the data to assess and/or predict malfunction of windows. Such framework may allow to predictively maintain any window that exhibits a failure signature identified, e.g., using statistical measurements (e.g., of current, voltage, open circuit voltage, or any other sensor measurements as disclosed herein).

In some embodiments, an enclosure comprises an area defined by at least one structure. The at least one structure may comprise at least one wall. An enclosure may comprise and/or enclose one or more sub-enclosures. The at least one wall may comprise metal (e.g., steel), clay, stone, plastic, glass, plaster (e.g., gypsum), polymer (e.g., polyurethane, styrene, or vinyl), asbestos, fiber-glass, concrete (e.g., reinforced concrete), wood, paper, or a ceramic. The at least one wall may comprise wire, bricks, blocks (e.g., cinder blocks), tile, drywall, or frame (e.g., steel frame).

In some embodiments, the enclosure comprises one or more openings. The one or more openings may be reversibly closable. The one or more openings may be permanently open. A fundamental length scale of the one or more openings may be smaller relative to the fundamental length scale of the wall(s) that define the enclosure. A fundamental length scale may comprise a diameter of a bounding circle, a length, a width, or a height. A surface of the one or more openings may be smaller relative to the surface the wall(s) that define the enclosure. The opening surface may be a percentage of the total surface of the wall(s). For example, the opening surface can measure at most about 30%, 20%, 10%, 5%, or 1% of the walls(s). The wall(s) may comprise a floor, a ceiling, or a side wall. The closable opening may be closed by at least one window or door. The enclosure may be at least a portion of a facility. The facility may comprise a building. The enclosure may comprise at least a portion of a building. The building may be a private building and/or a commercial building. The building may comprise one or more floors. The building (e.g., floor thereof) may include at least one of: a room, hall, foyer, attic, basement, balcony (e.g., inner or outer balcony), stairwell, corridor, elevator shaft, façade, mezzanine, penthouse, garage, porch (e.g., enclosed porch), terrace (e.g., enclosed terrace), cafeteria, and/or Duct. In some embodiments, an enclosure may be stationary and/or movable (e.g., a train, an air-plane, a ship, a vehicle, or a rocket).

In some embodiments, a plurality of devices may be operatively (e.g., communicatively) coupled to the control system. The plurality of devices may be disposed in a facility (e.g., including a building and/or room). The control system may comprise the hierarchy of controllers. The devices may comprise an emitter, a sensor, or a window (e.g., IGU). The device may be any device as disclosed herein. At least two of the plurality of devices may be of the same type. For example, two or more IGUs may be coupled to the control system. At least two of the plurality of devices may be of different types. For example, a sensor and an emitter may be coupled to the control system. At times the plurality of devices may comprise at least 20, 50, 100, 500, 1000, 2500, 5000, 7500, 10000, 50000, 100000, or 500000 devices. The plurality of devices may be of any number between the aforementioned numbers (e.g., from 20 devices to 500000 devices, from 20 devices to 50 devices, from 50 devices to 500 devices, from 500 devices to 2500 devices, from 1000 devices to 5000 devices, from 5000 devices to 10000 devices, from 10000 devices to 100000 devices, or from 100000 devices to 500000 devices). For example, the number of windows in a floor may be at least 5, 10, 15, 25, 30, 40, or 50. The number of windows in a floor can be any number between the aforementioned numbers (e.g., from 5 to 50, from 5 to 25, or from 25 to 50). At times the devices may be in a multi-story building. At least a portion of the floors of the multi-story building may have devices controlled by the control system (e.g., at least a portion of the floors of the multi-story building may be controlled by the control system). For example, the multi-story building may have at least 2, 8, 10, 25, 50, 80, 100, 120, 140, or 160 floors that are controlled by the control system. The number of floors (e.g., devices therein) controlled by the control system may be any number between the aforementioned numbers (e.g., from 2 to 50, from 25 to 100, or from 80 to 160). The floor may be of an area of at least about 150 m$^2$, 250 m$^2$, 500 m$^2$, 1000 m$^2$, 1500 m 2, or 2000 square meters (m$^2$). The floor may have an area between any of the aforementioned floor area values (e.g., from about 150 m$^2$ to about 2000 m$^2$, from about 150 m$^2$ to about 500 m$^2$ from about 250 m$^2$ to about 1000 m$^2$, or from about 1000 m$^2$ to about 2000 m$^2$). The building may comprise an area of at least about 1000 square feet (sqft), 2000 sqft, 5000 sqft, 10000 sqft, 100000 sqft, 150000 sqft, 200000 sqft, or 500000 sqft. The building may comprise an area between any of the above mentioned areas (e.g., from about 1000 sqft to about 5000 sqft, from about 5000 sqft to about 500000 sqft, or from about 1000 sqft to about 500000 sqft). The building may comprise an area of at least about 100 m$^2$, 200 m$^2$, 500 m$^2$, 1000 m$^2$, 5000 m$^2$, 10000 m$^2$, 25000 m$^2$, or 50000 m$^2$. The building may comprise an area between any of the above mentioned areas (e.g., from about 100 m$^2$ to about 1000 m$^2$, from about 500 m$^2$ to about 25000 m$^2$, from about 100 m$^2$ to about 50000 m$^2$). The facility may comprise a commercial or a residential building. The commercial building may include tenant(s) and/or owner(s). The residential facility may comprise a multi or a single family building. The residential facility may comprise an apartment complex. The residential facility may comprise a single family home. The residential facility may comprise multifamily homes (e.g., apartments). The residential facility may comprise townhouses. The facility may comprise residential and commercial portions. The facility may comprise at least about 1, 2, 5, 10, 50, 100, 150, 200, 250, 300, 350, 400, 420, 450, 500, or 550 windows (e.g., tintable windows). The windows may be divided into zones (e.g., based at least in part on the location, façade, floor, ownership, utilization of the enclosure (e.g., room) in which they are disposed, any other assignment metric, random assignment, or any combination thereof. Allocation of windows to the zone may be static or dynamic (e.g., based on a heuristic). There may be at least about 2, 5, 10, 12, 15, 30, 40, or 46 windows per zone.

Certain disclosed embodiments provide a network infrastructure in the enclosure (e.g., a facility such as a building). The network infrastructure is available for various purposes such as for providing communication and/or power services. The network infrastructure may provide direct and/or indirect communication between devices coupled to the network (e.g., tintable windows and/or controllers). The communication services may comprise high bandwidth (e.g., wireless and/or wired) communications services. The communication services can be to occupants of a facility and/or users outside the facility (e.g., building). The network infrastructure may work in concert with, or as a partial replacement of, the infrastructure of one or more cellular carriers. The network infrastructure can be provided in a facility that includes tintable (e.g., electrically switchable, or electronically tintable) windows. Examples of components of the network infrastructure include a high speed backhaul. The network infrastructure may include at least one cable (e.g., coaxial cable, and/or optical wires), switch, physical antenna, transceivers, sensor, transmitter, receiver, radio, processor and/or controller (that may comprise a processor). The network infrastructure may be operatively coupled to, and/or include, a wireless network. The network infrastructure may comprise wiring. One or more sensors can be deployed (e.g., installed) in an environment as part of installing the network and/or after installing the network. The network may be configured for cellular communication, for example, using at least a third (3G), fourth (4G), or fifth (5G) generation communication standard. The network may be configured to transmit power and communication on the same cable (e.g., coaxial cable). The network may be a local network. The network may comprise a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. The communication may comprise media communication facilitating stills, music, or moving picture streams (e.g., movies or videos). The communication may comprise data communication (e.g., sensor data). The communication may comprise control communication, e.g., to control the one or more nodes operatively coupled to the networks. The network may comprise a first (e.g., cabling) network installed in the facility. The network may comprise a (e.g., cabling) network installed in an envelope of the facility (e.g., such as in an envelope of an enclosure of the facility. For example, in an envelope of a building included in the facility).

In another aspect, the present disclosure provides networks that are configured for transmission of any communication (e.g., signal) and/or (e.g., electrical) power facilitating any of the operations disclosed herein. The communication may comprise control communication, cellular communication, media communication, and/or data communication. The data communication may comprise sensor data communication and/or processed data communication. The networks may be configured to abide by one or more protocols facilitating such communication. For example, a communications protocol used by the network (e.g., with a BMS) can comprise a building automation and control networks protocol (BACnet). The network may be configured for (e.g., include hardware facilitating) communication protocols comprising BACnet (e.g., BACnet/SC), LonWorks, Modbus, KNX, European Home Systems Protocol (EHS), BatiBUS, European Installation Bus (EIB or Instabus), zigbee, Z-wave, Insteon, X10, Bluetooth, or WiFi. The network may be configure to transmit the control related protocol. A communication protocol may facilitate cellular communication abiding by at least a $2^{nd}$, $3^{rd}$, $4^{th}$, or $5^{th}$ generation cellular communication protocol. The (e.g., cabling) network may comprise a tree, line, or star topologies. The network may comprise interworking and/or distributed application models for various tasks of the building automation. The control system may provide schemes for configuration and/or management of resources on the network. The network may permit binding of parts of a distributed application in different nodes operatively coupled to the network. The network may provide a communication system with a message protocol and models for the communication stack in each node (capable of hosting distributed applications (e.g., having a common Kernel). The control system may comprise programmable logic controller(s) (PLC(s)).

In various embodiments, a network infrastructure supports a control system for one or more windows such as tintable (e.g., electrochromic) windows. The control system may comprise one or more controllers operatively coupled (e.g., directly or indirectly) to one or more windows. While the disclosed embodiments describe tintable windows (also referred to herein as "optically switchable windows," or "smart windows") such as electrochromic windows, the concepts disclosed herein may apply to other types of switchable optical devices comprising a liquid crystal device, an electrochromic device, suspended particle device (SPD), NanoChromics display (NCD), Organic electroluminescent display (OELD), suspended particle device (SPD), NanoChromics display (NCD), or an Organic electroluminescent display (OELD). The display element may be attached to a part of a transparent body (such as the windows). The tintable window may be disposed in a (non-transitory) facility such as a building, and/or in a transitory facility (e.g., vehicle) such as a car, RV, bus, train, airplane, helicopter, ship, or boat.

In some embodiments, a tintable window exhibits a (e.g., controllable and/or reversible) change in at least one optical property of the window, e.g., when a stimulus is applied. The change may be a continuous change. A change may be to discrete tint levels (e.g., to at least about 2, 4, 8, 16, or 32 tint levels). The optical property may comprise hue, or transmissivity. The hue may comprise color. The transmissivity may be of one or more wavelengths. The wavelengths may comprise ultraviolet, visible, or infrared wavelengths. The stimulus can include an optical, electrical and/or magnetic stimulus. For example, the stimulus can include an applied voltage and/or current. One or more tintable windows can be used to control lighting and/or glare conditions, e.g., by regulating the transmission of solar energy propagating through them. One or more tintable windows can be used to control a temperature within a building, e.g., by regulating the transmission of solar energy propagating through the window. Control of the solar energy may control heat load imposed on the interior of the facility (e.g., building). The control may be manual and/or automatic. The control may be used for maintaining one or more requested (e.g., environmental) conditions, e.g., occupant comfort. The control may include reducing energy consumption of a heating, ventilation, air conditioning and/or lighting systems. At least two of heating, ventilation, and air conditioning may be induced by separate systems. At least two of heating, ventilation, and air conditioning may be induced by one system. The heating, ventilation, and air conditioning may be induced by a single system (abbreviated herein as "HVAC"). In some cases, tintable windows may be responsive to (e.g., and communicatively coupled to) one or more environmental sensors and/or user control. Tintable windows may comprise (e.g., may be) electrochromic windows. The windows may be located in the range from the interior to the exterior of a structure (e.g., facility, e.g., building). However, this need not be the case. Tintable windows may operate using liquid crystal devices, suspended particle devices, microelectromechanical systems (MEMS) devices (such as microshutters), or any technology known now, or later developed, that is configured to control light transmission through a window. Windows (e.g., with MEMS devices for tinting) are described in U.S. Pat. No. 10,359,681, issued Jul. 23, 2019, filed May 15, 2015, titled "MULTI-PANE WINDOWS INCLUDING ELECTROCHROM IC DEVICES AND ELECTROMECHANICAL SYSTEMS DEVICES," and incorporated herein by reference in its entirety. In some cases, one or more tintable windows can be located within the interior of a building, e.g., between a conference room and a hallway. In some cases, one or more tintable windows can be used in automobiles, trains, aircraft, and other vehicles, e.g., in lieu of a passive and/or non-tinting window.

In some embodiments, the tintable window comprises an electrochromic device (referred to herein as an "EC device" (abbreviated herein as ECD), or "EC"). An EC device (e.g., electrochromic construct) may comprise at least one coating that includes at least one layer. The at least one layer can comprise an electrochromic material. In some embodiments, the electrochromic material exhibits a change from one optical state to another, e.g., when an electric potential is applied across the EC device. The transition of the electrochromic layer from one optical state to another optical state can be caused, e.g., by reversible, semi-reversible, or irreversible ion insertion into the electrochromic material (e.g., by way of intercalation) and a corresponding injection of charge-balancing electrons. For example, the transition of the electrochromic layer from one optical state to another optical state can be caused, e.g., by a reversible ion insertion into the electrochromic material (e.g., by way of intercalation) and a corresponding injection of charge-balancing electrons. Reversible may be for the expected lifetime of the ECD. Semi-reversible refers to a measurable (e.g., noticeable) degradation in the reversibility of the tint of the window over one or more tinting cycles. In some instances, a fraction of the ions responsible for the optical transition is irreversibly bound up in the electrochromic material (e.g., and thus the induced (altered) tint state of the window is not reversible to its original tinting state). In various EC devices, at least some (e.g., all) of the irreversibly bound ions can be used to compensate for "blind charge" in the material (e.g., ECD).

In some implementations, suitable ions include cations. The cations may include lithium ions (Li+) and/or hydrogen ions (H+) (i.e., protons). In some implementations, other ions can be suitable. Intercalation of the cations may be into an (e.g., metal) oxide. A change in the intercalation state of the ions (e.g., cations) into the oxide may induce a visible change in a tint (e.g., color) of the oxide. For example, the oxide may transition from a colorless to a colored state. For example, intercalation of lithium ions into tungsten oxide (WO3-y (0<y≤~0.3)) may cause the tungsten oxide to change from a transparent state to a colored (e.g., blue) state. EC device coatings as described herein are located within the viewable portion of the tintable window such that the tinting of the EC device coating can be used to control the optical state of the tintable window.

FIG. 1A shows a cross-sectional view of an example of a tintable window embodied in an insulated glass unit ("IGU") 100 in accordance with some implementations. FIG. 1B shows a perspective view of the IGU of FIG. 1A. An IGU lite, also referred to herein as a "pane", may be a single substrate or a multi-substrate construct, such as a laminate of two substrates. IGUs, especially those having double- or triple-pane configurations, can provide a number of advantages over single-pane configurations. For example, multi-pane configurations can provide enhanced thermal insulation, noise insulation, environmental protection and/or durability when compared with single-pane configurations. A multi-pane configuration can provide increased protection for an ECD, for example, because the electrochromic films, as well as associated layers and conductive interconnects, can be formed on an interior surface of the multi-pane IGU and be protected by an inert gas fill in the interior volume, e.g., 108, of the IGU. The inert gas fill provides at least some of the (heat) insulating function of an IGU. Electrochromic IGU's have added heat blocking capability by virtue of a tintable coating that absorbs (or reflects) heat and light.

FIGS. 1A and 1B show examples of implementations of IGU 100 that include a first pane 104 having a first surface S1 and a second surface S2. In some implementations, the first surface S1 of the first pane 104 faces an exterior environment, such as an outdoors or outside environment. The IGU 100 includes a second pane 106 having a first surface S3 and a second surface S4. In some implementations, the second surface S4 of the second pane 106 faces an interior environment, such as an inside environment of a transitory or non-transitory facility (e.g., a room, building or a vehicle).

In some implementations, each of the first and the second panes 104 and 106 are transparent or translucent (e.g., at least to light in the visible spectrum). For example, at least one (e.g., each) of the panes 104 and 106 can be formed of a glass material and especially an architectural glass or other shatter-resistant glass material such as, for example, a silicon oxide ($SO_x$) based glass material. As a more specific example, each of the first and the second panes 104 and 106 can be a soda-lime glass substrate or float glass substrate. Such glass substrates can be composed of, for example, approximately 75% silica ($SiO_2$) as well as $Na_2O$, CaO, and several minor additives. However, each of the first and the second panes 104 and 106 can be formed of any material having suitable optical, electrical, thermal, and mechanical properties. For example, other suitable substrates that can be used as one or both of the first and the second panes 104 and 106 can include other glass materials as well as plastic, semi-plastic and thermoplastic materials (for example, poly (methyl methacrylate), polystyrene, polycarbonate, allyl diglycol carbonate, SAN (styrene acrylonitrile copolymer), poly(4-methyl-1-pentene), polyester, polyamide), or mirror materials. In some implementations, at least one (e.g., each) of the first and the second panes 104 and 106 can be strengthened, for example, by tempering, heating, or chemically strengthening.

In some embodiments, the first and the second panes 104 and 106, as well as the IGU 100 as a whole, are a rectangular solid. In some implementations, other shapes are possible and may be requested (for example, circular, elliptical, triangular, curvilinear, convex or concave shapes). In some specific implementations, a length "L" of each of the first and the second panes 104 and 106 can be in the range of from approximately 20 inches (in.) to approximately 10 feet (ft.), a width "W" of each of the first and the second panes 104 and 106 can be in the range of from approximately 20 in. to approximately 10 ft., and a thickness "T" of each of the first and the second panes 104 and 106 can be in the range of from approximately 0.3 millimeters (mm) to approximately 10 mm (although other lengths, widths or thicknesses, both smaller and larger, are possible and may be requested based on the needs of a particular utilization, user, manager, administrator, builder, architect or owner). In examples where thickness T of substrate 104 is less than 3 millimeters (mm), the substrate may be laminated to an additional substrate which is thicker (e.g., and protects the thin substrate 104). Additionally, while the IGU 100 includes two panes (104 and 106), in some other implementations, an IGU can include three or more panes. Furthermore, in some implementations, one or more of the panes can itself be a laminate structure of two, three, or more layers or sub-panes.

In the example shown in FIGS. 1A-B, the first and second panes 104 and 106 are spaced apart from one another by a spacer 118, which is typically a frame structure, to form an interior volume 108. In some implementations, the interior volume is filled with a gas or gas mixture comprising Argon (Ar), although in other implementations, the interior volume 108 can be filled with another gas or gas mixture. The other gas or gas mixture may comprise a noble gas (for example, krypton (Kr) or xenon (Xn)), another (non-noble) gas, or a mixture of gases (for example, air). Filling the interior volume 108 with a gas(es) comprising Ar, Kr, or Xn can reduce conductive heat transfer through the IGU 100. Without wishing to be bound to theory, this may be because of the low thermal conductivity of these gases and/or improve acoustic insulation due to their increased atomic weights. In some other implementations, the interior volume 108 can be evacuated of air or any other gas. A spacer 118 may determine the height of the interior volume 108; that is, the spacing between the first and the second panes 104 and 106. In some implementations, the spacing between the first and the second panes 104 and 106 is in the range of from approximately 6 mm to approximately 30 mm. The width of spacer 118 can be in the range of from approximately 5 mm to approximately 25 mm (although other widths are possible and may be requested).

Although not shown in the cross-sectional view, spacer 118 is a frame structure formed around all sides of the IGU 100 (for example, top, bottom, left and right sides of the IGU 100). For example, spacer 118 can be formed of a foam or plastic material. However, in some other implementations, spacers can be formed of metal or other conductive material, for example, a metal tube or channel structure having at least 3 sides, two sides for sealing to each of the substrates and one side to support and separate the lites and as a surface on which to apply a sealant. The sealant may include a polymeric material such as polyisobutylene (PIB). The polymeric material may resist water (e.g., be hydrophobic). The polymeric material may add structural support to the IGU assembly. Examples of polymeric materials can include silicone, polyurethane, or similar structural sealants that form a watertight and/or gas tight seal.

In some embodiments, window controllers are associated with one or more tintable windows and are configured to control a window's optical state, e.g., by applying a stimulus to the window. For example, by applying a voltage and/or a current to the tintable window (e.g., to an EC device coating). Window controllers may have many sizes, formats, and/or locations with respect to the optically switchable windows they control. A controller may be attached to a lite of an IGU or laminate, be in a frame that houses the IGU or laminate, or in a separate location. As previously mentioned, a tintable window may include one, two, three or more individual electrochromic panes (an electrochromic device on a transparent substrate). An individual pane of an electrochromic window may have an electrochromic coating that has one or more independently tintable zones. A controller can control all electrochromic coatings associated with such windows, whether the electrochromic coating is monolithic or zoned.

In some embodiments, if not directly attached to a tintable window, IGU, or frame, the window controller is located in proximity to the tintable window. The frame may comprise a mullion or a transom. For example, a window controller may be disposed adjacent to the window, on the surface of one of the window's lites, within a wall next to a window, or within a frame of a self-contained window assembly (e.g., in a mullion or transom). In some embodiments, the window controller is an in situ controller. The in situ window controller may be part of a window assembly, an IGU and/or a laminate. The in situ window may not have to be matched with the electrochromic window, and may be installed in the field (e.g., on deployment). For example, the controller can be integrated with the window as part of the assembly (e.g., in the factory), and deployed as one unit.

In some embodiments, the controller can be separate from the window, and be deployed as two separate units. For example, the controller may be installed in a portion of the window frame of a window assembly. In some embodiments, the controller may be part of an IGU or laminate assembly. For example, the controller may be mounted on or between panes of the IGU or on a pane of a laminate. In cases where a controller is located on the visible portion of an IGU, at least a portion of the controller may be substantially transparent. Examples of on glass controllers can be found in U.S. Pat. No. 10,303,035 B2, issued May 28, 2019, filed Nov. 14, 2015, titled "SELF CONTAINED EC IGU," and incorporated by reference herein in its entirety.

In some embodiments, a localized controller may be provided as more than one part, with at least one part (e.g., including a memory component storing information about the associated electrochromic window) being provided as a part of the window assembly and at least one other part being separate and configured to mate with the at least one part that is part of the window assembly, IGU or laminate. In certain embodiments, a controller may be an assembly of operatively coupled (e.g., interconnected) portions that are not disposed in a single housing (e.g., that are disposed in different housings). The separate controller portions may be spaced apart from each other (e.g., separated by a gap). At least one of the controller portions (e.g., or the entire window controller) may be disposed in the window framing and/or in a seal of an IGU. In some embodiments, the controller is a compact unit, e.g., enclosed in a single housing. In some embodiments, the controller portions are separated into two or more components that operatively couple at least by being physically combined, e.g., a dock and housing assembly. The controller (or at least a portion thereof) may be (i) proximate the glass and/or not in the viewable area of the glass, or (ii) mounted on the glass in the viewable area.

In some embodiments, at least a portion (e.g., the entire) of the window controller is incorporated into or onto the IGU and/or the window frame, e.g., prior to installation of the tintable window. In some embodiments, at least a portion (e.g., the entire) of the window controller is installed in the same building as the tintable window, e.g., prior to installation of the tintable window. In one embodiment, the controller is incorporated into, or onto, the IGU and/or the window frame, e.g., prior to leaving the manufacturing facility. In one embodiment, the controller is incorporated into the IGU, (e.g., substantially) within the seal. In another embodiment, the controller is incorporated into, or onto, the IGU, e.g., partially, substantially, or wholly within a perimeter defined by the primary seal between the sealing separator and the substrate.

In the event that characteristics of the electrochromic device(s) change over time (e.g., due to degradation), a characterization function can be used. The characterization function may, for example, be used to update control parameters. These control parameters may be used to drive tint state transition(s). In another example, if already installed in an electrochromic window unit, the controller (e.g., logic of the controller) can be used to calibrate the control parameters. For example, the control parameters can be calibrated to match the intended installation. In some embodiments, the control parameters can be recalibrated post installation to match the intended performance characteristics of the electrochromic pane(s).

In some embodiments, a controller includes a dock component. The dock component may have parts that are generic to any electrochromic window. The dock component can be associated with each window at the factory. After window installation, or otherwise in the field, a second component of the controller can be combined with the dock component to complete the electrochromic window controller assembly. The dock component may include a chip which is programmed at the factory with physical characteristics and/or parameters. The physical characteristics and/or parameters may include characteristics of the particular window to which the dock is attached. These characteristics may include, for example, the surface of the window which will face the building's interior upon installation, sometimes referred to as surface 4 or "S4"). The second component (sometimes called a "carrier," "casing," "housing," or "controller") can be mated with the dock. When powered, the second component can read the chip and configure itself to power the window, e.g., according to the particular characteristics and/or parameters stored on the chip. In this way, the shipped window need (e.g., only) have its associated parameters stored on a chip. For example, the chip can be integral with the window, while the more sophisticated circuitry and/or components can be combined later (e.g., after installation). For example, the more sophisticated circuitry and components can be shipped separately and installed (e.g., by the window manufacturer) after the window installation (e.g., after the installer (e.g., glazier) has installed the windows). In some embodiments, the chip is included in a wire (or in a wire connector) attached to the window controller. Such wires (e.g., with connectors) may be referred to as "pigtails."

In some embodiments, an "IGU" includes two or more (e.g., substantially) transparent substrates. According to some embodiments, the (e.g., substantially) transparent substrates include two panes of transparent material (e.g., glass), where at least one pane (e.g., acting as a substrate) includes an electrochromic device disposed thereon. The panes may have a separator disposed between them. An IGU can be hermetically sealed (e.g., humidity and/or gas sealed), having an interior region that is isolated from the ambient environment. A window assembly may include an IGU or a stand-alone laminate. The window assembly may include one or more electrical leads for connecting the IGUs, laminates, and/or one or more electrochromic devices, to a voltage source, switches and the like. The window assembly may include a frame that supports the IGU and/or laminate. A window assembly may include a window controller (e.g., as described herein), and/or one or more components of a window controller (e.g., a dock).

As used herein, the term "outboard" means closer to the outside environment. The term "inboard" means closer to the interior of a building. For example, in the case of an IGU having two panes, the pane located closer to the outside environment is referred to as the outboard pane or outer pane. The pane located closer to the inside of the building is referred to as the inboard pane or inner pane. As illustrated in FIGS. 1A and 1B, the different surfaces of the IGU may be referred to as S1, S2, S3, and S4 (assuming a two-pane IGU). S1 refers to the exterior-facing surface of the outboard lite (e.g., the surface that can be physically touched by someone standing outside). S2 refers to the interior-facing surface of the outboard lite. S3 refers to the exterior-facing surface of the inboard lite. S4 refers to the interior-facing surface of the inboard lite (e.g., the surface that can be physically touched by someone standing inside the building). In other words, the surfaces are labeled S1-S4, starting from the outermost surface of the IGU and counting inwards. In cases where an IGU includes three panes, this trend holds (with S6 being the surface that can be physically touched by someone standing inside the building). In certain embodiments employing two panes, the optically switchable device (e.g., electrochromic device) is disposed on surface S2. In certain embodiments, one or more of the surfaces has a structure for blocking transmission of electromagnetic radiation. FIG. 1B, shows an example of an "IMI" (a shielding stack of multiple conductive layers) disposed on S2. Additional aspects of shielding stack structures can be found in U.S. Patent Application Publication No. 2018/0090992, published Mar. 29, 2018, and filed Sep. 19, 2017, titled "WINDOW ANTENNAS FOR EMITTING RADIO FREQUENCY SIGNALS," which is incorporated herein by reference in its entirety. Examples of window controllers and their features are presented in U.S. patent application Ser. No. 13/449,248, filed Apr. 17, 2012, titled "CONTROLLER FOR OPTICALLY-SWITCHABLE WINDOWS, U.S. patent application Ser. No. 13/449,251, filed Apr. 17, 2012, titled "CONTROLLER FOR OPTICALLY-SWITCHABLE WINDOWS," U.S. patent application Ser. No. 15/334,835, filed Oct. 26, 2016, titled "CONTROLLERS FOR OPTICALLY-SWITCHABLE DEVICES," and International Patent Application Serial No. PCT/US17/20805, filed Mar. 3, 2017, titled "METHOD OF COMMISSIONING ELECTROCHROM IC WINDOWS," each of which is herein incorporated by reference in its entirety.

When a building is outfitted with tintable windows, window controllers may be connected to one another and/or other entities (e.g., devices), via a communications network. The communications network may be referred to as a "window control network" or a "window network." The network and the various devices (e.g., controllers, IGUs, emitters, antenna, and/or sensors) that are connected via the network (e.g., wired and/or wireless power transfer and/or communication) are referred to herein as a "window control system" or as a "control system." The window control system may provide tint instructions to window controllers. Window control networks may provide window information to master controllers or other network entities (e.g., devices), and the like. Examples of window information include current tint state and/or other information collected by window controller. In some cases, a window controller has one or more associated sensors. The one or more associated sensors may include, for example, a photosensor, a temperature sensor, an occupancy sensor, a particulate matter sensor, a sounds sensor, pressure sensor, velocity sensor, movement sensor, and/or gas sensor (measuring gas type, velocity, and/or concentration) that provide sensed information over the network. In some cases, information transmitted over a window communication network does not impact window control. For example, information received at a first window configured to receive a Wi-Fi or LiFi signal may be transmitted over the communication network to a second window configured to wirelessly broadcast the information as, e.g., a Wi-Fi or LiFi signal. A window control network need not be limited to providing information for controlling tintable windows, but may be able to communicate information for other devices interfacing with the communications network such as HVAC systems, lighting systems, security systems, personal computing devices, and the like.

Figure 2A:
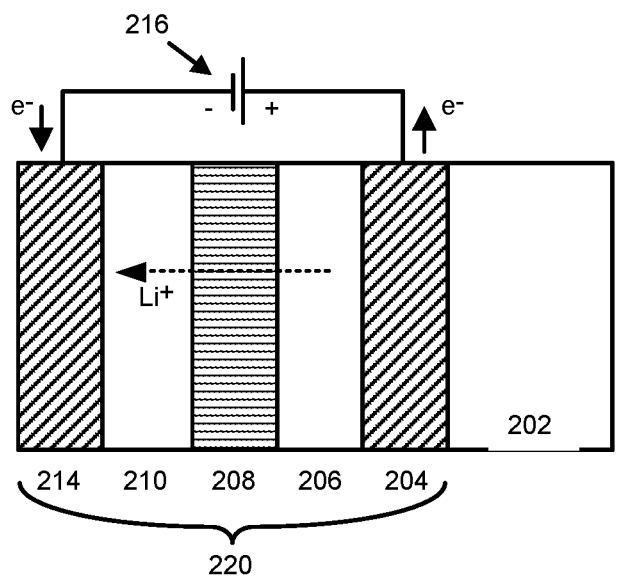
FIG. 2A is a schematic cross-section of an electrochromic device in a bleached state or transitioning to a bleached state.

FIG. 2A is a schematic cross-section of an electrochromic device in a bleached state (or transitioning to a bleached state). In accordance with specific embodiments, an electrochromic device 200 includes a tungsten oxide electrochromic layer (EC) 206 and a nickel-tungsten oxide counter electrode layer (CE) 210. Electrochromic device 200 includes a substrate 202, a conductive layer (CL) 204, an ion conducting layer (IC) 208, and conductive layer (CL) 214.

A power source 216 is configured to apply a potential and/or current to an electrochromic stack 220 through suitable connections (e.g., bus bars) to the conductive layers 204 and 214. In some embodiments, the voltage source is configured to apply a potential of a few volts in order to drive a transition of the device from one optical state to another. The polarity of the potential is such that the ions (lithium ions in this example) primarily reside (as indicated by the dashed arrow) in nickel-tungsten oxide counter electrode layer 210.

Figure 2B:
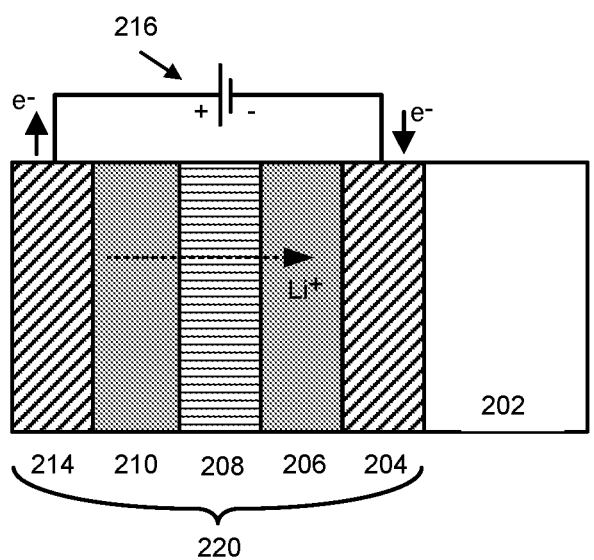
FIG. 2B is a schematic cross-section of the electrochromic device of FIG. 2A in a colored state, or transitioning to a colored state.

FIG. 2B is a schematic cross-section of electrochromic device 200 shown in FIG. 2A but in a colored state (or transitioning to a colored state). In FIG. 2B, the polarity of voltage source 216 is reversed with respect to FIG. 2A. The electrochromic layer 206 of FIG. 2B is made more negative to accept additional lithium ions, and thereby transition to the colored state. As indicated by the dashed arrow, lithium ions are transported across ion conducting layer 208 to tungsten oxide electrochromic layer 206. Tungsten oxide electrochromic layer 206 is shown in the colored state. Nickel-tungsten oxide counter electrode 210 is shown in the colored state. Nickel-tungsten oxide becomes progressively more-opaque as it gives up (de-intercalates) lithium ions. In this example, there is a synergistic effect where the transition to colored states for both layers 206 and 210 are additive toward reducing the amount of light transmitted through the stack and substrate.

As described herein, an electrochromic device may include an electrochromic (EC) electrode layer and a counter electrode (CE) layer separated by an ionically conductive (IC) layer that is highly conductive to ions and highly resistive to electrons. The ionically conductive layer may prevent shorting between the electrochromic layer and the counter electrode layer. The ionically conductive layer may facilitate the electrochromic and counter electrodes to hold a charge and thereby maintain their bleached or colored states. In some electrochromic devices (e.g., having distinct layers), the components form a stack which includes the ion conducting layer sandwiched between the electrochromic electrode layer and the counter electrode layer. The boundaries between these three stack components may be defined by abrupt changes in composition and/or microstructure. The devices may have three distinct layers with two abrupt interfaces.

In accordance with certain embodiments, the counter electrode and electrochromic electrodes are formed immediately adjacent one another, sometimes in direct contact without separately depositing an ionically conducting layer therebetween. In some embodiments, electrochromic devices having an interfacial region (e.g., rather than a distinct IC layer) are employed. Electrochromic devices, and methods of fabricating them, can be found in U.S. Pat. No. 8,300,298 and U.S. patent application Ser. No. 12/772,075, filed Apr. 30, 2010, titled 'ELECTROCHROMIC DEVICES," and U.S. patent application Ser. No. 12/814, 277, filed Jun. 11, 2010, titled "ELECTROCHROMIC DEVICES," and Ser. No. 12/814,279, filed Jun. 11, 2010, titled "ELECTROCHROMIC DEVICES." Each of the three foregoing patent applications, as well as the foregoing patent, are titled "Electrochromic Devices," each names Zhongchun Wang et al. as inventors, and each of which is incorporated by reference herein in its entirety.

FIG. 3A shows an example of a current profile for an electrochromic window employing a simple voltage control algorithm to cause an optical state transition (e.g., tinting) of an electrochromic device. In the graph, ionic current density (I) is represented as a function of time. Different types of electrochromic devices may have the depicted current profile. In one example, a cathodic electrochromic material such as tungsten oxide is used in conjunction with a nickel tungsten oxide counter electrode. In such devices, negative currents indicate tinting of the device, and positive current indicates bleaching the device. The depicted profile shown in FIG. 3A results by ramping up the voltage to a set level and then holding the voltage to maintain the optical state.

The current peaks 301 are associated with changes in optical state, e.g., tinting and bleaching (e.g., clearing). The current peaks represent delivery of the charge needed to tint or bleach the device. The shaded area under the peak represents the total charge required to tint or bleach (e.g., clear) the device. The portions of the curve after the initial current spikes (portions 303) represent leakage current while the device is in the new optical state. In some embodiments, the leakage current is at most about 0.1 milliamperes per square centimeter. In some embodiments, the leakage current corresponds to a leakage voltage of at most about 0.25 millivolts per square foot, or at most about 50 volts per 200,000 square feet. In some embodiments, the leakage current is very slow, and thus looks like a horizontal line as in the graph of FIG. 3A. It can take at least about 1, 3, 5, or 10 years for the voltage differential to break (e.g., for ions to migrate back spontaneously in the absence of an induced voltage).

In the example shown in FIG. 3A, a voltage profile 305 is superimposed on the current curve. The voltage profile follows the sequence: negative ramp (307), negative hold (309), positive ramp (311), and positive hold (313). Note that the voltage remains constant after reaching its maximum magnitude and during the length of time that the device remains in its defined optical state. Voltage ramp 307 drives the device to its new tinted state. The voltage ramps may or may not have the same absolute slope value. The voltage hold periods may or may not be of the same duration. The voltage ramp periods may or may not be of the same duration. Voltage hold 309 maintains the device in the tinted state until voltage ramp 311 in the opposite direction drives the transition from tinted to clear states. In some switching algorithms, a current and/or voltage cap is imposed. For example, the current and/or voltage is not permitted to exceed a defined level, e.g., in order to prevent damaging the device. In some embodiments, when the electrochromic device is subject for a current and/or voltage over a timeframe that exceeds a time threshold, the electrochromic device is irreversibly damaged. In some switching algorithms, a current is permitted to exceed the imposed current cap for a short amount of time shorter than the time threshold (during which the device is not damaged). In some switching algorithms, a voltage is permitted to exceed the imposed voltage cap for a short amount of time shorter than the time threshold (during which the device is not damaged).

In some embodiments, the speed of tinting is a function of not only the applied voltage, but the temperature and the voltage ramping rate. In some embodiments, both voltage and temperature affect lithium diffusion, e.g., the amount of charge passed (and hence the intensity of this current peak) increases with voltage and temperature. The voltage and the temperature may be interdependent. The interdependency can imply that a lower voltage can be used at higher temperatures to attain the same switching speed as a higher voltage at lower temperatures. This temperature response may be employed in a voltage based switching algorithm. Such an algorithm may require active monitoring of temperature to vary the applied voltage. The temperature may be used to determine which voltage to apply to effect rapid switching without damaging the device.

Various embodiments herein utilize some form of feedback to actively control a transition in an optically switchable device. In some embodiments, the feedback is based at least in part on non-optical characteristics. Electrical characteristics, for example voltage and/or current responses of the optically switchable device, may be useful to consider when certain electrical conditions are applied.

In some embodiments, electrical feedback is used to ensure that the optically switchable device is maintained within a safe window of operating conditions. If the current or voltage supplied to a device is too great, it can cause damage to the device. The feedback methods presented herein may be referred to as damage prevention feedback methods. In some embodiments, the damage prevention feedback may be the only feedback used. Alternatively, the damage prevention feedback methods may be combined with other feedback methods described herein. In other embodiments, the damage prevention feedback is not used, but a different type of feedback described below is used.

FIG. 3B shows an example of a graph depicting a total charge delivered over time and an applied voltage over time during an electrochromic tinting transition. The window in this illustrative example measured about 24×24 inches. The total charge delivered is referred to as the Tint Charge Count, and is measured in coulombs (C). The total charge delivered is presented on the left hand y-axis of the graph, and the applied voltage is presented on the right hand y-axis of the graph. A line 302 corresponds to the total charge delivered, and a line 304 corresponds to the applied voltage. Further, a line 306 corresponds to a threshold charge (the threshold charge density multiplied by the area of the window), and a line 308 corresponds to a target open circuit voltage. The threshold charge and target open circuit voltage can be used to monitor/control the optical transition.

The voltage curve 304 in FIG. 3B starts out with a ramp to drive component, where the magnitude of the voltage ramps up to the drive voltage of about −2.5 Volts (V). After an initial period of applying the drive voltage, the voltage begins to spike upwards at regular intervals. These voltage spikes occur when the electrochromic device is being probed. The probing occurs by applying open circuit conditions to the device. The open circuit conditions result in an open circuit voltage VoC (also herein "Voc"), which correspond to the voltage spikes seen in the graphs. This open circuit voltage VoC is a real-time measurement, and it is shown during a hold period. The VoC can be measured during ramp periods (not shown in the example of FIG. 3B). Between each probe of the open circuit voltage, there is an additional period where the applied voltage is the drive voltage. While the electrochromic device is transitioning, the EC is periodically probed to test the open circuit voltage (e.g., thereby monitoring the transition). The target open circuit voltage, represented by line 308, was selected to be about −1.4V for each case. The hold voltage in each case was about −1.2V. Thus, the target open circuit voltage was offset from the hold voltage by about 0.2V.

In the transition example shown in FIG. 3B, the magnitude of the open circuit voltage exceeds the magnitude of the target open circuit voltage at about 1500 seconds. Because the relevant voltages in this example are negative, this is shown in the graph as the point at which the open circuit voltage spikes first fall below the target open circuit voltage. The total delivered charge count curve 302 starts at zero and rises monotonically. The delivered charge reaches the threshold charge at around 1500 seconds. This time was very close to the time at which the target open circuit voltage was met. Once both conditions were met, the voltage switched from the drive voltage to the hold voltage, around 1500 seconds.

In another embodiment, the optical transition is monitored through voltage sensing pads positioned directly on the transparent conductive layers (TCLs). This allows for a direct measurement of the $V_{eff}$ at the center of the device, between the bus bars where $V_{eff}$ is at a minimum. In this case, the controller indicates that the optical transition is complete when the measured $V_{eff}$ at the center of the device reaches a target voltage such as the hold voltage. In various embodiments, the use of sensor(s) may reduce (e.g., eliminate) the benefit from using a target voltage that is offset from the hold voltage. For example, the offset may not be needed and the target voltage may (e.g., substantially) equal the hold voltage when the sensors are present. Where voltage sensors are used, there may be at least one sensor on each TCL. The voltage sensors may be placed at a distance mid-way between the bus bars, e.g., off to a side of the device (near an edge), for example, so that they do not affect (or minimally affect) the viewing area. The voltage sensors may be hidden from view, e.g., by placing them proximate a spacer, separator and/or frame that obscures the view of the sensor from a viewer.

In some embodiments, the voltage sensing pads (e.g., sensors) may be conductive tape pads. The pads may be as small as at most about 1 mm². (millimeter squared). The pads may be about 10 mm² or less. A four wire system may be used in embodiments utilizing voltage sensors (e.g., sensing pads).

In some embodiments, the method (e.g., as implemented by the control system) may specify a total duration of the transition. For example, the controller may be programmed to use a modified probing algorithm to monitor the progress of the transition from the starting state to the end state. The progress can be monitored by periodically reading a current value in response to a drop in the applied voltage magnitude such as with the probing technique described above (e.g., using VoC). The probing technique may be implemented using a drop in applied current (e.g., measuring the open circuit voltage). The current and/or voltage response indicates how close to completion the optical transition has come. In some embodiments, the response is compared to a threshold current and/or voltage for a particular time (e.g., the time that has elapsed since the optical transition was initiated). In some embodiments, the comparison is made for a progression of the current and/or voltage responses, e.g., using sequential pulses and/or checks. The slope (e.g., steepness) of the progression may indicate when the end state is likely to be reached. A linear extension to this threshold current may be used to predict when the transition will be complete, e.g., when it will be sufficiently complete that it is appropriate to drop the drive voltage to the hold voltage.

With regard to algorithms for ensuring that the optical transition from first state to the second state occurs within a defined timeframe, the controller may be configured (or designed) to increase the drive voltage as appropriate to speed up the transition, e.g., when the interpretation of the pulse responses suggests that the transition is not progressing fast enough to meet the requested speed of transition. In certain embodiments, when it is determined that the transition is not progressing sufficiently fast, the transition switches to a mode where it is driven by an applied current. The current is sufficiently great to increase the speed of the transition but is not so great that it degrades or damages the electrochromic device (e.g., irreversibly). In some implementations, the maximum suitably safe current may be referred to as $I_{safe}$. Examples of $I_{safe}$ may range between about 5 µA/cm² and 250 µA/cm² microamperes per centimeter squared. In current controlled drive mode, the applied voltage is allowed to float during the optical transition. Then, during this current controlled drive step, could the controller periodically probes by, e.g., dropping to the hold voltage and checking for completeness of transition in the same way as when using a constant drive voltage.

In some embodiments, the probing technique may determine whether the optical transition is progressing as expected. Transitions that are not progressing as expected can be described as 'uncharacteristic'. As understood herein, an uncharacteristic tint transition is a deviation from the normal switching parameters for a subject window. When the probing technique (e.g., VoC voltage probing) determines that the optical transition is proceeding too slowly, it can take steps to speed the transition. For example, it can increase the drive voltage. The technique may determine that the optical transition is proceeding too quickly and risks damaging the device. When such determination is made, the probing technique may take steps to slow the transition. As an example, the controller may reduce the drive voltage.

In some applications, groups of windows are set to matching transition rates. Such matching may be performed by adjusting the voltage and/or driving current based at least in part on the feedback obtained during the probing (e.g., by pulse or open circuit measurements). In embodiments where the transition is controlled by monitoring the current response, the magnitude of the current response may be compared between windows. A window may be controlled by a local controller. The local controller may be part of a (e.g., hierarchical) control system. A group of windows (e.g., at least 2, 3, 4, 5, 6, 7, 8, 9, or 10 windows) can be controlled by the same local controller (e.g., window controller). For example, the comparison can be performed for a window or for each window of the group of windows, to determine how to scale the driving potential and/or driving current for the window (e.g., each window in the group). The comparison may be between a window at a first time and a past performance of that window at a time before the first time. The comparison may be between a first window and a second window. The comparison may be between the window an average window performance (e.g., wherein the average window performance is a requested, optimal, and/or average window performance). The rate of change of open circuit voltage could be used as an indicator to a variance (e.g., deterioration) in the window performance.

In some embodiments, the window controllers described herein are suited for integration with a BMS. A BMS is a computer-based control system installed in a facility (e.g., building) that controls (e.g., monitors) the building's mechanical and/or electrical equipment such as ventilation, lighting, power systems, elevators, fire systems, and/or security systems. A BMS consists of hardware, including interconnections by communication channels to a computer or computers, and associated software for maintaining conditions in the facility, e.g., according to preferences set by the occupants and/or by the building manager. For example, a BMS may be implemented using a local area network, such as Ethernet. The software can be based at least in part on, for example, internet protocols and/or open standards. One example of software is software from Tridium, Inc. (of Richmond, Virginia). One communications protocol commonly used with a BMS is BACnet (building automation and control networks).

A BMS is common in a large building, and can function at least to control the environment within the building. For example, a BMS may control temperature, carbon dioxide levels, and/or humidity within a building. There are various mechanical devices controlled by a BMS such as heaters, air conditioners, blowers, vents, and the like. To control the building environment, a BMS may turn on and off any and all of these various devices, e.g., under defined conditions. in some embodiments, a core function of a BMS is to maintain a comfortable, safe, and/or healthy environment for the building's occupants, e.g., while minimizing energy demands (e.g., heating and/or cooling costs and/or demand). A BMS can be used to optimize the synergy between various systems (e.g., in terms of power consumption and/or cost). Such synergy can be used, for example, to conserve energy and lower building operation costs.

In some embodiments, a control system (e.g., its component such as a window controller) is integrated with a BMS. The window controller may be configured to control one or more tintable windows. In some embodiments, the one or more tintable windows include at least one all solid state and inorganic electrochromic device. in some embodiments, the tintable window includes organic EC device. In some embodiments, the one or more electrochromic windows include only all solid state and inorganic windows. In some embodiments, the electrochromic windows are multistate electrochromic windows, as described in U.S. patent application Ser. No. 12/851,514, filed Aug. 5, 2010, titled "MULTIPANE ELECTROCHROMIC WINDOWS," that is incorporated herein by reference in its entirety.

Figure 4:
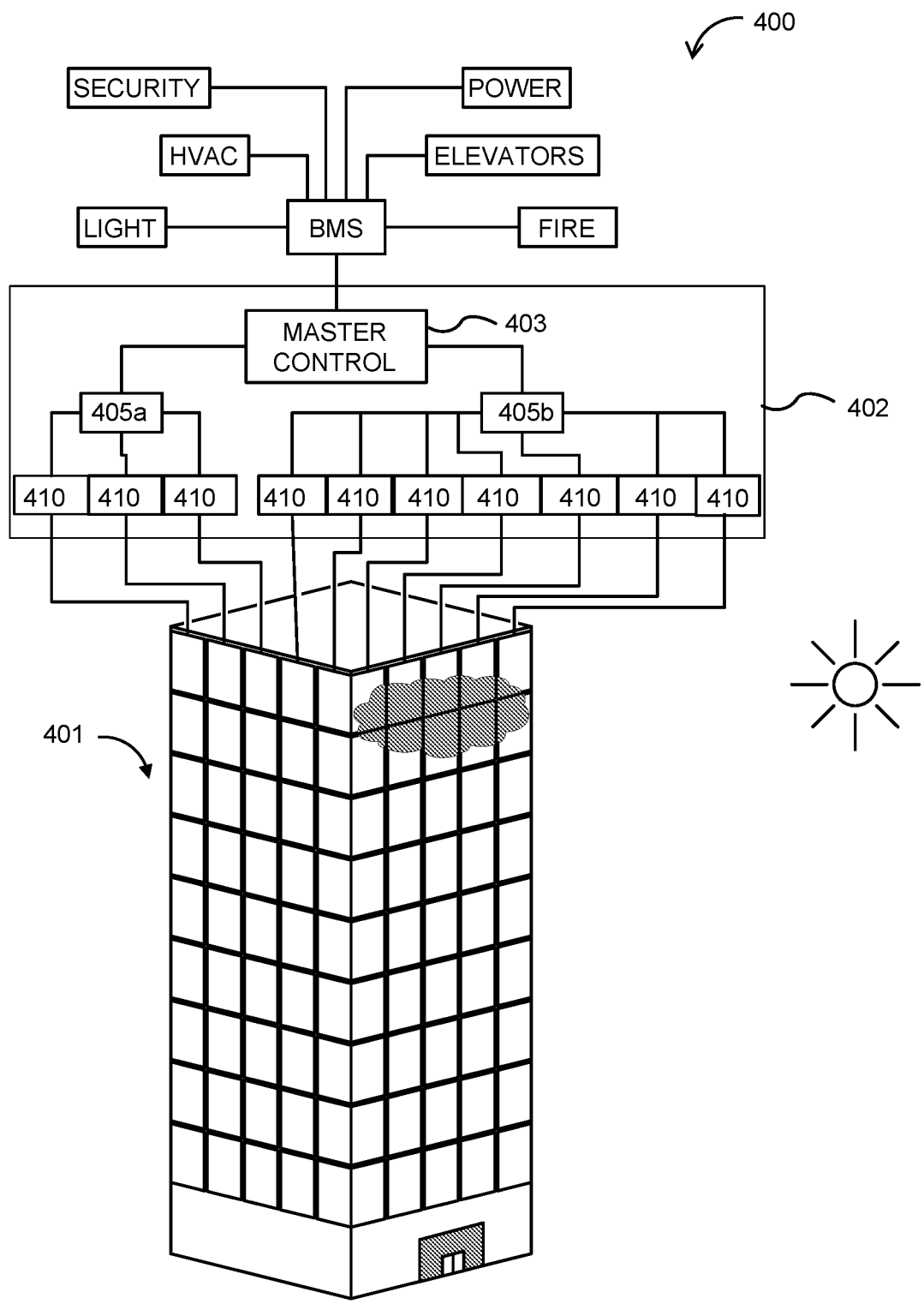
FIG. 4 is a block diagram showing an embodiment of a control system of a building.

FIG. 4 shows an example of a schematic diagram of an embodiment of a BMS 400, that is configured to manage a number of systems of a building 401, including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and the like. Fire systems may include fire alarms and fire suppression systems including a water plumbing control. Lighting systems may include interior lighting, exterior lighting, emergency warning lights, emergency exit signs, and emergency floor egress lighting. Power systems may include the main power, backup power generators, and uninterrupted power source (UPS) grids.

BMS 400 manages a control system 402. In this example, control system 402 is depicted as a distributed network of window controllers including a master controller 403, intermediate network controllers 405a and 405b, and end or leaf controllers 410 that is a local controller. End or leaf controllers 410 may be similar to the window controller described previously in connection with FIGS. 1A and 1B. For example, master controller 403 may be in proximity to the BMS 400, and each floor of building 401 may have one or more intermediate network controllers 405a and 405b, while each window of the building has its own end controller 410. controllers 410 can directly control one or more electrochromic windows of building 401. Direct control means that there is no intervening controller between the window controller and the window. For example, the window controller can be coupled to one or more tintable windows via wiring that is not interrupted by another controller.

At least one of controllers 410 can be in a separate location from the electrochromic window that it controls. At least one of controller 410 can be integrated into the electrochromic window. For simplicity, ten electrochromic windows of building 401 are depicted as controlled by control system 402. There may be a large number of electrochromic windows in a building controlled by control system 402. Control system 402 need not be a distributed network of window controllers. For example, a single end controller that controls the functions of a single electrochromic window falls within the scope of the embodiments disclosed herein.

One aspect of the disclosed embodiments is a BMS including a multipurpose control system, e.g., as described herein. By incorporating feedback from the control system, a BMS can provide, for example, enhanced: (1) environmental control, (2) energy savings, (3) security, (4) flexibility in control options, (5) improved reliability and usable life of other systems (e.g., due to less reliance thereon and therefore less maintenance thereof), (6) information availability and diagnostics, (7) effective use of staff, and various combinations thereof, e.g., because the tintable windows can be automatically controlled.

In some embodiments, a BMS may not be present or a BMS may be present but may not communicate with the control system, or communicate at a high level with the control system. In some embodiments, a control system can provide, for example, enhanced: (1) environmental control, (2) energy savings, (3) security, (4) flexibility in control options, (5) improved reliability and usable life of other systems (e.g., due to less reliance thereon and therefore less maintenance thereof), (6) information availability and diagnostics, (7) effective use of staff, and various combinations thereof, e.g., because the tintable windows can be automatically controlled. In some embodiments, maintenance on the BMS does not interrupt control and/or operation of the tintable windows.

In some cases, the systems of BMS 400 may run according to daily, monthly, quarterly, and/or yearly schedules. For example, a lighting control system (shown in FIG. 4 as "light"), an HVAC system, the control system 402, and a security system may operate on a 24 hour schedule accounting for when people are in the building during the work day. At night, the building may enter an energy savings mode, and during the day, the systems may operate in a manner that minimizes the energy consumption of the building while providing for occupant comfort. As another example, the systems may shut down or enter an energy savings mode over a holiday period.

The scheduling information may be combined with geographical information. Geographical information may include the latitude and/or longitude of the building. Geographical information may include information about the direction that each side (e.g., façade) of the building faces. Using such information, different rooms on different sides of the building may be controlled in different manners. For example, for east facing rooms of the building in the winter, the window controller may instruct the windows to have no tint in the morning. With no tint, the room may warm up due to sunlight shining into the room. The lighting control panel may instruct the lights to be dim because of the lighting from the sunlight. The west facing windows may be controllable by the occupants of the room in the morning, e.g., because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

In the example of FIG. 4, building 401 includes a building network, a BMS, and tintable windows for the exterior windows of the building. The network may be operatively (e.g., communicatively) coupled to a one or more sensors. For example, the exterior windows of the building may be windows separating the interior of the building from the exterior of the building. Light from exterior windows of the building may have an effect on the interior lighting in the building about 20 feet or about 30 feet from the windows. The space in a building that is more that about 20 feet or about 30 feet from an exterior window, may receive little light from the exterior window. Such spaces away from exterior windows in a building may be lit by lighting systems of the building. The temperature within a building may be influenced by exterior light and/or the exterior temperature. For example, on a cold day and with the building being heated by a heating system, rooms closer to doors and/or windows may lose heat faster than the interior regions of the building, and be cooler compared to the interior regions.

In some embodiments, the network may be operatively coupled to exterior sensors. The building may include exterior sensors on the roof of the building. The building may include an exterior sensor associated with at least one (e.g., each) exterior window. The building may include an exterior sensor on one or more (e.g., each) side of the building. An exterior sensor (e.g., on each side of the building) could track the irradiance on a side of the building in which it is disposed, e.g., as the sun changes position throughout the day.

When a window controller is integrated into a building network (e.g., including the BMS 400), outputs from exterior sensors may be input to a network of the BMS 400 and provided as input to the local end controller 410. For example, in some embodiments, output signals from two or more sensors are received. In some embodiments, (e.g., only) one output signal is received, and in some other embodiments, three, four, five, or more outputs are received. These output signals may be received over a building network (e.g., and/or a BMS).

In some embodiments, the output signals received include a signal indicating energy and/or power consumption, e.g., by a heating system, a cooling system, and/or lighting within the facility (e.g., including at least one building). For example, the energy or power consumption of the heating system, the cooling system, and/or the lighting of the facility may be monitored to provide the signal indicating energy or power consumption. Devices may be interfaced with, or attached to, the circuits and/or wiring of the building to enable this monitoring. Alternatively, the power systems in the building may be installed such that the power consumed by the heating system, cooling system, and/or lighting for an individual room within the facility or a group of rooms within the facility can be monitored.

Tint instructions can be provided to change a present tint of the tintable window to the determined level of tint (e.g., target tint level). For example, referring to FIG. 4, this may include master controller 403 issuing commands to one or more intermediate network controllers 405a and/or 405b, which in turn issue commands to one or more end controllers 410 that control window(s) of the building. End controllers 410 may apply voltage and/or current to the window(s) to drive the change in tint pursuant to the instructions.

In some embodiments, a building including electrochromic windows and a BMS may be enrolled in and/or participate in a demand response program run by the utility or utilities providing power to the facility. The program may be a program in which the energy consumption of the facility is reduced when a peak load occurrence is expected. The utility may send out a warning signal prior to an expected peak load occurrence. For example, the warning may be sent on the day before, the morning of, or about one hour before the expected peak load occurrence. A peak load occurrence may be expected to occur on a hot summer day when cooling systems/air conditioners are drawing a large amount of power from the utility, for example. The warning signal may be received by the control system (e.g., and/or BMS) of the facility. The control system and/or BMS can then instruct the window controller(s) to transition the appropriate electrochromic device in the electrochromic windows to a darker or lighter tint level to aid in reducing the power draw of the cooling and/or heating systems in the building (e.g., to mitigate the weather conditions) at the time when the peak load is expected.

In some embodiments, tintable windows for the exterior windows of the building may be grouped into zones, with tintable windows in a zone being instructed in a similar manner. For example, groups of electrochromic windows on different floors of the building or different sides of the building may be in different zones. For example, on the first floor of the building, all of the east-facing electrochromic windows may be in zone 1, all of the south-facing electrochromic windows may be in zone 2, all of the west-facing electrochromic windows may be in zone 3, and all of the north-facing electrochromic windows may be in zone 4. As another example, all of the electrochromic windows on the first floor of the building may be in zone 1, all of the electrochromic windows on the second floor may be in zone 2, and all of the electrochromic windows on the third floor may be in zone 3. As yet another example, all of the east-facing electrochromic windows may be in zone 1, all of the south-facing electrochromic windows may be in zone 2, all of the west-facing electrochromic windows may be in zone 3, and all of the north-facing electrochromic windows may be in zone 4. As yet another example, east-facing electrochromic windows on one floor could be divided into different zones. Any number of tintable windows on the same side and/or different sides and/or different floors of the building may be assigned to a zone. The zones of windows may be separated at least in part by (i) the functionality of the rooms on which they are disposed (e.g., windows of conference rooms, windows of offices, windows of cafeteria), (ii) the floor in which they are located, (iii) the façade in which they are located, (iv) the owner or tenant of the facility portion in which they are located, or (v) any combination thereof.

In some embodiments, tintable windows in a zone may be controlled by the same window controller or by different window controllers (e.g., that receive the same directions). In some other embodiments, the window controllers controlling the windows in the zone may receive the same output signals from sensors. The window controllers controlling the windows in the zone may use the same function or lookup table to determine the level of tint for the windows in a zone.

In some embodiments, tintable (e.g., electrochromic) windows in a zone may be controlled by a window controller(s) that receive an output signal from a (e.g., transmissivity) sensor. In some embodiments, the (e.g., transmissivity) sensor may be mounted proximate the windows in a zone. For example, the (e.g., transmissivity) sensor may be mounted in or on a frame containing an IGU (e.g., mounted in or on a mullion, the horizontal or vertical sash of a frame) included in the zone. In some embodiments, tintable windows in a zone (such as those that includes the windows on a single side of the building) may be controlled by a window controller(s) that receive an output signal from a (e.g., transmissivity) sensor.

In some embodiments, a sensor (e.g., photosensor and/or IR sensor) may provide an output signal to a window controller to control the tintable (e.g., electrochromic) windows of a first zone (e.g., a master control zone). The window controller(s) may control the tintable windows in a second zone (e.g., a slave control zone) in the same manner as the first zone. In some other embodiments, another window controller(s) may control the tintable windows in the second zone in the same manner as the first zone.

In some embodiments, a user (e.g., building manager, occupants of rooms in the second zone, or other person) may manually instruct the tintable windows in the second zone (e.g., the slave control zone) to enter a tint level such as a tinted (e.g., colored) state (level) or a clear state. Manually instructing may include using a tint or clear command, or a command from a user console (e.g., of a BMS), for example. In some embodiments, when the tint level of the windows in the second zone is overridden with such a manual command, the tintable windows in the first zone (e.g., the master control zone) remain under control of the window controller receiving output from the transmissivity sensor. The second zone may remain in a manual command mode for a period of time, e.g., and then revert back to be under control of the window controller receiving output from the (e.g., transmissivity) sensor. For example, the second zone may stay in a manual mode for one hour after receiving an override command, e.g., and then may revert back to be under control of the window controller receiving output from the (e.g., transmissivity) sensor. The sensor may be any sensor disclosed herein.

In some embodiments, a user (e.g., a building manager, occupants of rooms in the first zone, or other person) may manually instruct the windows in the first zone (e.g., the master control zone) to enter a tint level such as a tinted (e.g., colored) state or a clear state. The manually instructing may include using a tint command or a command from a user console (e.g., of a BMS), for example. In some embodiments, when the tint level of the windows in the first zone is overridden with such a manual command, the tintable windows in the second zone (e.g., the slave control zone) remains under control of the window controller(s) receiving outputs from the exterior sensor. The first zone may remain in a manual command mode for a period of time and then revert back to be under control of window controller receiving output from the (e.g., transmissivity and/or exterior) sensor. For example, the first zone may stay in a manual mode for a time (e.g., one hour) after receiving an override command, and then may revert back to be under control of the window controller receiving output from the (e.g., transmissivity and/or exterior) sensor. In some other embodiments, the tintable windows in the second zone may remain in the tint level that they are in when the manual override for the first zone is received. The first zone may remain in a manual command mode for a period of time and then both the first zone and the second zone may revert back to be under control of the window controller receiving output from the (e.g., transmissivity and/or exterior) sensor. The windows may be divided into zones (e.g., based at least in part on the location, façade, floor, ownership, utilization of the enclosure (e.g., room) in which they are disposed, any other assignment metric, random assignment, or any combination thereof. Allocation of windows to the zone may be static or dynamic (e.g., based on a heuristic). There may be at least about 2, 5, 10, 12, 15, 30, 40, or 46 windows per zone.

In some embodiments, at least one device is operated in coordination with at least one other device, which devices are coupled to the network. The device can be a tintable window. Control of the at least one device may be via Ethernet. For example, A tint level of tintable windows may be adjusted concurrently. When the devices are in use, a zone of devices may have at least one characteristics that is the same. For example, when the tintable windows are in a zone, a zone of tintable windows may have its tint level (automatically) altered (e.g., darkened or lightened) to the same level. The device can be a sensor. For example, when sounds sensors are in a zone, they may sample sound at the same frequency and/or at the same time window. A zone of devices may comprise a plurality of devices (e.g., of the same type). The zone may comprise (i) devices (e.g., tintable windows) facing a particular direction of an enclosure (e.g., facility), (ii) a plurality of devices disposed on a particular face (e.g., façade) of the enclosure, (iii) devices on a particular floor of a facility, (iv) devices in a particular type of room and/or activity (e.g., open space, office, conference room, lecture hall, corridor, reception hall, or cafeteria), (v) devices disposed on the same fixture (e.g., internal or external wall), and/or (vi) devices that are user defined (e.g., a group of tintable windows in a room or on a façade that are a subset of a larger group of tintable windows. The (automatic) adjustment of the devices may done automatically and/or by a user. The automatic changing of device properties and/or status in a zone, may be overridden by a user (e.g., by manually adjusting the tint level). A user may override the automatic adjustment of the devices in a zone using mobile circuitry (e.g., a remote controller, a virtual reality controller, a cellular phone, an electronic notepad, a laptop computer and/or by a similar mobile device).

In some embodiments, the various devices (e.g., IGUs) are grouped into zones of targets (e.g., of EC windows). At least one zone (e.g., each of which zones) can include a subset of devices. For example, at least one (e.g., each) zone of devices may be controlled by one or more respective floor controllers and one or more respective local controllers (e.g., window controllers) controlled by these floor controllers. In some examples, at least one (e.g., each) zone can be controlled by a single floor controller and two or more local (e.g., window) controllers controlled by the single floor controller. For example, a zone can represent a logical grouping of the devices. Each zone may correspond to a set of devices (e.g., of the same type) in a specific location or area of the facility that are driven together based at least in part on their location. For example, a facility (e.g., building) may have four faces or sides (a North face, a South face, an East Face, and a West Face) and ten floors. In such a didactic example, each zone may correspond to the set of smart windows (e.g., tintable windows) on a particular floor and on a particular one of the four faces. At least one (e.g., each) zone may correspond to a set of devices that share one or more physical characteristics (for example, device parameters such as size or age). In some embodiments, a zone of devices is grouped based at least in part on one or more non-physical characteristics such as, for example, a security designation or a business hierarchy (for example, IGUs bounding managers' offices can be grouped in one or more zones while IGUs bounding non-managers' offices can be grouped in one or more different zones).

In some embodiments, at least one (e.g., each) floor controller is able to address all of the devices (e.g., of the same type or of different types) in at least one (e.g., each) of one or more respective zones. For example, the master controller can issue a primary tint command to the floor controller that controls a target zone. The primary tint command can include an (e.g., abstract) identification of the target zone (hereinafter also referred to as a "zone ID"). For example, the zone ID can be a first protocol ID such as that just described in the example above. In such cases, the floor controller receives the primary tint command including the tint value and the zone ID and maps the zone ID to the second protocol IDs associated with the local controllers within the zone. In some embodiments, the zone ID is a higher level abstraction than the first protocol IDs. In such cases, the floor controller can first map the zone ID to one or more first protocol IDs, and subsequently map the first protocol IDs to the second protocol IDs.

In some embodiments, the facility may be divided into one or more zones. The zones may be defined at least in part by a customer, or by the facility manager. The zones may be at least in part automatically defined. For example, the zone of devices (e.g., comprising tintable windows, sensors, or emitters) may associate with (i) a façade of a building they are facing, (ii) a floor they are disposed in, (iii) a building in the facility they are disposed in, (iv) a functionality of the enclosure they are disposed in (e.g., a conference room, a gym, an office, or a cafeteria), (iv) prescribed and/or in fact occupation (e.g., organizational function) to the enclosure they are disposed in, (v) prescribed and/or in fact activity in the enclosure they are disposed in, (vi) tenant, owner, and/or manager of the enclosure of the facility (e.g., for a facility having various tenants, owners, and/or managers), and/or (vii) their geographic location. The zones may be alterable (e.g., using the software app), e.g., visually. The status of the zone (e.g., in conjunction to the status of the devices therein), may be displayed by the app (e.g., updated in real-time, or substantially in real time). One or more zones may be grouped. For example, all zones in a certain floor may be grouped. There may be a zone hierarchy using any of the zone associations (i) to (vii). The zones can create by a provider of the device(s), of the control system, and/or of the network. The zones may be generated by a user (e.g., a customer, a lessee, or a facility owner). Zones can be created at the level of the digital model of the facility (e.g., Revit file). A digital model and/or other similar file may be associated with the facility and the device(s). For example, a Building Information Model (BIM) sch as a Revit file, Microdesk (e.g., ModelStream), IMAGINiT, ATG USA, or similar facility related digital file. In some embodiments, the BIM is a Computer Aided Design (CAD) paradigm that allows for intelligent, 3D and/or parametric object-based design.

Any of the methods described herein of control of a tintable window, regardless of whether the window controller is a standalone window controller, part of a control system, or is interfaced with a building network (e.g., by itself of part of a control system), may be used to control the tint of a tintable window.

In some embodiments, window controllers described herein include components for wired and/or wireless communication between the window controller, sensors, and/or separate communication nodes. Wireless and/or wired communications may be accomplished with a communication interface that interfaces directly with the window controller. Such interface could be native to the microprocessor. Such interface may be provided via additional circuitry enabling these functions.

A separate communication node for wireless communications can be, for example, another wireless window controller, a local (e.g., end), intermediate, or master window controller, a remote control device, or a BMS. Wireless communication can be used in the window controller for at least one of the following operations: programming and/or operating the tintable window, collecting data from the tintable window from the various sensors and/or protocols (e.g., as described herein), and/or using the tintable (e.g., electrochromic) window as a relay point for wireless communication. Data collected from tintable windows may include count data such as number of times an EC device has been activated, efficiency of the EC device over time, and the like.

In one embodiment, wireless communication is used to operate the associated tintable windows, for example, via an infrared (IR), and/or radio frequency (RF) signal. In certain embodiments, the controller will include a wireless protocol chip, such as Bluetooth, EnOcean, WiFi, Zigbee, global positioning system (GPS), ultrawide band (UWB), or the like. Window controllers may have wireless communication via a network. Input to the window controller can be manually input by an end user (e.g., at a wall switch), either directly or via wireless communication. Input to the window controller can be from a BMS of a building of which the tintable window is a component.

In some embodiments, when the window controller is part of a distributed network of controllers (e.g., control system), wireless communication is used to transfer at least a portion of the data to and from each of a plurality of tintable windows via the distributed network of controllers. At least one (e.g., each) controller in the network of controllers may have wireless communication components. For example, referring again to FIG. 4, master control 403 may communicate wirelessly with each of intermediate network controllers 405a and 405b, which in turn may communicate wirelessly with end controllers 410, each associated with an electrochromic window. Master control 403 may communicate wirelessly with the BMS 400. In one embodiment, at least one level of communication in the window controller is performed wirelessly. In one embodiment, at least one level of communication in the window controller is performed using wires.

In some embodiments, more than one mode of wireless communication protocol is used in the window controller distributed network. For example, a master window controller may communicate wirelessly to intermediate controllers via WiFi or Zigbee, while the intermediate controllers communicate with end controllers via Bluetooth, Zigbee, EnOcean, or other protocol. In another example, window controllers have redundant wireless communication systems for flexibility in end user choices for wireless communication.

In some embodiments, wireless communication between master and/or intermediate window controllers and end window controllers offers the advantage of obviating the installation of hard communication lines. For instance, for wireless communication between window controllers and BMS. In some embodiments, wireless communication in these roles is useful for data transfer to and from tintable windows for operating the window and providing data to, for example, a BMS for optimizing the environment and energy savings in a building. Window location data as well as feedback from sensors may be synergized for such optimization. For example, granular level (window-by-window) microclimate information is fed to a BMS to optimize one or more environments of the building.

In some embodiments, sensor(s) are operatively coupled to at least one controller and/or processor. Sensor readings may be obtained by one or more processors and/or controllers. A controller may comprise a processing unit (e.g., comprising CPU or GPU). A controller may receive an input (e.g., from at least one sensor). The controller may comprise circuitry, electrical wiring, optical wiring, socket, and/or outlet. A controller may deliver an output. A controller may comprise multiple (e.g., sub-) controllers. The controller may be a part of a control system. A control system may comprise a master controller, a set of floor controllers (e.g., comprising network controllers), and a set of local controllers. The set of local controllers may include a window controller (e.g., controlling an optically switchable window), an enclosure controller, and/or a component controller. For example, a controller may be a part of a hierarchal control system (e.g., comprising a main controller that directs one or more controllers, e.g., floor controllers, local controllers (e.g., window controllers), enclosure controllers, and/or component controllers).

A physical location of the controller type in the hierarchal control system may change over time. For example, at a first time, a first processor may assume a role of a main controller, a second processor may assume a role of a floor controller, and a third processor may assume the role of a local controller. At a second time, the second processor may assume a role of a main controller, the first processor may assume a role of a floor controller, and the third processor may remain with the role of a local controller. At a third time, the third processor may assume a role of a main controller, the second processor may assume a role of a floor controller, and the first processor may assume the role of a local controller.

A controller may control one or more devices (e.g., and be directly coupled to the devices). A controller may be disposed proximate to the one or more devices it is controlling. For example, a controller may control an optically switchable device (e.g., IGU), an antenna, a sensor, and/or an output device (e.g., a light source, sounds source, smell source, gas source, HVAC outlet, or heater). The output device may be an emitter.

In one embodiment, a floor controller may direct one or more lower hierarchy controllers (e.g., a local controller). The lower hierarchy controllers may comprise one or more window controllers, one or more enclosure controllers, one or more component controllers, or any combination thereof. For example, the floor (e.g., comprising network) controller may control a plurality of local (e.g., comprising window) controllers. A plurality of local controllers may be disposed in a portion of a facility (e.g., in a portion of a building). The portion of the facility may be a floor of a facility. For example, a floor controller may be assigned to a floor. In some embodiments, a floor may comprise a plurality of floor controllers, e.g., depending on the floor size and/or the number of local controllers coupled to the floor controller. For example, a floor controller may be assigned to a portion of a floor. For example, a floor controller may be assigned to a portion of the local controllers disposed in the facility. For example, a floor controller may be assigned to a portion of the floors of a facility.

A master controller may be coupled to one or more lower hierarchy (e.g., floor) controllers. The floor controller may be disposed in the facility. The master controller may be disposed in the facility, or external to the facility. The master controller may be disposed in the cloud. A controller may be a part of, or be operatively coupled to, a building management system. A controller may receive one or more inputs. A controller may generate one or more outputs. The controller may be a single input single output controller (SISO) or a multiple input multiple output controller (MIMO). A controller may interpret an input signal received. A controller may acquire data from the one or more components (e.g., sensors). Acquire may comprise receive or extract. The data may comprise measurement, estimation, determination, generation, or any combination thereof. A controller may comprise feedback control.

A controller may comprise feed-forward control. Control may comprise on-off control, proportional control, proportional-integral (PI) control, or proportional-integral-derivative (PID) control. Control may comprise open loop control, or closed loop control. A controller may comprise closed loop control. A controller may comprise open loop control. A controller may comprise a user interface. A user interface may comprise (or operatively coupled to) a keyboard, keypad, mouse, touch screen, microphone, speech recognition package, camera, imaging system, or any combination thereof. Outputs may include a display (e.g., screen), speaker, or printer.

Figure 5:
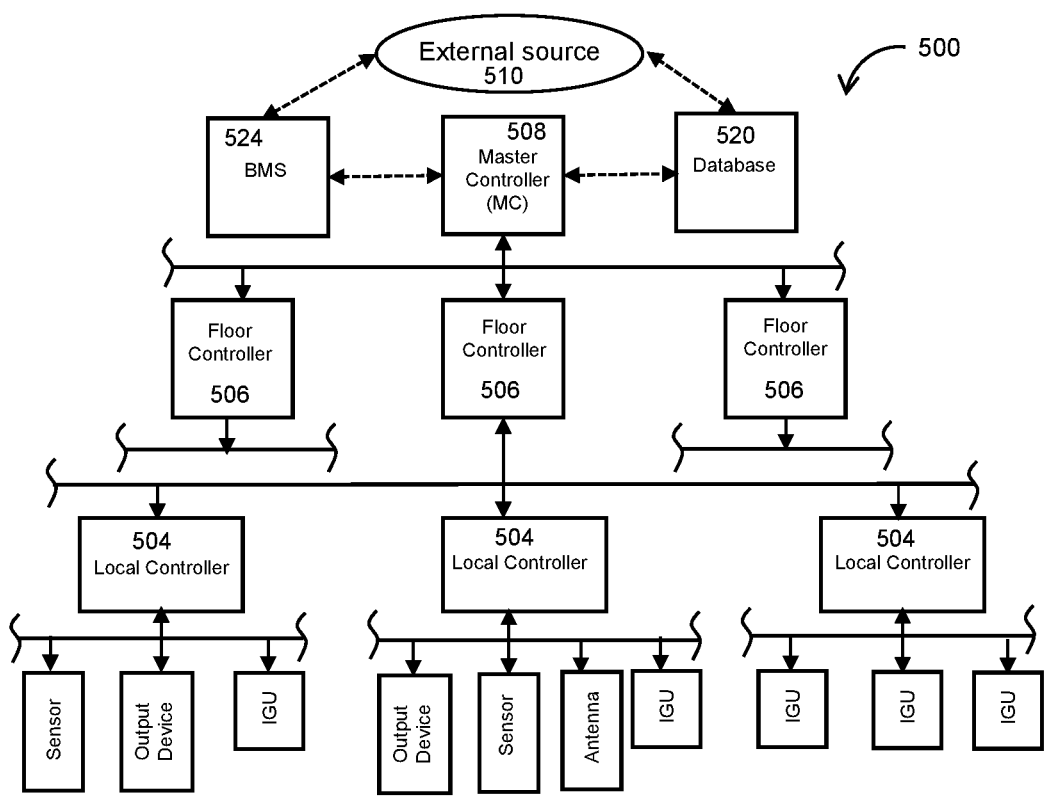
FIG. 5 is a block diagram showing a control system and its various components.

FIG. 5 shows an example of a control system architecture 500 comprising a hierarchy of controllers. The hierarchy of controllers includes a master controller 508 that controls floor controllers 506. The floor controllers 506 in turn control local controllers 504. In some embodiments, a local controller of local controllers 504 controls one or more IGUs, one or more sensors, one or more output devices (e.g., one or more emitters), or any combination thereof. In the illustrative configuration of FIG. 5, the master controller 508 is operatively coupled (e.g., wirelessly and/or wired) to a building management system (BMS) 524 and to a database 520. Arrows in FIG. 5 represents communication pathways. A controller may be operatively coupled (e.g., directly/indirectly and/or wired and/wirelessly) to an external source 510. The external source 510 may comprise a network. The external source 510 may comprise one or more sensor or output devices. The external source 510 may comprise a cloud-based application and/or database. The communication may be wired and/or wireless. The external source 510 may be disposed external to the facility. For example, the external source 510 may comprise one or more sensors and/or antennas disposed, e.g., on a wall or on a ceiling of the facility. The communication may be monodirectional or bidirectional. In the example shown in FIG. 5, all communication arrows can be bidirectional.

The controller may monitor and/or direct (e.g., physical) alteration of the operating conditions of the apparatuses, software, and/or methods described herein. Control may comprise regulate, manipulate, restrict, direct, monitor, adjust, modulate, vary, alter, restrain, check, guide, or manage. Controlled (e.g., by a controller) may include attenuated, modulated, varied, managed, curbed, disciplined, regulated, restrained, supervised, manipulated, and/or guided. The control may comprise controlling a control variable (e.g., temperature, power, voltage, and/or profile). The control can comprise real time or off-line control. A calculation utilized by the controller can be done in real time, and/or offline. The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from at least one sensor). The controller may deliver an output. The controller may comprise multiple (e.g., sub-) controllers. The controller may be a part of a control system. The control system may comprise a master controller, floor controller, local controller (e.g., enclosure controller, or window controller). The controller may receive one or more inputs. The controller may generate one or more outputs. The controller may be a single input single output controller (SISO) or a multiple input multiple output controller (MIMO). The controller may interpret the input signal received.

The controller may acquire data from the one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise (or operatively coupled to) a keyboard, keypad, mouse, touch screen, microphone, speech recognition package, camera, imaging system, or any combination thereof. The outputs may include a display (e.g., screen), speaker, or printer.

The methods, systems, software, and/or the apparatus described herein may comprise and/or utilize a control system. The control system can be in communication with any of the apparatuses (e.g., sensors) described herein. At least two of the sensors may be of the same type or of different types, e.g., as described herein. For example, the control system may be in communication with the first sensor and/or with the second sensor. The control system may control (e.g., direct) the one or more sensors. The control system may control one or more components of a building management system (e.g., lighting, security, and/or air conditioning system). The controller may regulate at least one (e.g., environmental) characteristic of the enclosure. The control system may regulate the enclosure environment using any component of the building management system. For example, the control system may regulate the energy supplied by a heating element and/or by a cooling element. For example, the control system may regulate velocity of an air flowing through a vent to and/or from the enclosure.

The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "GPU"). The controller(s) or control mechanisms (e.g., comprising a computer system) may be programmed to implement one or more methods of the disclosure. The processor may be programmed to implement methods of the disclosure. The controller may control at least one component of the systems and/or apparatuses disclosed herein.

In certain embodiments, a building network infrastructure has a vertical data plane (between building floors) and a horizontal data plane (within a single floor or multiple contiguous floors). In some cases, the horizontal and vertical data planes have the same or similar data carrying capabilities and components. In other cases, these two data planes have different data carrying capabilities. For example, the vertical data plane may contain components for faster data transmission rates and/or bandwidths. In one example, the vertical data plane contains components that support at least about 10, 20, or 50 gigabit/second or faster Ethernet transmissions (e.g., using UTP wires and/or fiber optic cables), while the horizontal data plane contains components that support at most about 1, 3, 5, or 8 gigabit/second Ethernet transmissions, e.g., via coaxial cable. In some cases, the horizontal data plane supports data transmission via the Multimedia over Coax Alliance (MoCA) 2.5 standard or the MoCA 3.0 standard. In certain embodiments, connections between floors on the vertical data plane employ control panels with high speed Ethernet switches. These control panels may communicate with nodes on a given floor, e.g., via a MoCA interface and associated coaxial cables on the horizontal data plane.

Data transmission, and in some embodiments voice services, may be provided in a facility (e.g., building) via wireless communications to and/or from the building's occupants. In the United States, current third generation (3G), fourth generation (4G), and fifth generation (5G) cellular communication standard deployments use spectrum allocations in the 600 MHz-850 MHz and 1700-2300 MHz frequency ranges. These deployments could become problematic, e.g., due to radio frequency (RF) attenuation caused by some common building materials used in walls, floors, ceilings, and windows. Although 5G systems currently operate in the 600-MHz and 850-MHz frequency bands, the Federal Communications Commission (FCC) has allocated several additional bands for 5G, including the 24-GHz and 39-GHz millimeter-wave (mmW) frequency bands. At mmWave frequencies, building attenuation may become much more severe compared to the situation at 600-2300 MHz.

In some embodiments (e.g., to address the challenges of RF attenuation), a building may be outfitted with components that serve as gateways or ports to cellular signals. Such gateways may couple to infrastructure in the interior of the building that provide wireless service via interior antennas and other infrastructure implementing Wi-Fi, small cell service (e.g., via microcell or femtocell devices), CBRS, etc. The gateways (e.g., points of entry) for such services may include a high-speed fiber optic cable (e.g., disposed underground) from a carrier's central office, a point-to-point microwave link between the central office and the facility, and/or a wireless signal received at an antenna located on the building exterior (e.g., a donor antenna or sky sensor on the building's roof). This high-speed fiber optic cable or point-to-point microwave link is sometimes referred to as a "backhaul."

In some embodiments, one or more sensors are included in an enclosure. For example, an enclosure may include at least 1, 2, 4, 5, 8, 10, 20, 50, or 500 sensors. The enclosure may include a number of sensors in a range between any of the aforementioned values (e.g., from about 1 to about 1000, from about 1 to about 500, or from about 500 to about 1000). The sensor may be of any type. For example, the sensor may be configured (e.g., and/or designed) to measure concentration of a gas (e.g., carbon monoxide, carbon dioxide, hydrogen sulfide, volatile organic chemicals, or radon). For example, the sensor may be configured to measure an electrical current. For example, the sensor may be configured to measure a voltage. For example, the sensor may be configured to measure a current. For example, the sensor may be configured (e.g., and/or designed) to measure ambient noise. For example, the sensor may be configured (e.g., and/or designed) to measure electromagnetic radiation (e.g., RF, microwave, infrared, visible light, and/or ultraviolet radiation). For example, the sensor may be configured (e.g., and/or designed) to measure security-related parameters, such as (e.g., glass) breakage and/or unauthorized presence of personnel in a restricted area. Sensors may cooperate with one or more (e.g., active) devices, such as a radar or lidar. The devices may operate to detect physical size of an enclosure, personnel present in an enclosure, stationary objects in an enclosure and/or moving objects in an enclosure.

In some embodiments, the sensor may facilitate controlling the environment of the enclosure such that inhabitants of the enclosure may have an environment that is more comfortable, delightful, beautiful, healthy, productive (e.g., in terms of inhabitant performance), easier to live (e.g., work) in, or any combination thereof. The sensor(s) may be configured as low or high resolution sensors. Sensor may provide on/off indications of the occurrence and/or presence of a particular environmental event (e.g., one pixel sensors). In some embodiments, the accuracy and/or resolution of a sensor may be improved via artificial intelligence analysis of its measurements. Examples of artificial intelligence techniques that may be used include reactive, limited memory, theory of mind, and/or self-aware techniques known to those skilled in the art. Sensors may be configured to process, measure, analyze, detect and/or react to one or more of: data, temperature, humidity, sound, force, pressure, electromagnetic waves, position, distance, movement, flow, acceleration, speed, vibration, dust, light, glare, color, gas(es), and/or other aspects (e.g., characteristics) of an environment (e.g., of an enclosure). The gases may include volatile organic compounds (VOCs). The gases may include carbon monoxide, carbon dioxide, water vapor (e.g., humidity), oxygen, radon, and/or hydrogen sulfide. The one or more sensors may be calibrated in a factory setting. A sensor may be optimized to be capable of performing accurate measurements of one or more environmental characteristics present in the factory setting.

In some instances, a factory calibrated sensor may be less optimized for operation in a target environment. For example, a factory setting may comprise a different environment than a target environment. The target environment can be an environment in which the sensor is deployed. The target environment can be an environment in which the sensor is expected and/or destined to operate. The target environment may differ from a factory environment. A factory environment corresponds to a location at which the sensor was assembled and/or built. The target environment may comprise a factory in which the sensor was not assembled and/or built. In some instances, the factory setting may differ from the target environment to the extent that sensor readings captured in the target environment are erroneous (e.g., to a measurable extent). In this context, "erroneous" may refer to sensor readings that deviate from a specified accuracy (e.g., specified by a manufacture of the sensor). In some situations, a factory-calibrated sensor may provide readings that do not meet accuracy specifications (e.g., by a manufacturer) when operated in the target environments.

In some embodiments, the sensor is operatively coupled to at least one controller. The coupling may comprise a communications link. The communications link may comprise any suitable communications media (e.g., wired and/or wireless). The communications link may comprise a wire, such as one or more conductors arranged in a twisted-pair, a coaxial cable, and/or optical fibers. The communications link may comprise a wireless communication link, such as Wi-Fi, Bluetooth, ZigBee, cellular, or optical. One or more segments of the communications link may comprise a conductive (e.g., wired) media, while one or more other segments of a communications link may comprise a wireless link.

In some embodiments, the enclosure is a facility (e.g., building). The enclosure may comprise a wall, a door, or a window. In some embodiments, at least two enclosures of a plurality of enclosures are disposed in the facility. In some embodiments, at least two enclosures of a plurality of enclosures are disposed different facilities. The different facilities may be a campus (e.g., and belong to the same entity). At least two of the plurality of enclosures may reside in the same floor of the facility. At least two of the plurality of enclosures may reside in different floors of the facility.

In some embodiments, following installation of a first sensor, a sensor performs self-calibration to establish an operating baseline. Performance of a self-calibration operation may be initiated by an individual sensor, a nearby second sensor, or by one or more controllers. For example, upon and/or following installation, a sensor deployed in an enclosure may perform a self-calibration procedure. A baseline may correspond to a lower threshold from which collected sensor readings may be expected to comprise values higher than the lower threshold. A baseline may correspond to an upper threshold, from which collected sensor readings may be expected to comprise values lower than the upper threshold. A self-calibration procedure may proceed beginning with sensor searching for a time window during which fluctuations or perturbations of a relevant parameter are nominal. In some embodiments, the time window is sufficient to collect sensed data (e.g., sensor readings) that allow separation and/or identification of signal and noise from the sensed data. The time window may be predetermined. The time window may be non-defined. The time window may be kept open (e.g., persist) until a calibration value is obtained.

In some embodiments, a sensor may search for an optimal time to measure a baseline (e.g., in a time window). The optimal time (e.g., in the time window) may be a time span during which (i) the measured signal is most stable and/or (ii) the signal to noise ratio is highest. The measured signal may contain some level of noise. A complete absence of noise may indicate malfunction of the sensor or inadequacy for the environment. The sensed signal (e.g., sensor data) may comprise a time stamp of the measurement of the data. The sensor may be assigned a time window during which it may sense the environment. The time window may be predetermined (e.g., using third party information and/or historical data concerning the property measured by the sensor). The signal may be analyzed during that time window, and an optimal time span may be found in the time window, in which time span the measured signal is most stable and/or the signal no noise ratio is highest. The time span may be equal to, or shorter than, the time window. The time span may occur during the entire, or during part of the time window.

In some embodiments, a sensor ensemble includes at least two sensors of the same type. An ensemble of sensors can refer to a collection of diverse sensors. In some embodiments, at least two of the sensors in the ensemble cooperate to determine environmental parameters, e.g., of an enclosure in which they are disposed. For example, a sensor ensemble may include a carbon dioxide sensor, a carbon monoxide sensor, a volatile organic chemical sensor, an ambient noise sensor, a visible light sensor, a temperature sensor, and/or a humidity sensor. A sensor ensemble may comprise other types of sensors, and the claimed subject matter is not limited in this respect. The enclosure may comprise one or more sensors that are not part of an ensemble of sensors. The enclosure may comprise a plurality of ensembles. At least two of the plurality of ensembles may differ in at least one of their sensors. At least two of the plurality of ensembles may have at least one of their sensors that is similar (e.g., of the same type). For example, an ensemble can have two motion sensors and one temperature sensor. For example, an ensemble can have a carbon dioxide sensor and an IR sensor. The ensemble may include one or more devices that are not sensors. The one or more other devices that are not sensors may include sound emitter (e.g., buzzer), and/or electromagnetic radiation emitters (e.g., light emitting diode). In some embodiments, a single sensor (e.g., not in an ensemble) may be disposed adjacent (e.g., immediately adjacent such as contacting) another device that is not a sensor.

In some embodiments, a plurality of sensors is assembled into a sensor suite (e.g., sensor ensemble). At least two sensors of the plurality of sensors may be of a different type (e.g., are configured to measure different properties). Various sensor types can be assembled together (e.g., bundled up) and form a sensor suite. The plurality of sensors may be coupled to one electronic board. The electrical connection of at least two of the plurality of sensors in the sensor suit may be controlled (e.g., manually and/or automatically). For example, the sensor suite may be operatively coupled to, or comprise, a controller (e.g., a microcontroller). The controller may control an on/off connectivity of the sensor to electrical power. The controller can thus control the time (e.g., period) at which the sensor will be operative.

In particular embodiments, one or more sensors of the sensor ensemble provide readings. In some embodiments, the sensor is configured to sense a parameter. The parameter may comprise temperature, particulate matter, volatile organic compounds, electromagnetic energy, pressure, acceleration, time, radar, lidar, glass breakage, movement, or gas. The gas may comprise a noble gas. The gas may be inert. The gas may be a gas harmful to an average human. The gas may be a gas present in the ambient atmosphere (e.g., oxygen, carbon dioxide, ozone, chlorinated carbon compounds, or nitrogen). The gas may comprise radon, carbon monoxide, hydrogen sulfide, hydrogen, oxygen, water (e.g., humidity). The electromagnetic sensor may comprise an infrared, visible light, ultraviolet sensor. The infrared radiation may be passive infrared radiation (e.g., black body radiation). The electromagnetic sensor may sense radio waves. The radio waves may comprise narrowband, wideband, or ultra-wideband radio signals. The radio waves may comprise pulse radio waves. The radio waves may comprise radio waves utilized in communication. The gas sensor may sense a gas type, flow (e.g., velocity and/or acceleration), pressure, and/or concentration. The readings may have an amplitude range. The readings may have a parameter range. For example, the parameter may be electromagnetic wavelength, and the range may be a range of detected wavelengths.

In some embodiments, the sensor data is responsive to the environment in the enclosure and/or to any inducer(s) of a change (e.g., any environmental disruptor) in this environment. The sensors data may be responsive to emitters operatively coupled to (e.g., in) the enclosure (e.g., an occupant, appliances (e.g., heater, cooler, ventilation, and/or vacuum), opening). For example, the sensor data may be responsive to an air conditioning duct, or to an open window. The sensor data may be responsive to an activity taking place in the room. The activity may include human activity, and/or non-human activity. The activity may include electronic activity, gaseous activity, and/or chemical activity. The activity may include a sensual activity (e.g., visual, tactile, olfactory, auditory, and/or gustatory). The activity may include an electronic and/or magnetic activity. The activity may be sensed by a person. The activity may not be sensed by a person. The sensors data may be responsive to the occupants in the enclosure, substance (e.g., gas) flow, substance (e.g., gas) pressure, and/or temperature.

In some embodiments, data from a sensor in the enclosure (e.g., and in the sensor ensemble) is collected and/or processed (e.g., analyzed). The data processing can be performed by a processor of the sensor, by a processor of the sensor ensemble, by another sensor, by another ensemble, in the cloud, by a processor of the controller, by a processor in the enclosure, by a processor outside of the enclosure, by a remote processor (e.g., in a different facility), by a manufacturer (e.g., of the sensor, of the window, and/or of the building network). The data of the sensor may have a time indicator (e.g., may be time stamped). The data of the sensor may have a sensor location identification (e.g., be location stamped). The sensor may be identifiably coupled with one or more controllers.

In some embodiments, processing data derived from the sensor comprises applying one or more models. The models may comprise mathematical models. The processing may comprise fitting of models (e.g., curve fitting). The model may be multi-dimensional (e.g., two or three dimensional). The model may be represented as a graph (e.g., 2 or 3 dimensional graph). For example, the model may be represented as a contour map. The modeling may comprise one or more matrices. The model may comprise a topological model. The model may relate to a topology of the sensed parameter in the enclosure. The model may relate to a time variation of the topology of the sensed parameter in the enclosure. The model may be environmental and/or enclosure specific. The model may consider one or more properties of the enclosure (e.g., dimensionalities, openings, and/or environmental disrupters (e.g., emitters)). Processing of the sensor data may utilize historical sensor data, and/or current (e.g., real time) sensor data. The data processing (e.g., utilizing the model) may be used to project an environmental change in the enclosure, and/or recommend actions to alleviate, adjust, or otherwise react to the change.

Positional and/or stationary characteristics (e.g., placement of walls and/or windows) of the enclosure may be utilized in measuring the characteristics of a given environment. The positional and/or stationary characteristics of the enclosure may be derived independently (e.g., from $3^{rd}$ party data and/or from non-sensor data). The positional and/or stationary characteristics of the enclosure may be derived using data from the one or more sensors disposed in the environment. When the environment is minimally disturbed with respect to the measured environmental characteristic (e.g., when no one is present in an environment, and/or when the environment is quiet), some sensor data may be used to sense position of (e.g., stationary and/or non-stationary) objects to determine the environment. Determining the position of objects comprises determining an (e.g., human) occupancy in the environment. Distance and/or location related measurements may utilize sensor(s) such as radar and/o ultrasonic sensors. Distance and location related measurements may derive from sensors that to not traditionally correlated to location and/or distance.

Sensors of a sensor ensemble may be organized into a sensor module. A sensor ensemble may comprise a circuit board, such as a printed circuit board, in which a number of sensors are adhered or affixed to the circuit board. Sensors can be removed from a sensor module. For example, a sensor may be plugged and/or unplugged from the circuit board. Sensors may be individually activated and/or deactivated (e.g., using a switch). The circuit board may comprise a polymer. The circuit board may be transparent or non-transparent. The circuit board may comprise metal (e.g., elemental metal and/or metal alloy). The circuit board may comprise a conductor. The circuit board may comprise an insulator. The circuit board may comprise any geometric shape (e.g., rectangle or ellipse). The circuit board may be configured (e.g., may be of a shape) to allow the ensemble to be disposed in a mullion (e.g., of a window). The circuit board may be configured (e.g., may be of a shape) to allow the ensemble to be disposed in a frame (e.g., door frame and/or window frame). The mullion and/or frame may comprise one or more holes to allow the sensor(s) to obtain (e.g., accurate) readings. The circuit board may include an electrical connectivity port (e.g., socket). The circuit board may be connected to a power source (e.g., to electricity). The power source may comprise renewable or non-renewable power source.

Figure 6:
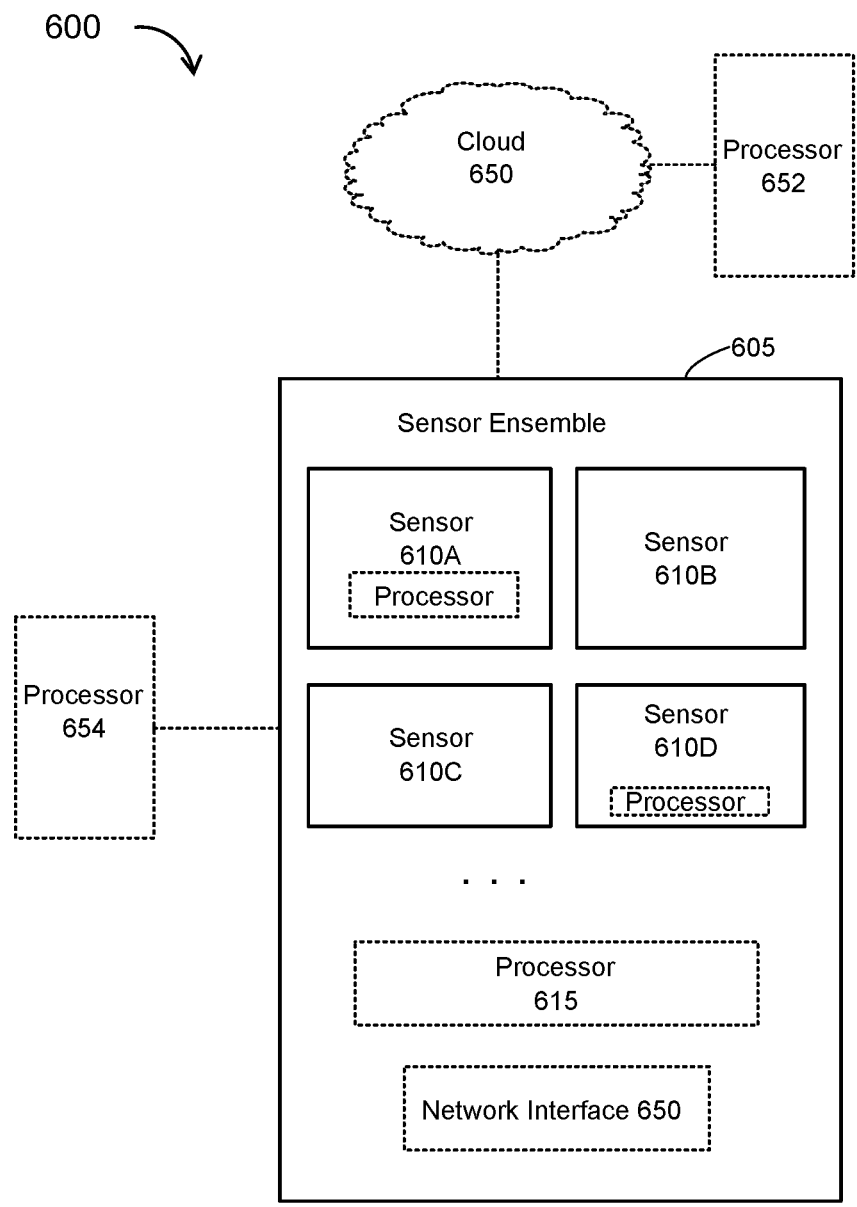
FIG. 6 is a block diagram showing an example of a system including an ensemble of sensors organized into a sensor module.

FIG. 6 shows an example of a system 600 including an ensemble of sensors organized into a sensor module. Sensors 610A, 61013, 610C, and 610D are shown as included in a sensor ensemble 605. The sensor ensembles (including the sensor ensemble 605) that are organized into a sensor module may include at least 1, 2, 4, 5, 8, 10, 20, 50, or 500 sensors. The sensor module may include a number of sensors in a range between any of the aforementioned values (e.g., from about 1 to about 1000, from about 1 to about 500, or from about 500 to about 1000). Sensors of a sensor module may comprise sensors configured or designed for sensing a parameter comprising, temperature, humidity, carbon dioxide, particulate matter (e.g., between 2.5 μm and 10 (μm) micrometers), total volatile organic compounds (e.g., via a change in a voltage potential brought about by surface adsorption of volatile organic compound), ambient light, audio noise level, pressure (e.g., gas, and/or liquid), acceleration, time, radar, lidar, radio signals (e.g., ultra-wideband radio signals), passive infrared, glass breakage, or movement detectors. The sensor ensemble (e.g., 605) may comprise non-sensor devices, such as buzzers and light emitting diodes. Examples of sensor ensembles and their uses can be found in U.S. patent application Ser. No. 16/447,169, filed Jun. 20, 2019, titled "SENSING AND COMMUNICATIONS UNIT FOR OPTICALLY SWITCHABLE WINDOW SYSTEMS," that is incorporated herein by reference in its entirety.

In some embodiments, an increase in the number and/or types of sensors may be used to increase a probability that one or more measured property is accurate and/or that a particular event measured by one or more sensor has occurred. In some embodiments, sensors of sensor ensemble may cooperate with one another. In an example, a radar sensor of sensor ensemble may determine presence of a number of individuals in an enclosure. A processor (e.g., processor 615) may determine that detection of presence of a number of individuals in an enclosure is positively correlated with an increase in carbon dioxide concentration. In an example, the processor-accessible memory may determine that an increase in detected infrared energy is positively correlated with an increase in temperature as detected by a temperature sensor. In some embodiments, network interface (e.g., 650) may communicate with other sensor ensembles similar to sensor ensemble. The network interface may additionally communicate with a controller.

Individual sensors (e.g., sensor 610A, sensor 610D, etc.) of a sensor ensemble may comprise and/or utilize at least one dedicated processor. A sensor ensemble may utilize a remote processor (e.g., 654) utilizing a wireless and/or wired communications link. A sensor ensemble may utilize at least one processor (e.g., processor 652), which may represent a cloud-based processor coupled to a sensor ensemble via the cloud (e.g., 651). Processors (e.g., 652 and/or 654) may be located in the same building, in a different building, in a building owned by the same or different entity, a facility owned by the manufacturer of the window/controller/sensor ensemble, or at any other location. In various embodiments, as indicated by the dotted lines of FIG. 6, sensor ensemble 605 is not required to comprise a separate processor and network interface. These entities may be separate entities and may be operatively coupled to ensemble 605. The dotted lines in FIG. 6 designate optional features. In some embodiments, onboard processing and/or memory of one or more ensemble of sensors may be used to support other functions (e.g., via allocation of ensembles(s) memory and/or processing power to the network infrastructure of a building).

In some embodiments, a plurality of sensors of the same type may be distributed in an enclosure. At least one of the plurality of sensors of the same type, may be part of an ensemble. For example, at least two of the plurality of sensors of the same type, may be part of at least two ensembles. The sensor ensembles may be distributed in an enclosure. An enclosure may comprise a conference room. For example, a plurality of sensors of the same type may measure an environmental parameter in the conference room. Responsive to measurement of the environmental parameter of an enclosure, a parameter topology of the enclosure may be generated. A parameter topology may be generated utilizing output signals from any type of sensor of sensor ensemble, e.g., as disclosed herein. Parameter topologies may be generated for any enclosure of a facility such as conference rooms, hallways, bathrooms, cafeterias, garages, auditoriums, utility rooms, storage facilities, equipment rooms, and/or elevators.

Figure 8:
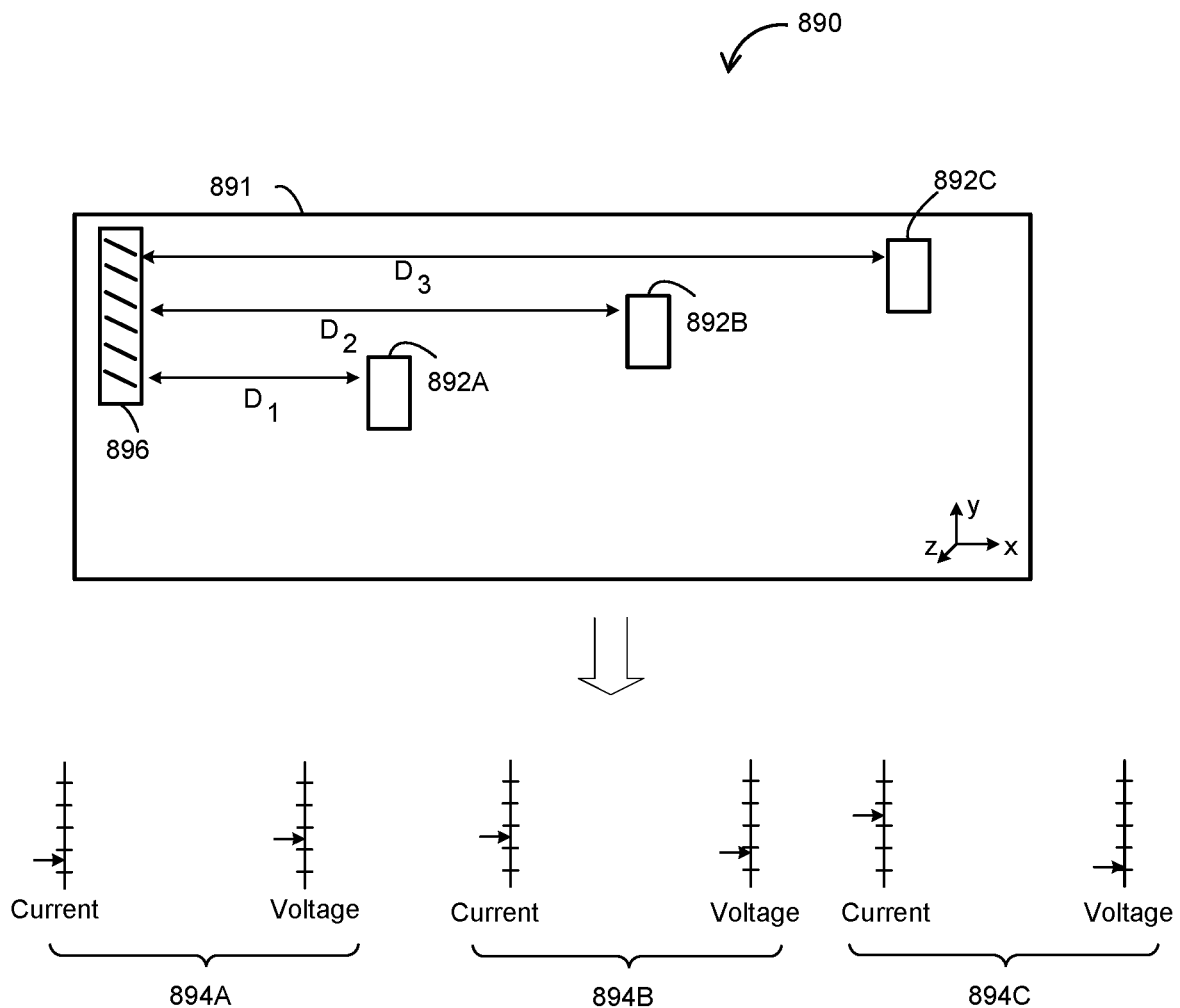
FIG. 8 is a block diagram showing an example of an arrangement of sensor ensembles in an enclosure and associated measurements.

In some embodiments, sensor ensembles are distributed throughout an enclosure. Sensors of a same type may be dispersed in an enclosure, e.g., to allow measurement of environmental parameters at various locations of an enclosure. Sensors of the same type may measure a gradient along one or more dimensions of an enclosure. A gradient may include a temperature gradient, an ambient noise gradient, or any other variation (e.g., increase or decrease) in a measured parameter as a function of location from a point. A gradient may be utilized in determining that a sensor is providing erroneous measurement (e.g., the sensor has a failure). FIG. 8 shows an example of a diagram 890 of an arrangement of sensor ensembles in an enclosure. In the example of FIG. 8, ensemble 892A is positioned at a distance $D_1$ from vent 896. Sensor ensemble 892B is positioned at a distance $D_2$ from vent 896. Sensor ensemble 892C is positioned at a distance $D_3$ from vent 896. Vent 896 may correspond to an air conditioning vent, which represents a relatively constant source of cooling air and a relatively constant source of white noise. Thus, temperature and noise measurements can be made by sensor ensemble 892A.

Alternatively or additionally, sensor ensemble 892A may take current and/or voltage measurements for one or more IGUs. These current and/or voltage measurements may be associated with a tint transition for the one or more IGUs. These current and/or voltage measurements may be compared to a failure signature for the one or more IGUs, to identify an existing IGU failure, and/or to predict a future IGU failure. Current and voltage measurements made by sensor 892A are shown by an output reading profile 894A. Output reading profile 894A indicates a relatively low current and a relatively medium voltage. Current and voltage measurements made by sensor ensemble 892B are shown by output reading profile 894B. Output reading profile 894B indicates a somewhat higher current, and a somewhat reduced voltage. Current and voltage measurements made by sensor ensemble 892C are shown by output reading profile 894C. Output reading profile 894C indicates a current somewhat higher than the current measured by sensor ensembles 892B and 892A. Voltage measured by sensor ensemble 892C indicates a lower level than the voltage measured by sensor ensembles 892A and 892B. In an example, if a current measured by sensor ensemble 892C indicates a much higher current than a current measured by sensor ensemble 892A, one or more processors and/or controllers may interpret the current measured by sensor ensemble 892C as being indicative of an existing or future IGU failure.

In some embodiments, the control system is configured to alter tint of the tintable windows to a plurality of distinct tint states, e.g., at least 2, 3, 4, 5, 6, or 10 tint states. In some embodiments, the control system is configured to alter tint of the tintable windows continuously. In some examples, the distinct tint states comprise a bleached state (tint 1), a darker tint state (tint 2), an even darker tint state (tint 3), and a darkest tint state (tint 4). For a given tint transition of an IGU size, (i) the number of charges that are required to be transferred and (ii) the voltage required to transfer the charges, to complete the transition should remain constant over time. When a larger (or increasingly larger) voltage differential and/or charge transfer is required to effectuate the tint transition, a failure of the IGU may be imminent or occurring.

Figure 9A:
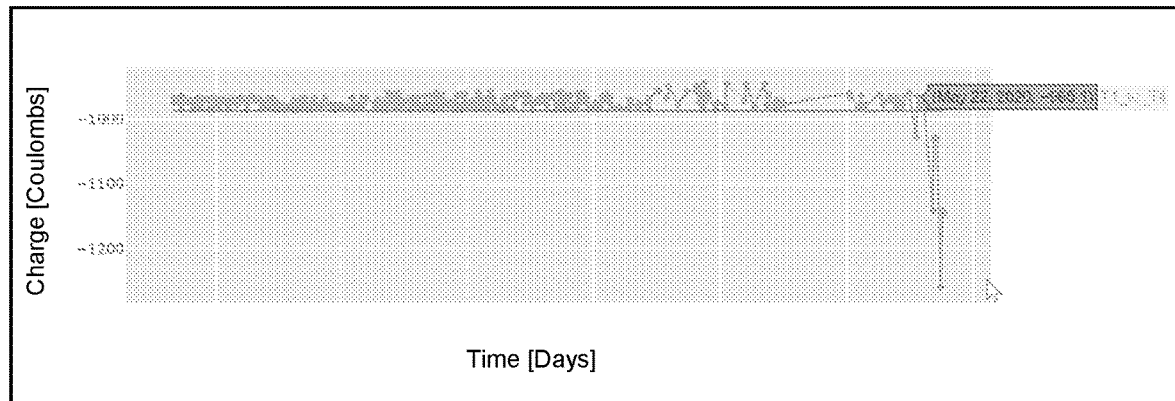
FIG. 9A is a graph depicting charge as a function of time for a set of tint transitions from no tint to darkest tint.
Figure 9B:
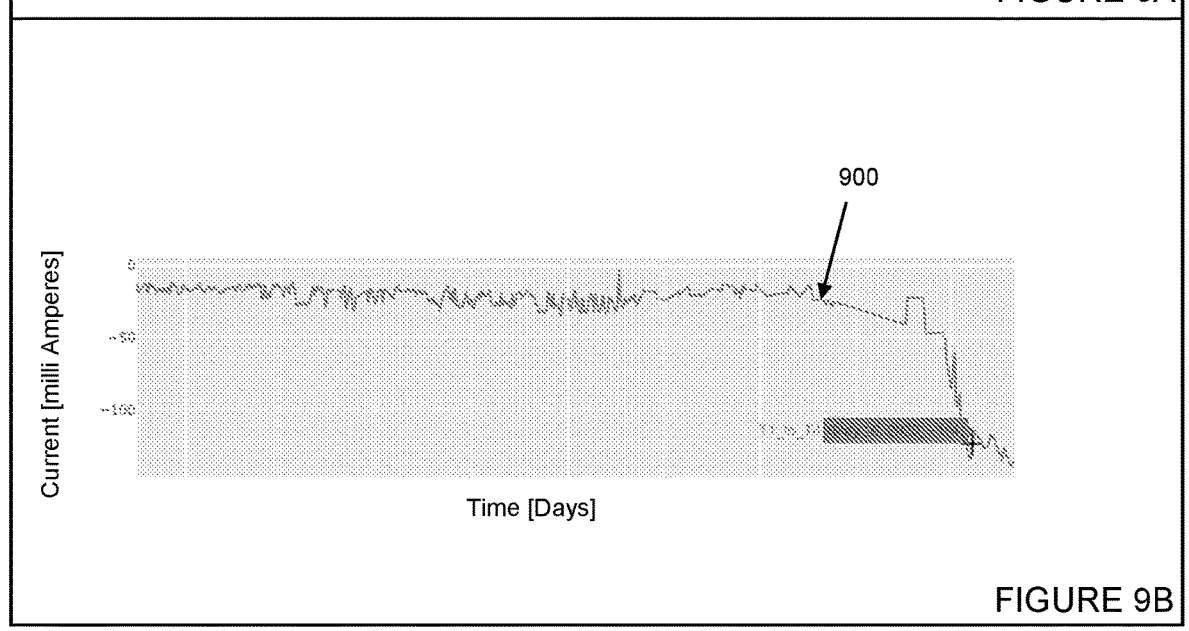
FIG. 9B is a graph depicting leakage current as a function of time for a set of tint transitions from no tint to darkest tint.

FIG. 9A shows an example of a graph depicting charge versus time for an IGU transitioning from a bleached state (T1) to the darkest tint (T4), for an IGU that on May 22, 2020 started to deviate from normal operation as less changes migrated on application of the same voltage differential applied, and thus received a failure prediction. FIG. 9B shows an example of a graph depicting leakage current versus time for an IGU transitioning from T1 to T4, for an IGU that at time 900 and after leaned an increasing amount of current, and received a prediction of failure. The tint transition from T1 to T4 could, but need not, involve one or more intermediate tints between T1 and T4. For example, these intermediate tints could include a second tint T2, and a third tint T3. In FIG. 9A, the charge is shown in units of Coulombs (C). In FIG. 9B, the leakage current is shown in units of milliamperes (mA). The horizontal axes of FIGS. 9A and 9B, representing time, are scaled and auto-generated according to available data for a window controller (WC) coupled to the tintable window. The tintable window has a unique identifier (e.g., lite identifier (ID)), and the window controller has a unique identifier. Each point on the graphs represents a complete tint transition of a specified type which, in the present example, is the tint transition from T1 to T4. For the window controller-tintable window couple, there are complete transitions from T1 to T4 in the database of about one and a half years as depicted in the graphs of FIGS. 9A and 9B (from December 1 2018 to Jun. 10 2020). Depending on the IGU, there could be one or several complete transitions of a given type (such as T1 to T4) per day. Transitions that are not progressing as expected can be described as 'uncharacteristic.' An uncharacteristic tint transition is a deviation from the normal switching parameters for the tintable window in question (deviation from normal within an error range).

In some embodiments, a sensor system is used in conjunction with artificial intelligence (AI) to predict and spot tintable window malfunctions. Over time, a voluminous amount of data may be accumulated from a tintable window controller. The data may relate to current and/or voltage measurements applied to facilitate tint transition of one or more windows. The measurements may be stored in a database. A measurement may include in addition to the measured value also: (i) time stamp, (ii) date stamp, (iii) controller ID, (iv) tintable window ID, and/or (v) measurement type. A framework may be configured to retrieve window controller data from one or more databases, aggregate the data, and use the data to assess and/or predictively maintain windows, e.g., that exhibit failure signatures. The failure signatures may be identified using statistical measurements of current and/or voltage. The ID may comprise a serial identifier of the device, the ID may be alphanumeric. The ID may be (e.g., subsequently) hashed. For example, the ID may be converted using a hexadecimal or base 64 charset.

Presently, static rules (e.g., that exclude a learning system) are at times used to alert of tintable window malfunctions (e.g., using threshold values and/or functions) in an attempt to minimize false readings. Such static rules and thresholds can provide a rigid framework that sometimes fails to adequately predict malfunction of the tintable windows before their failure is visible apparent.

In some embodiments, a methodology for alerting malfunction of tintable window is realized using at least one controller and/or software. Tintable windows may include IGUs, electrochromic glass, and/or mechanically controlled shading. Current, voltage, and/or sensor measurements may be acquired, which measurements relate to transitioning tintable windows of an enclosure. The facility can include several buildings. The buildings can include one or more rooms. An enclosure can include a facility, a building or a portion thereof (e.g., a corridor or a room). The sensors can comprise acoustic, motion, vibration, temperature, and/or electromagnetic sensors (e.g., photosensors). The sensors may comprise transmissivity sensors. The sensors may be sensitive to visible, IR, and/or UV radiation. The tintable glass can act as a sensor. The sensor can include any sensor disclosed herein. Integration (e.g., integrals) and/or derivation (e.g., derivatives) of the measurements (e.g., voltage and/or current) may be utilized. Correlation data can be accessed from various sensor(s) disposed in and/or on the facility. The data can be organized (e.g., assigned, categorized, and/or reorganized). Using (e.g., based at least in part on) the correlation data, the reliability of the measurement (e.g., current and/or voltage, and/or other sensor measurements) can be determined. The measurements can be accumulated in at least one database, e.g., during the normal operation of the sensors and/or devices (e.g., tintable windows) in the facility. Using the determined reliability, the obtained current, voltage, and/or other sensor measurements may be adjusted. A reliability value may be assigned and/or updated for the one or more sensors, e.g., using the adjusted sensor measurements.

In some embodiments, the sensor measurements are processed by considering the enclosure (or any portion thereof), historical readings, benchmarks, and/or modeling, to generate a result. The current, voltage, and/or other sensor measurements can be applied as inputs (e.g., learning set input) to a learning module trained to identify signatures in the presence of failures in the tintable window(s), and/or signatures in the presence of other failures. The inputs may be utilized to fine tune the learning module computation scheme(s). For example, the inputs may be utilized to optimize parameters (e.g., function weight and/or function threshold) of the various functions used in the computation schemes.

The data analysis (e.g., analysis of the sensor measurements) may be performed by a machine based system (e.g., a circuitry). The circuitry may be of a processor. The sensor data analysis may utilize artificial intelligence. The sensor data analysis may rely on one or more models (e.g., mathematical models). In some embodiments, the sensor data analysis comprises linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, stepwise regression, ridge regression, lasso regression, elasticnet regression, principal component analysis (PCA), singular value decomposition, fuzzy measure theory, Borel measure, Han measure, risk-neutral measure, Lebesgue measure, group method of data handling (GMDH), Naive Bayes classifiers, k-nearest neighbors algorithm (k-NN), support vector machines (SVMs), neural networks, support vector machines, classification and regression trees (CART), random forest, gradient boosting, or generalized linear model (GLM) technique.

In some embodiments, the learning module comprises machine learning. The learning module may comprise a multilayer neural network (e.g., a deep learning algorithm). The learning module may include an unbounded number of layers of bounded size, e.g., to progressively extract higher-level features from the raw (e.g., sensor) input measurements. The layers in the multilayer neural network may be hierarchical (e.g., each layer's output may be a higher-level abstraction of inputs from previous layers). The learning module may utilize a heuristic technique (e.g., gross model and sensor data) that will accelerate outputting a reliable prediction as a result. The learning module may optimize for prediction accuracy and/or computational speed. The learning module may consider the neural network size (number of layers and number of units per layer), learning rate, and/or initial weights (e.g., of artificial neurons and/or algorithms (when several algorithms are utilized to generate the result)). The learning module may learn from measurements with respect to failure of tintable windows, by using sensor measurements (e.g., real time, historical, or synthetic sensor measurements).

In some embodiments, a learning module comprises an algorithm and/or a calculation. The learning model may comprise machine learning, artificial intelligence (AI), and/or a statistical validation layer. The learning module can be trained to identify a threshold (e.g., value or function) for failure. Alternatively, the learning module may not be trained to identify a failure threshold.

In some embodiments, a filter (e.g., a convolution filter) is applied to teach the learning module one or more failure modes of the tintable windows. The filter may be applied in the time domain. Loss of data can be minimized. The loss of data may be due to misclassification and/or labeling errors (e.g., by data tracing). The learning module can be trained using historical, real-time, and/or synthesized data, used as a training set. A time frame for the learning module(s) can be adjusted using a proximate time frame during which a tintable window failure may be observed. A machine learning (ML) ensemble can be used to implement the learning module. The machine learning ensemble can include a plurality of models (e.g., at least about 2, 3, 4 5, 7, or 10 models) working together, e.g., using a voting scheme. At least two of the models in the plurality of models can be given different weights. At least two of the models in the plurality of models can be give the same weight. The ML ensemble can include at least one model. Usage of the ML ensemble may be automatic, scheduled, and/or controlled.

In some embodiments, the learning module incorporates a validation mechanism that is configured to perform data management. The learning module can utilize one or more models. One model (or model combination) may be more appropriate in a situation than another. For example, rare circumstances may require use of specific models. The model can use adaptive synthetic oversampling. The model can use deep learning techniques (e.g., convolutional neural networks). The model can use AI techniques that exclude deep learning algorithms and/or new AI techniques that include deep learning algorithms. The learning set may comprise real data. The learning set may comprise synthetic data. The synthetic data may be synthesized using real data. For example, the synthetic data may use a real data backbone to which different type of non-substantial information (e.g., noise) has been added. The non-substantial information (e.g., noise) may be characteristics to sensor measurements (e.g., of failed, failing, and/or properly functioning tintable windows). The learning model can use a temporal convolution neural network. The learning model can incorporate a computation scheme also utilized for analyzing visual imagery. The learning model can use data relating to tint transitions of a first window in a first enclosure (e.g., first facility), or from another second enclosure (e.g., from the same first facility of from another second facility). The second facility can be geographically separated (e.g., distant) from the first facility in which the first tintable window is disposed. The tintable window is oriented outwards towards a first direction. Data relating to a second window of the second enclosure can be oriented toward the same first direction or towards a different second direction. The learning model can use data from tintable windows of the same type (e.g., electrochromic glass having the same type of layer construct, same surface area, and/or the same fundamental length scale). In this example, data should be of the same transition type (e.g., first tint, T1 to second tint, T2). The fundamental length scale (abbreviated herein as "FLS") can comprise a length, width, height, radius, or radius of a bounding circle.

In some embodiments, the result and/or the reliability value are used to predict a subsequent tintable window failure. A tintable window failure can be predicted for a second set of tintable windows (that includes at least one tintable window). Outlier data may be detected. A future reading for the sensor measurements can be predicted.

Figure 10:
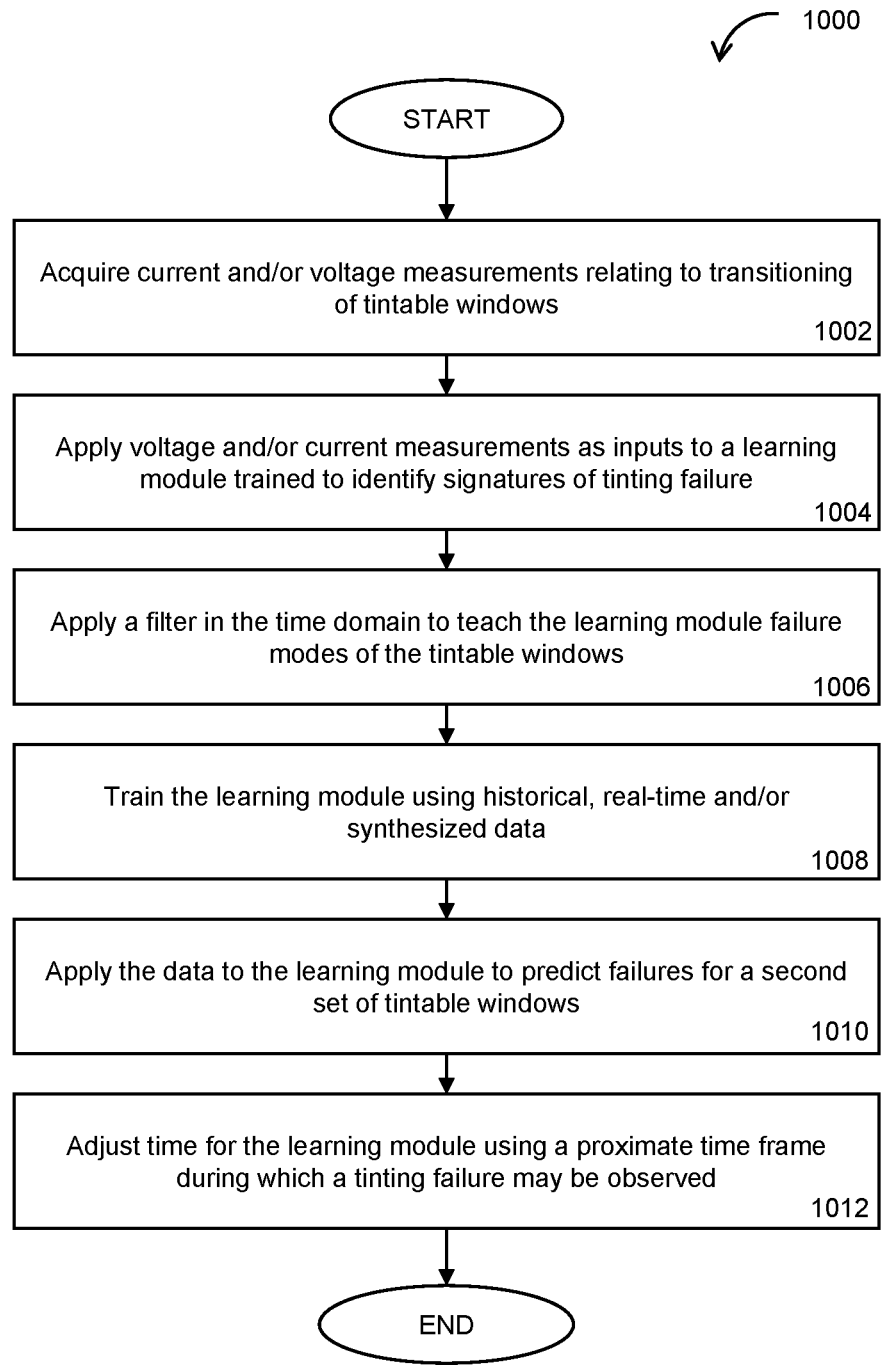
FIG. 10 is a flowchart illustrating an example of a method for predicting tintable window failures.

FIG. 10 shows an example of a flowchart 1000 illustrating one example of acquiring measurements relating to transitioning tint of one or more tintable windows, and applying the measurements to a learning module to predict a proximate time frame during which a tinting failure may be observed. In block 1002, current and/or voltage measurements are acquired relating to the transitioning of tintable windows. In block 1004, the current and/or voltage measurements are applied as inputs to a learning module trained to identify signatures of tinting failure. The learning module may comprise a calculation scheme (e.g., an algorithm). The learning model may comprise machine learning, artificial intelligence (AI), and/or statistical validation. Next, in block 1006, a filter (e.g., mathematical filter) is applied in the time domain, to teach the learning module one or more failure modes of the tintable windows. In block 1008, the learning module is trained using historical, real-time, and/or synthesized data. Next, in block 1010, the data is applied to the learning module to predict failures for a second set of tintable windows. In block 1012, a time frame for the learning module is adjusted using a proximate time frame during which a tinting failure may be observed.

In some embodiments, the acquired data is consolidated into a repository, and/or into a plurality of repositories that are communicatively coupled. All data metrics may be maintained in the repository (or repositories). Analytical queries can be performed, for example, according to Controller Area Network identification (abbreviated herein as "CAN ID," that is a form of network ID), tintable window ID (e.g., Lite ID), IGU and/or tintable glass dimensions (e.g., FLS), transition type, timeframe. The analytical queries can be performed in the same facility, or across facilities (e.g., across sites). Scheduling can be performed for automated extraction. Data extraction can be performed according to the schedule, or at a whim. Auto-generated reporting of tintable window performance can be performed per facility or across facilities. The learning module can be applied to the data to generate failure alerts and/or reports, e.g., using the acquired current, voltage, and/or other sensor data. The learning module can learn failure signatures that are specific for (i) a facility, (ii) layer construct type of electrochromic glass, (iii) type of tintable window, (iv) surface area of the window, (v) FLS of the window, (vi) tint transition type, (vii) façade directionality in which the tintable window is disposed, (viii) geographic location of the facility, (ix) external weather condition, (x) temperature, pressure, and/or noise (internal or external) to which the window is exposed. Pressure includes pressure gradients, e.g., experienced in explosion, earthquakes, and/or winds (e.g., tornadoes). Noise can include loud noises such as thunder, gunshot, and/or bombing. The learning module can utilize historic and/or real-time measurements from/to other sites. The learning module can add noise to data.

In some embodiments, the learning module undergoes several phases. For example, a low fidelity phase and a higher fidelity phase. The higher fidelity phase can enable better prediction of failure as compared to the lower fidelity phase. The higher fidelity phase may have larger, more diverse, and/or more accurate training set, as compared to the lower fidelity phase.

Figure 11:
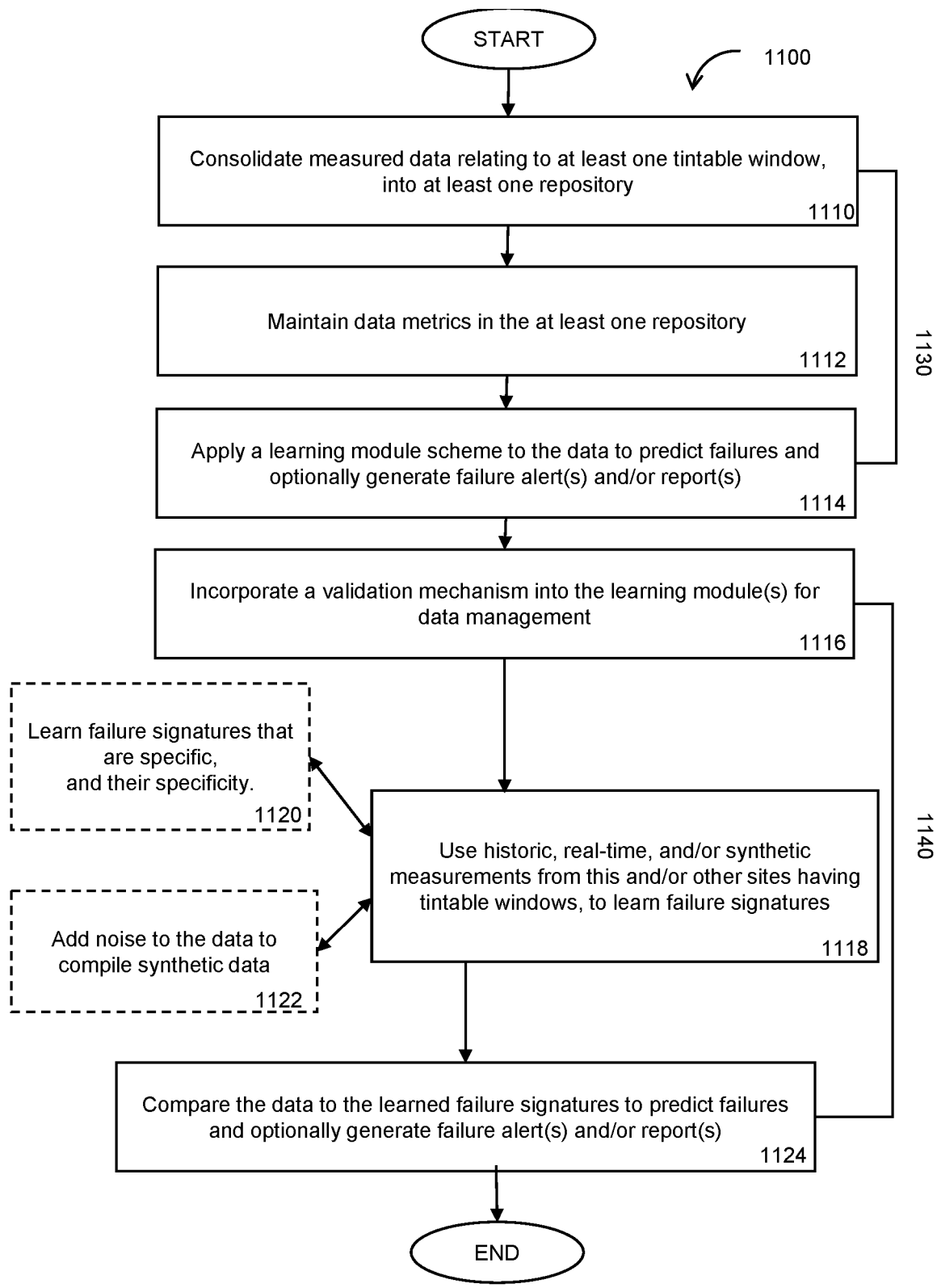
FIG. 11 is a flowchart illustrating an example of a method of predicting tintable window failures and learning failure signatures for tintable window failures.

FIG. 11 shows an example of a flowchart 1100 illustrating an example of a method of predicting failure and learning failure signatures for tintable window failures having a lower fidelity phase 1130 and a higher fidelity phase 1140. In block 1110, voltage, current, and/or other sensor data is consolidated into at least one repository. The data may relate to a tintable window (e.g., voltage and/or current utilized to effectuate a tint transition of the tintable window). Next, in block 1112, data metrics are maintained in the repository. In block 1114, at least one learning module is applied to the data to predict failures and optionally generate one or more failure alerts and/or reports. In block 1116, a validation mechanism is incorporated into the learning module(s) for data management. Then, in block 1118, historic, real-time, and/or synthetic measurements from this and/or other sites having tintable windows are used to learn failure signatures. These failure signatures can be specific (e.g., as disclosed herein, for example, they can be site specific). The ML module may search for the specificity (e.g., FLS, site, and/or weather specificity). For example, at optional block 1120, specificity and the nature of the failure signatures can be learned. At optional block 1122, noise is added to the data to generate synthetic data. In block 1124, the data is compared to the learned failure signatures to predict failures and optionally generate failure alert(s) and/or reports.

In some embodiments, event data is synthesized for a learning set to be used by the learning module. This synthesized data may cover rare, unusual, and/or uncommonly observed circumstances, e.g., to allow the ML module to accurately recognize a subsequently occurring uncommon event when it occurs. The synthesized data can use historic, real-time, and/or synthesized event data from this site and/or other sites having tintable windows to learn failure signatures. The event data can be compared to the learned failure signatures to predict failures. The ML module can perform calculations in real time and/or during periods of low building activity (e.g., at night, and/or on a holiday). For example, the baseline (e.g., threshold) can be changing over time, and consequently, the baseline (e.g., threshold functions) applied in the ML module can be dynamic over time.

In some embodiments, leakage current (e.g., open circuit voltage Voc) can be used as an indication of a problematic tintable window (e.g., comprising an electrochromic device). A voting ensemble may be communicatively coupled to a statistical validation layer to implement a current leakage degradation test. In some embodiments, voting is an ensemble method that can be used for classification. The first operation may be the creation of multiple classification and/or regression models using a training dataset. At least one of a plurality of base models can be created using different splits of the same training dataset and the same calculation scheme (e.g., algorithm), or using the same dataset with different calculation scheme. In majority voting (sometimes called plurality voting), every model makes a prediction (votes) for each test instance. The final output prediction is the one that receives more than half of the votes. If none of the predictions get more than half of the votes, the ensemble method could not make a stable prediction for this instance. In such situation, one could use the most voted prediction (even if this prediction received less than half of the votes) as the final prediction. Unlike majority voting, where each model has the same rights (e.g., has the same weight in the overall scheme), one may increase the importance of one or more models (e.g., increase its relative weight). In weighted voting, the prediction of the better models is multiplied by its respective higher weight (e.g., is counted multiple times) relative to the inferior models.

In simple averaging, for every instance of the test dataset, the average predictions can be calculated. This method may reduce overfit and/or create a smoother regression model.

In some embodiments, leakage current changes over time are indicative of a potential failure of a tintable window. AI and/or a statistical validation layer can look for leakage current degradation over time. AI and/or the statistical validation layer can look for leakage current degradation and/or other failure characteristics (e.g., tint transition time and tint transition peak current may depend on the size of the window. Leak current may not be dependent on the size of the window).

In some embodiments, a controller selects (or direct selection of) a facility to extract metrics for a given period of time (e.g., the most recent nine (9) months). The controller can maintain (or direct maintaining) a job history (e.g., historic data). The controller data can be used to estimate health of a tintable window. The controller can estimate, or direct estimation of, the tintable window's health. For example, by tracking failures using the learning module to track unreplaced field failures (% of all uniquely identifiable Lite IDs). For example, by tracking any issues identified by ML, AI, and/or the statistical validation layer. The controller may identify (or direct identification of) one or more tintable windows at risk of failure. The controller an estimate (or direct estimation of) a severity of risk (at a model ensemble confidence level). The controller can identify (or direct identification of) a predicted date of failure, and/or a predicted length of time until failure occurs. The controller can enable or direct detection of any tintable window (e.g., Integrated Glass Unit—IGU) exhibiting degraded current and/or voltage signatures. When the ML module recognizes a failure event, the controller can auto-generate (or direct auto-generation of) alerts and/or reports. If deployed on the edge in real time, the controller can send (or direct sending of) an alert, report and/or any other action message. The controller can schedule (or direct scheduling of) inspection, maintenance, manufacture and/or stocking of the type of tintable window at risk (e.g., to have it handy once the risk materializes and/or when maintenance is scheduled). The controller may comprise a processor.

In some embodiments, failures express themselves over different time scales. Failures can express themselves differently over time. (e.g., gradual decline vs. fast decline). Some failures can be managed using corrective control calibration (e.g., a window may require a different (e.g., more) current and/or voltage to the same tint level as was previously required. The controller can label and/or categorize failure types and/or severity (e.g., estimate a risk for failure). Examples of failure types are corrosion-type failures and irreversible tinting. The controller can offer visualization of one or more (e.g., all) metrics for all window controllers, for one or more (e.g., all) transition types, over time. Alerts and/or reports may be tied to the failure event to report the issue in automated fashion for case resolution. The controller can perform the operations disclosed herein, or direct performance of the operations disclosed herein.

In some embodiments, one or more tintable window metrics are measured. The metrics may include a transition time. The transition time can be the complete transition time required to implement a change from a first tint state to a second tint state (e.g., in minutes), For example, from T1 to T4. The tint state may be characterized by a color, hue, a transparency level, and/or an absorbance. The first tint state can be a least tinted state of the window. The second tint state can be a most tinted state of the window. The first tint state can be an intermediate state between the least tinted state and the most tinted state of the window, with the first tint state being less tinted than the second tint state. The second tint state can be an intermediate state between the least tinted state and the most tinted state of the window, with the first tint state being less tinted than the second tint state. In some examples, only data from complete transition may be considered (e.g., transition from the first tint state to the second tint state that is not interrupted).

Figure 12:
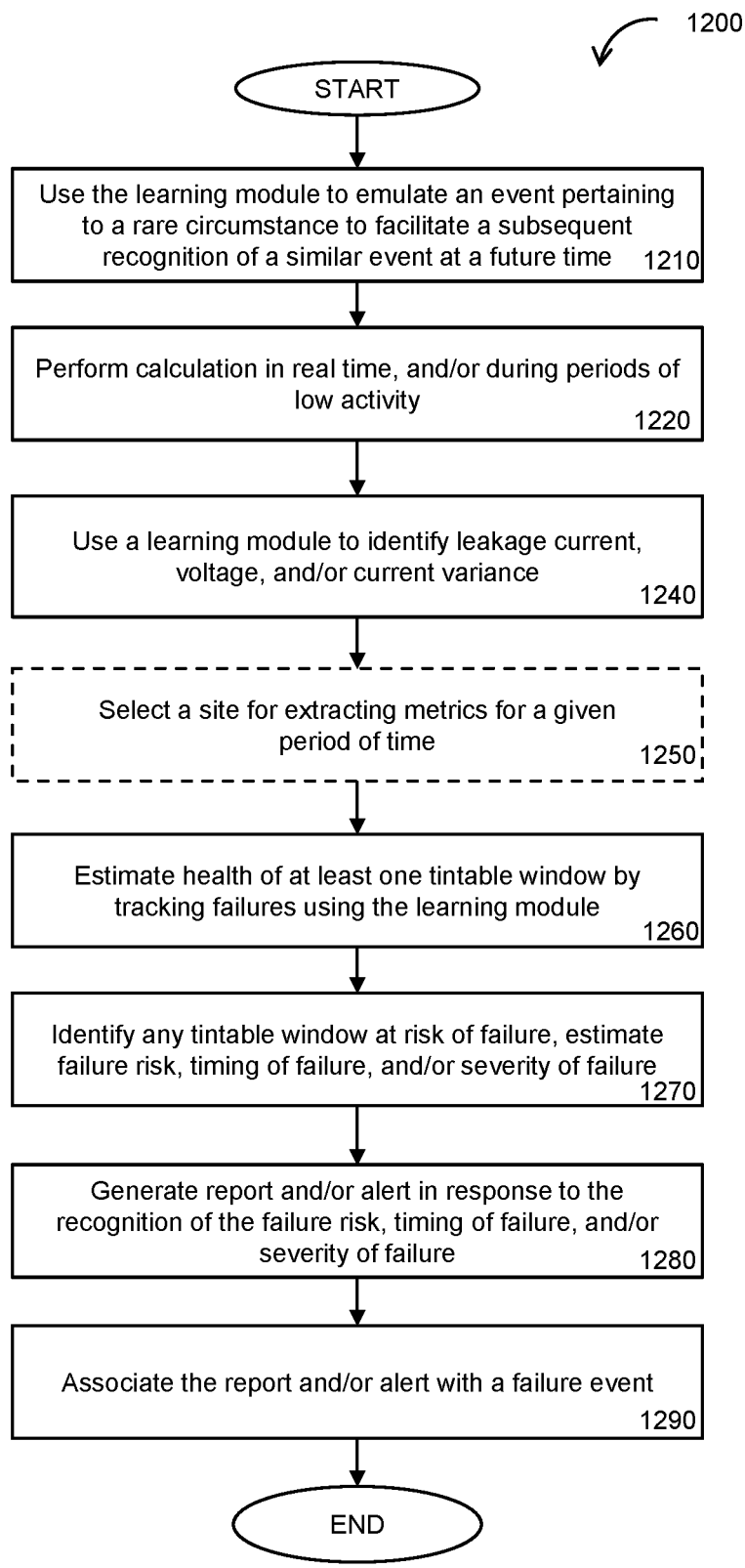
FIG. 12 is a flowchart illustrating an example of a method of generating an alert and/or report in response to identifying a tintable window at risk of failure.

FIG. 12 is a flowchart illustrating an example of a method of generating an alert and/or report in response to identifying a tintable window at risk of failure. In block 1210, the learning module is used to emulate an event pertaining to a rare circumstance to facilitate a subsequent recognition of a similar event at a future time. In block 1220, calculation is performed in real time, and/or during periods of low activity in the enclosure, using the learning module. In block 1240, a learning module is used to identify leakage current, voltage, and/or current variance (e.g., to look for IGU leakage current degradation). At optional block 1250, a site (e.g., facility) is selected for extracting metrics for a given period of time. At block 1260, the health of at least one tintable window is estimated by tracking failures using the learning module. In block 1270, any tintable window at risk of failure is identified. The risk of failure, timing of failure, and/or severity of failure may be estimated. In block 1280, a report and/or alert is generated in response to the recognition of the failure risk and/or the timing of the failure. The report and/or alert can be sent by sending an alert or action message, and/or by providing a visualization of metrics for the IGUs across time for all transition types. Next, at block 1290, the report and/or alert is associated with a failure event. The association can be for the purpose of automation of failure detection, swift resolution of failure, and/or prevention of a bigger and/or more noticeable failure in the tintable window. The association may alert stocking of a similar tintable window to the one predicted to fail. The association may facilitate coordination of replacement of the window predicted to fail, e.g., before its complete and/or visible failure.

Figure 13:
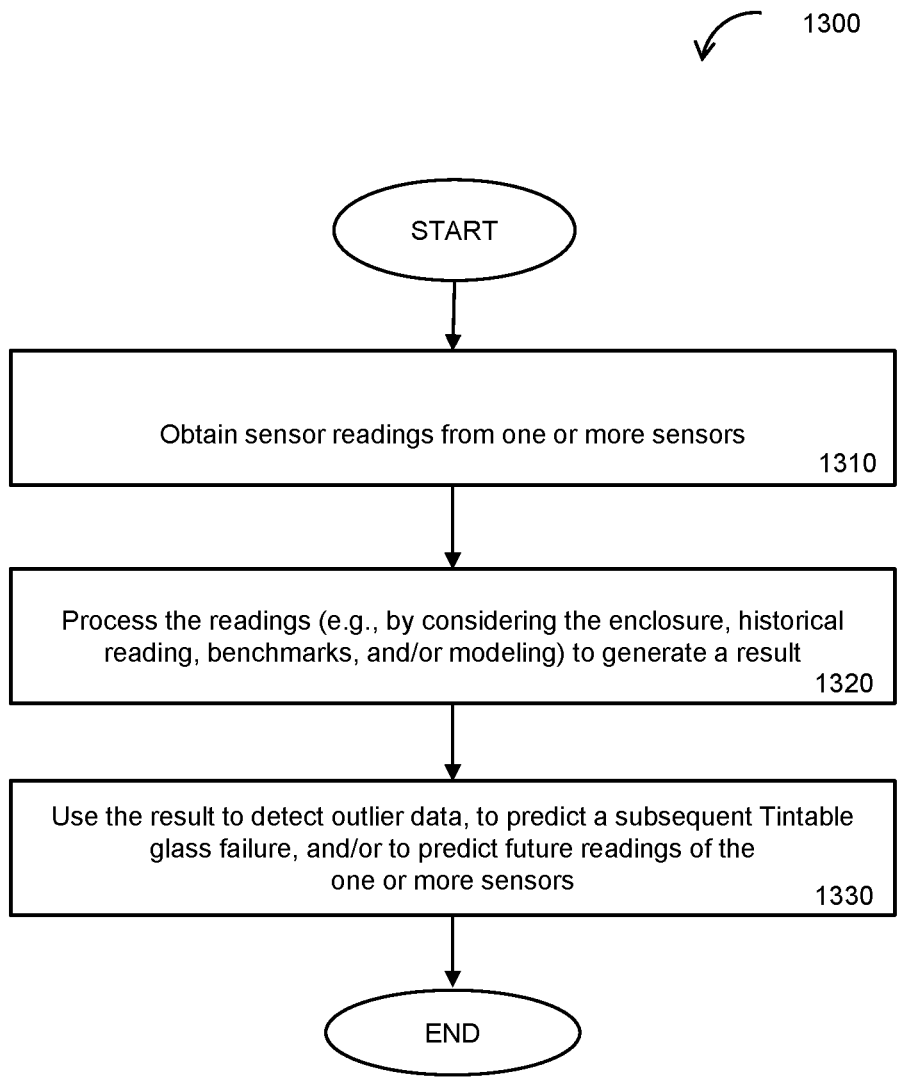
FIG. 13 is a flowchart illustrating an example of a method of processing sensor readings to generate a result.

FIG. 13 shows an example of a flowchart illustrating an example of a method of processing sensor (e.g., other than current, voltage, and/or Voc) readings to generate a result. At block 1310, sensor readings are obtained from one or more sensors. These sensor readings may be obtained from one or more sensor ensembles, or from one or more standalone sensors. At block 1320, the sensor readings are processed (e.g., by considering the enclosure, historical readings, benchmarks, and/or modeling) to generate a result. In block 1330, the result is used to detect outlier data, to predict a subsequent tintable glass failure, and/or to predict future readings of the one or more sensors. Any of the sensor results (e.g., including current, voltage, and/or Voc) can be used to extract (e.g., characteristic) noise data that can be used, e.g., to synthesize data for the learning set.

Figure 14:
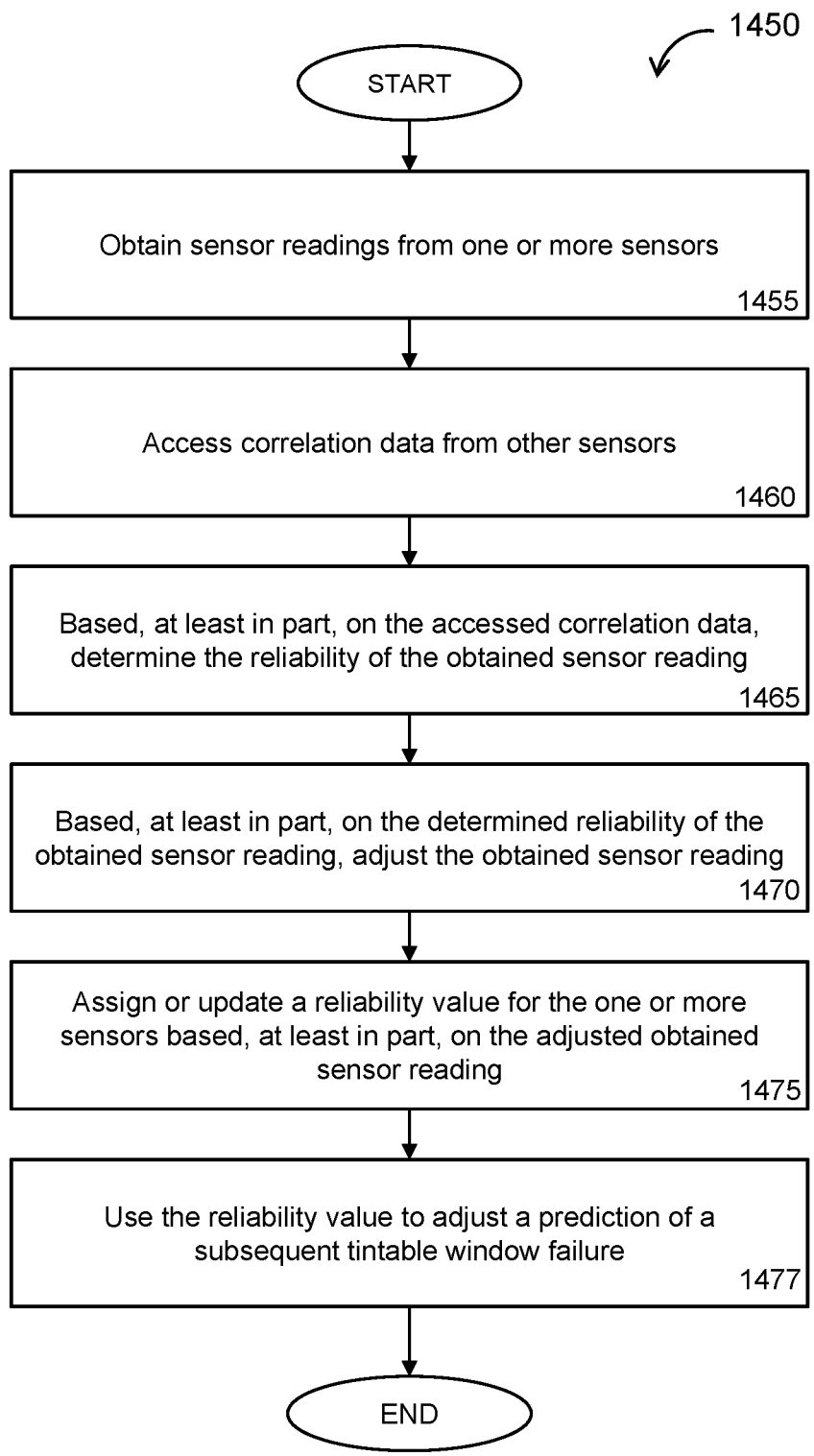
FIG. 14 is a flowchart illustrating an example of a method for determining the reliability of a sensor reading.

FIG. 14 shows an example of a flowchart illustrating an example of a method for determining the reliability of a sensor reading. At block 1455, a sensor reading is obtained from one or more sensors (e.g., disposed in an enclosure). The sensor reading may be obtained from a sensor ensemble and/or from a standalone sensor. In block 1460, correlation data from other sensors (e.g., disposed in the enclosure) is accessed. In block 1465, reliability of the obtained sensor reading is determined, based at least in part on the accessed correlation data. At block 1470, the obtained sensor reading is adjusted, based at least in part on the determined reliability of the obtained sensor reading. In block 1475, a reliability value for the one or more sensors is assigned or updated, based at least in part on the adjusted obtained sensor reading. Next, at block 1477, the reliability value is used to adjust a prediction of a subsequent tintable window failure.

Examples of sensor examples, their calibration, operation, and control can be found in U.S. Provisional Patent Application Ser. No. 62/967,204, filed Jan. 29, 2020, titled "SENSOR CALLIBRATION AND OPERATION," which is incorporated herein in its entirety. Examples of sensor examples, their coexistence, operation, and control can be found in U.S. Provisional Patent Application Ser. No. 63/079,851, filed Sep. 17, 2020, titled "DEVICE ENSEMBLES AND COEXISTENCE MANAGEMENT OF DEVICES," which is incorporated herein in its entirety.

Figure 15:
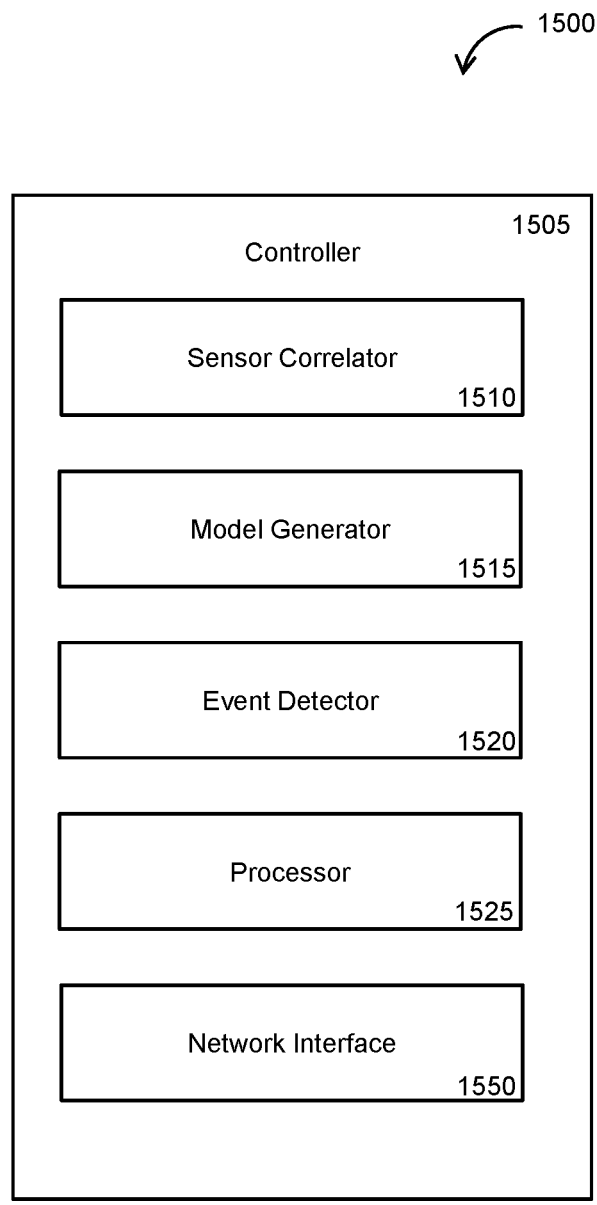
FIG. 15 shows an example of a controller for controlling one or more sensors.

FIG. 15 shows an example of a controller 1505 for controlling one or more sensors. Controller 1505 comprises sensor correlator 1510, model generator 1515, event detector 1520, processor 1525, and the network interface 1550. Sensor correlator 1510 operates to detect correlations between or among various sensor types. For example, an infrared radiation sensor measuring an increase in infrared energy may be positively correlated with an increase in measure temperature. The sensor correlator 1510 may establish correlation coefficients, such as coefficients for negatively-correlated sensor readings (e.g., correlation coefficients between −1 and 0). For example, the sensor correlator 1510 may establish coefficients for positively-correlated sensor readings (e.g., correlation coefficients between 0 and +1).

In some embodiments, multiple devices (e.g., sensors, emitters, actuators, transmitters, and/or receivers) are integrated into a common assembly (such as onto a common circuit board). The ensemble may have a single casing (e.g., cover). One or more circuit boards may be disposed in the single casing to form one device ensemble. The circuit boards in the casing may or may not be physically coupled (e.g., using wiring). The boards in the casing may be communicatively coupled. Communicatively coupled may be directly or indirectly, e.g., wired or wireless communication, e.g., using the network. The common assembly may be referred to herein as an "ensemble."

In some embodiments, multiple assemblies (e.g., ensembles) containing such elements are deployed in close proximity to one another. The close proximity of at least two devices in the same ensemble or different ensembles may lead to one or more shortcomings in their operation. These one or more shortcomings may be in the course of their normal (e.g., designed and/or intended) operation. The one or more shortcomings may be as a result of (i) mutual interference between the devices in the ensemble (e.g., intra assembly interference) and/or (ii) mutual interference between the devices of different ensembles (e.g., inter assembly interference). The ensemble(s) may include, or be operatively coupled to, at least one controller. The at least one controller may comprise a digital architectural system controller. At least one controller may be disposed in an assembly casing (referred to herein as "housing" or "package"). The package may be adapted to mount to a window, wall, ceiling, or any other structure and/or fixture in an enclosure (e.g., a building, facility, or room) to perform various functions. The various functions may include tinting window control, environmental monitoring, building management, video communication, audio communications, lighting (e.g., light communication), and/or wireless networking. Interference can occur, for example, during simultaneous operation of elements. Interference may lead to reduced sensor precision, false readings, sensor saturation, loss of consistency, signal transmission failure, power imbalance, and any combination thereof.

In some embodiments, the plurality of devices (e.g., modules) are consolidated as an ensemble in a common housing, e.g., to provide a useful suite of functions to be provided to a particular user. The functions may increase building efficiency (e.g., energetic and/or monetary), improve occupant health, improve occupant wellness, provide a platform for networking, and/or provide a platform for communications. Examples of various devices (e.g., modules) for inclusion in a consolidated assembly include a temperature sensor, humidity sensor, carbon dioxide sensor, particulate (e.g., dust) sensor, volatile organics sensor, ambient light sensor, glass-breakage sensor, microphone, speaker/buzzer, digital amplifier, camera, video display, LED indicator, Bluetooth transceiver, ultra-wideband transceiver, passive infrared motion sensor, radar sensor, accelerometer, and pressure sensor. The consolidated assembly may include power conditioning components, a processing unit, memory, and/or a network interface. In some embodiments, the assembly has a form factor adapted for mounting in various locations in an enclosure. For example, corresponding mounting adapters can be provided for installing an assembly to at least a portion of a fixture such as a window mullion, a building wall, or a ceiling.

The controller may monitor and/or direct (e.g., physical) alteration of the operating conditions of the apparatuses, software, and/or methods described herein. Control may comprise regulate, manipulate, restrict, direct, monitor, adjust, modulate, vary, alter, restrain, check, guide, or manage. Controlled (e.g., by a controller) may include attenuated, modulated, varied, managed, curbed, disciplined, regulated, restrained, supervised, manipulated, and/or guided. The control may comprise controlling a control variable (e.g., temperature, power, voltage, and/or profile). The control can comprise real time or off-line control. A calculation utilized by the controller can be done in real time, and/or offline. The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from at least one sensor). The controller may deliver an output. The controller may comprise multiple (e.g., sub-) controllers. The controller may be a part of a control system. The control system may comprise a master controller, floor controller, local controller (e.g., enclosure controller, or window controller). The controller may receive one or more inputs. The controller may generate one or more outputs. The controller may be a single input single output controller (SISO) or a multiple input multiple output controller (MIMO). The controller may interpret the input signal received. The controller may acquire data from the one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise (or operatively coupled to) a keyboard, keypad, mouse, touch screen, microphone, speech recognition package, camera, imaging system, or any combination thereof. The outputs may include a display (e.g., screen), speaker, or printer.

The methods, systems and/or the apparatus described herein may comprise a control system. The control system can be in communication with any of the apparatuses (e.g., sensors) described herein. The sensors may be of the same type or of different types, e.g., as described herein. For example, the control system may be in communication with the first sensor and/or with the second sensor. The control system may control the one or more sensors. The control system may control one or more components of a building management system (e.g., lightening, security, and/or air conditioning system). The controller may regulate at least one (e.g., environmental) characteristic of the enclosure. The control system may regulate the enclosure environment using any component of the building management system. For example, the control system may regulate the energy supplied by a heating element and/or by a cooling element. For example, the control system may regulate velocity of an air flowing through a vent to and/or from the enclosure. The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "GPU"). The controller(s) or control mechanisms (e.g., comprising a computer system) may be programmed to implement one or more methods of the disclosure. The processor may be programmed to implement methods of the disclosure. The controller may control at least one component of the forming systems and/or apparatuses disclosed herein. The outputs may include a display (e.g., screen), speaker, or printer.

Figure 7:
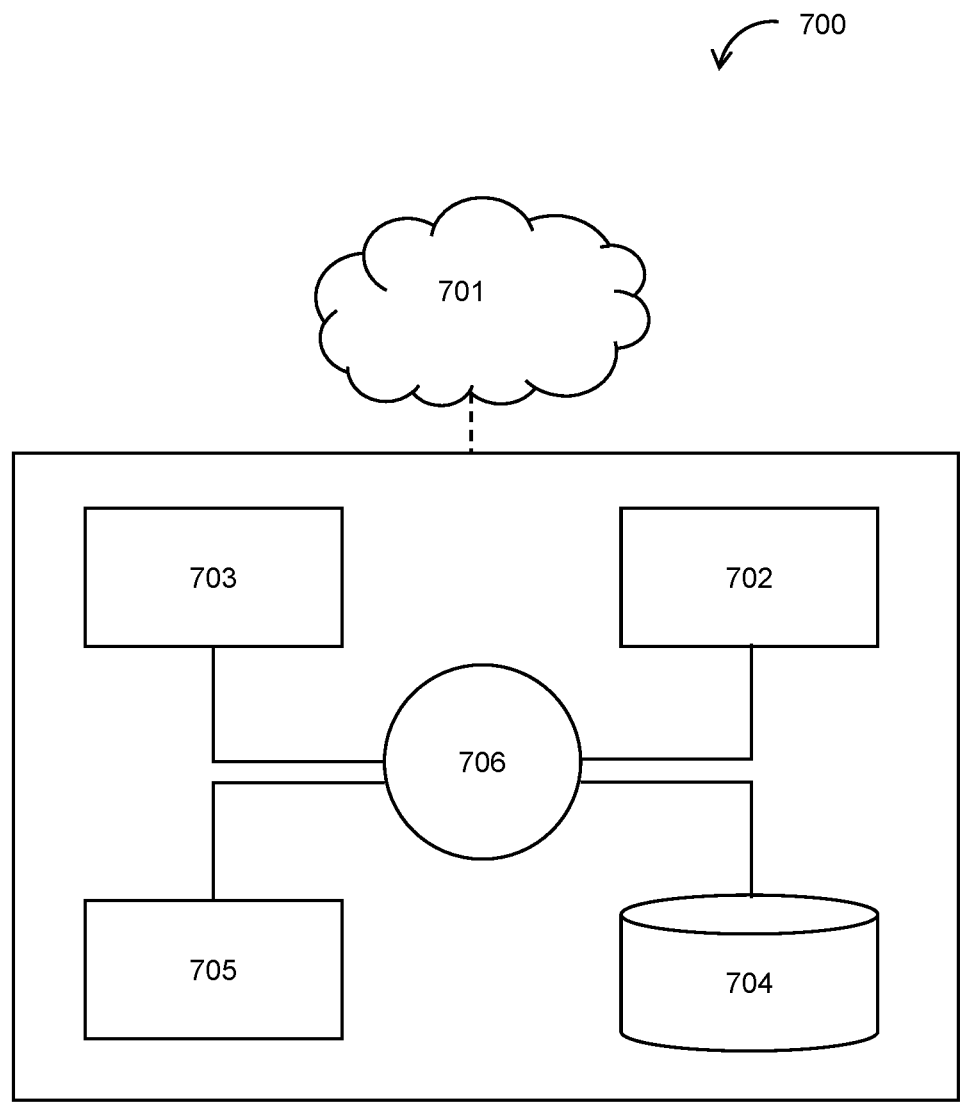
FIG. 7 shows a schematic example of a processing system.

FIG. 7 shows a schematic example of a computer system 700 that is programmed or otherwise configured to perform one or more operations of any of the methods provided herein. The computer system can control (e.g., direct, monitor, and/or regulate) various features of the methods, apparatuses and systems of the present disclosure, such as, for example, control heating, cooling, lightening, and/or venting of an enclosure, or any combination thereof. The computer system can be part of, or be in communication with, any sensor or sensor ensemble disclosed herein. The computer may be coupled to one or more mechanisms disclosed herein, and/or any parts thereof. For example, the computer may be coupled to one or more sensors, valves, switches, lights, windows (e.g., IGUs), motors, pumps, optical components, or any combination thereof.

The computer system can include a processing unit (e.g., 706) (also referred to herein as "processor," "computer," and "computer processor"). The computer system may include memory or memory location (e.g., 702) (e.g., random-access memory, read-only memory, flash memory), electronic storage unit (e.g., 704) (e.g., hard disk), communication interface (e.g., 703) (e.g., network adapter) for communicating with one or more other systems, and peripheral devices (e.g., 705), such as cache, other memory, data storage and/or electronic display adapters. In the example shown in FIG. 7, the memory 702, storage unit 704, interface 703, and peripheral devices 705 are in communication with the processing unit 706 through a communication bus (solid lines), such as a motherboard. The storage unit can be a data storage unit (or data repository) for storing data. The computer system can be operatively coupled to a computer network ("network") (e.g., 701) with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 702. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 700 can be included in the circuit.

The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 702 or electronic storage unit 704. The machine executable or machine-readable code can be provided in the form of software. During use, the processor 706 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code or can be compiled during runtime. The code can be supplied in a programming language that can be selected to enable the code to execute in a pre-compiled or as-compiled fashion.

In some embodiments, the processor comprises a code. The code can be program instructions. The program instructions may cause the at least one processor (e.g., computer) to direct a feed forward and/or feedback control loop. In some embodiments, the program instructions cause the at least one processor to direct a closed loop and/or open loop control scheme. The control may be based at least in part on one or more sensor readings (e.g., sensor data). One controller may direct a plurality of operations. At least two operations may be directed by different controllers. In some embodiments, a different controller may direct at least two of operations (a), (b) and (c). In some embodiments, different controllers may direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). The controller and/or computer readable media may direct any of the apparatuses or components thereof disclosed herein. The controller and/or computer readable media may direct any operations of the methods disclosed herein.

In some embodiments, the at least one sensor is operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may include temperature sensor, weight sensor, material (e.g., powder) level sensor, metrology sensor, gas sensor, or humidity sensor. The metrology sensor may comprise measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, or electromagnetic signal. The electromagnetic signal may comprise a visible, infrared, ultraviolet, ultrasound, radio wave, or microwave signal. The gas sensor may sense any of the gas delineated herein. The distance sensor can be a type of metrology sensor. The distance sensor may comprise an optical sensor, or capacitance sensor. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The temperature sensor may comprise a camera (e.g., IR camera, CCD camera). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensor, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The one or more sensors may be connected to a control system (e.g., to a processor, to a computer).

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall cover any such alternatives, modifications, variations, or equivalents. It is intended that the following claims define the scope of the invention and that methods and structures within the scope of these claims and their equivalents be covered thereby.

What is claimed is:

1. A method of predicting a tintable window failure in a facility,
the method comprising:
acquiring one or more measurements relating to a tint transition of a tintable window that is disposed in the facility, wherein the tint transition is from a first tint to a second tint;
analyzing the one or more measurements acquired by considering data that (i) correlates to a type of the one or more measurements, (ii) correlates to the tint transition from the first tint to the second tint, and (iii) is characteristic of an incomplete transition, and/or is an uncharacteristic tint transition from the first tint to the second tint, wherein the data comprises data acquired from at least one of: a different facility than the facility; or a different building than a building in which the tintable window is disposed;
using the analysis to predict a failure in tinting of the tintable window, wherein using the analysis to predict the failure in tinting of the tintable window comprises characterizing changes over time in the one or more measurements acquired; and
adjusting a control scheme to facilitate the tint transition by the tintable window.

2. The method of claim 1, wherein the tint transition comprises a complete tint transition from the first tint to the second tint.

3. The method of claim 2, further comprising considering data that is characteristic of the complete and/or characteristic tint transition from the first tint to the second tint.

4. The method of claim 1, wherein the one or more measurements comprise a current measurement taken in real time during the tint transition.

5. The method of claim 1, wherein the one or more measurements comprise an open-circuit voltage measurement.

6. The method of claim 1, wherein the one or more measurements comprise one or more measurements from at least one sensor, and wherein the method further comprises using the analysis to determine a reliability value for the at least one sensor.

7. The method of claim 6, further comprising using the reliability value to adjust the one or more measurements of the at least one sensor to form one or more adjusted sensor measurements.

8. The method of claim 7, further comprising updating the reliability value using the one or more adjusted sensor measurements.

9. The method of claim 7, further comprising using the reliability value to generate a prediction of a subsequent tintable window failure for the facility.

10. The method of claim 1, wherein the incomplete tint transition and/or the uncharacteristic tint transition is of a type having at least one identifiable data signature.

11. The method of claim 1, wherein the correlation data correlates to one or more measurements taken from one or more different windows having the dimensions, or substantially having the dimensions of the tintable window.

12. The method of claim 1, wherein the data comprises data acquired over at least about 10, 50, 100, or 1,000 occurrences of the tint transition and/or acquired over at least about 12, 25, 52, 104, or 156 weeks.

13. The method of claim 1, wherein analyzing the one or more measurements comprises any data signature specific to the facility, to a window type for the tintable window, to a weather condition, to a time of day, to a time of year, to a relative geographical location of the tintable window in the facility, and/or to a geographic location of the facility.

14. The method of claim 1, wherein using the analysis comprises providing an alert and/or a report of a failure of the tintable window, and wherein providing the alert and/or the report comprises at least one of: predicting a time of a visible failure that is visible to an average person; or scheduling maintenance . . .

15. The method of claim 14, wherein the tintable window is a first tintable window, and wherein providing the alert and/or a report includes: scheduling inventory and/or scheduling production, of another tintable window to replace the first tintable window.

16. The method of claim 1, wherein the prediction of the failure is before any defective tint transition is visible to an average person.

17. A non-transitory computer readable program instructions for predicting a tintable window failure in a facility, which non-transitory computer readable program instructions, when executed by one or more processors, cause the one or more processors to execute operations comprising:
acquiring, or directing acquisition of, one or more measurements relating to a tint transition of a tintable window that is disposed in the facility, wherein the tint transition is from a first tint to a second tint;
analyzing, or directing analysis of, the one or more measurements acquired by considering data that (i) correlates to a type of the one or more measurements, (ii) correlates to the tint transition from the first tint to the second tint, and (iii) is characteristic of an incomplete tint transition and/or an uncharacteristic tint transition from the first tint to the second tint, wherein the data comprises data acquired from at least one of: a different facility than the facility; or a different building than a building in which the tintable window is disposed;
using, or directing usage of, the analysis to predict a failure in tinting of the tintable window, wherein using the analysis to predict the failure in tinting of the tintable window comprises characterizing changes over time in the one or more measurements acquired; and
adjusting a control scheme to facilitate the tint transition by the tintable window.

18. An apparatus for predicting a tintable window failure in a facility, the apparatus comprising at least one controller, which at least one controller is configured to:
acquire, or direct acquisition of, one or more measurements relating to a tint transition of a tintable window that is disposed in the facility, wherein the tint transition is from a first tint to a second tint;
analyze, or direct analysis of, the one or more measurements acquired by considering data that (i) correlates to a type of the one or more measurements, (ii) correlates to the tint transition from the first tint to the second tint, and (iii) is characteristic of an incomplete tint transition and/or an uncharacteristic tint transition from the first tint to the second tint, wherein the data comprises data acquired from at least one of: a different facility than the facility; or a different building than a building in which the tintable window is disposed;
use, or direct usage of, the analysis to predict a failure in tinting of the tintable window, wherein using the analysis to predict the failure in tinting of the tintable window comprises characterizing changes over time in the one or more measurements acquired; and adjusting a control scheme to facilitate the tint transition by the tintable window.

* * * * *